(12) United States Patent
Awadin et al.

(10) Patent No.: US 12,500,728 B2
(45) Date of Patent: Dec. 16, 2025

(54) SUBBAND OPERATION FOR CROSS DIVISION DUPLEX TECHNOLOGY

(71) Applicant: Samsung Electronics Co., Ltd., Gyeonggi-do (KR)

(72) Inventors: Mohamed Mokhtar Gaber Moursi Awadin, San Diego, CA (US); Jung Hyun Bae, San Diego, CA (US); Mohammed Karmoose, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 331 days.

(21) Appl. No.: 18/094,166

(22) Filed: Jan. 6, 2023

(65) Prior Publication Data

US 2023/0163937 A1 May 25, 2023

Related U.S. Application Data

(63) Continuation of application No. 17/980,774, filed on Nov. 4, 2022.

(60) Provisional application No. 63/392,367, filed on Jul. 26, 2022, provisional application No. 63/297,352, filed on Jan. 7, 2022, provisional application No. 63/281,188, filed on Nov. 19, 2021.

(51) Int. Cl.
*H04L 5/14* (2006.01)
*H04W 72/0453* (2023.01)
*H04W 72/21* (2023.01)

(52) U.S. Cl.
CPC ........... *H04L 5/14* (2013.01); *H04W 72/0453* (2013.01); *H04W 72/21* (2023.01)

(58) Field of Classification Search
CPC ....... H04L 5/14; H04L 5/0023; H04L 5/0082; H04L 5/16; H04L 5/0048; H04L 5/0098; H04L 5/1469; H04L 5/001; H04L 5/0053; H04L 27/26025; H04W 72/0453; H04W 72/21; H04W 72/0457; H04W 72/0446; H04W 76/27; H04W 72/231; H04W 72/232; H04W 72/535
See application file for complete search history.

(56) References Cited

U.S. PATENT DOCUMENTS

| | | | |
|---|---|---|---|
| 10,749,644 | B2 | 8/2020 | Islam |
| 11,064,498 | B2 | 7/2021 | Wu et al. |
| 11,271,694 | B2 | 3/2022 | Seo et al. |
| 11,330,581 | B2 | 5/2022 | Sasaki |
| 11,363,630 | B2 | 6/2022 | Zhang et al. |
| 11,646,829 | B2 * | 5/2023 | Tseng ................ H04W 52/0216 370/329 |

(Continued)

*Primary Examiner* — Brian T O'Connor

(74) *Attorney, Agent, or Firm* — The Farrell Law Firm, P.C.

(57) ABSTRACT

An apparatus and method are provided for performing a subband operation for cross division duplex (XDD) technology to enhance coverage in wireless communication systems. A method includes identifying, by a user equipment (UE), an uplink (UL) or downlink (DL) subband configuration provided from a gNB to the UE, and determining a priority between a UL transmission and a DL reception based on whether a collision between DL and UL operations occurs in a time domain, wherein the UE is a half-duplex UE which performs the UL transmission at different times than when the UE performs the DL reception.

20 Claims, 22 Drawing Sheets

(56) References Cited

U.S. PATENT DOCUMENTS

| | | | |
|---|---|---|---|
| 11,716,225 B2* | 8/2023 | Chatterjee | H04L 5/0044 |
| | | | 370/329 |
| 11,956,728 B2* | 4/2024 | Abotabl | H04W 52/246 |
| 11,991,686 B2* | 5/2024 | Pocovi | H04W 72/0446 |
| 12,082,225 B2* | 9/2024 | Zhang | H04W 72/046 |
| 12,149,385 B2* | 11/2024 | Chatterjee | H04L 5/0044 |
| 12,335,956 B2* | 6/2025 | Lim | H04W 72/21 |
| 12,348,442 B2* | 7/2025 | Mondal | H04L 1/1812 |
| 2022/0191844 A1 | 6/2022 | Yi et al. | |
| 2023/0057558 A1* | 2/2023 | Lim | H04W 8/24 |
| 2023/0118780 A1* | 4/2023 | Abotabl | G01S 5/0063 |
| | | | 455/456.1 |
| 2023/0208607 A1* | 6/2023 | Lim | H04L 5/0048 |
| | | | 370/280 |
| 2023/0283446 A1* | 9/2023 | Ye | H04L 5/0094 |
| | | | 370/329 |
| 2024/0259246 A1* | 8/2024 | Hamidi-Sepehr | H04L 27/26522 |
| 2025/0089027 A1* | 3/2025 | Okamura | H04W 72/569 |

\* cited by examiner

| 401 | 402 | 408 | 407 |
|---|---|---|---|
| nrofUplinkSlots (legacy): Number of consecutive full DL slots at the beginning of each DL-UL pattern. | nrofDownlinkSymbols (legacy): Number of consecutive DL symbols in the beginning of the slot following the last full DL slot (as derived from nrofDownlinkSlots). | Remaining symbols/slots without indication are considered flexible symbols/slots. | nrofUplinkSubbandSymbols: Number of consecutive UL symbols for uplink subband in the end of the slot preceding the first full UL subband slot (as derived from nrofUplinkSubbandSlots). |

| nrofUplinkSubbandSlots: Number of consecutive full slots for uplink subband | nrofUplinkSubbandSymbols: Number of consecutive UL symbols for uplink subband preceding the UL symbols for UL BWP indicated by nrofUplinkSymbols in the slot preceding the first full UL slot. | nrofUplinkSymbols (legacy): Number of consecutive UL symbols in the end of the slot preceding the first full UL slot (as derived from nrofUplinkSlots). | nrofUplinkSlots (legacy): Number of consecutive full UL slots at the end of each DL-UL pattern. |
|---|---|---|---|
| 405 | 406 | 404 | 403 |

SUBBAND OPERATION FOR CROSS DIVISION DUPLEX TECHNOLOGY

CROSS-REFERENCE TO RELATED APPLICATION(S)

This application is a Continuation Application of U.S. application Ser. No. 17/980,774, filed in the U.S. Patent and Trademark Office on Nov. 4, 2022, which is based on and claims priority under 35 U.S.C. § 119(e) to U.S. Provisional Application Ser. Nos. 63/281,188, 63/297,352, and 63/392,367, which were filed in the U.S. Patent and Trademark Office on Nov. 19, 2021, Jan. 7, 2022, and Jul. 26, 2022, respectively, the entire contents of each of which are incorporated herein by reference.

TECHNICAL FIELD

The disclosure relates generally to wireless communication systems, and more particularly, to a subband operation for cross division duplex (XDD) technology to enhance coverage in wireless communication systems.

SUMMARY

In legacy new radio (NR) technology, a slot format indication is provided in a three-step approach.

Step 1 is a cell specific indication in which a next generation NodeB (e.g., a gNB) provides all user equipments (UEs) in a cell with slot configurations by TDD-UL-DL-ConfigCommon in either a system information block 1 (SIB1) for a primary cell (PCell) or ServingCellConfigCommon for a secondary cell (SCell), where TDD refers to time division duplexing.

The following information is provided to the UEs in the serving cell.

The periodicity of the downlink (DL)-uplink (UL) pattern, which is the summation of periodicities indicated by pattern1 and pattern2. The resulting period may be divided by 20 milliseconds (msec).

Pattern1, which provides the number of consecutive DL slots in the beginning of DL-UL pattern period, the number of DL symbols in the beginning of the slot following the last full DL slot, the number of consecutive UL slots at the end DL-UL pattern period, and the number of the UL symbols at the end of the slot preceding the first full UL slot. The remaining symbols are considered as flexible.

Pattern2, which provides similar information as pattern1, but the configurations of pattern2 apply to the slot following the last slot indicated by pattern1.

Pattern1 and Pattern2 can be configured by the TDD-UL-DL-Pattern provided below.

```
TDD-UL-DL-Pattern ::=              SEQUENCE {
  dl-UL-TransmissionPeriodicity        ENUMERATED {ms0p5,
  ms0p625, ms1, ms1p25, ms2, ms2p5, ms5, ms10},
  nrofDownlinkSlots                INTEGER (0..maxNrofSlots),
  nrofDownlinkSymbols              INTEGER
                                      (0..maxNrofSymbols-1),
  nrofUplinkSlots                  INTEGER (0..maxNrofSlots),
  nrofUplinkSymbols                INTEGER
                                      (0..maxNrofSymbols-1),
  ...,
  [[
  dl-UL-TransmissionPeriodicity-v1530   ENUMERATED {ms3,
                                                    ms4}
  OPTIONAL -- Need R
  ]]
}
```

Step 2 is UE specific signaling. In Step 2, the gNB can override any of the flexible symbols as indicated in Step 1. In other words, any symbol indicated as the UL/DL in Step 1 should remain as a UL/DL, respectively, and cannot be altered to be flexible by Step 2. This is realized by TDD-UL-DL-ConfigDedicated for a particular slot indexed by a radio resource control (RRC) parameter slotIndex shown below and its parameters are defined as follows.

A gNB can indicate that all symbols within the slot are DL or UL by allDownlink or allUplink, respectively, can indicate the number of consecutive downlink symbols in the beginning of this slot by nrofDownlinkSymbols, and can indicate the number of consecutive uplink symbols at the end of this slot by nrofUplinkSymbols.

The remaining symbols are considered as flexible.

Although the gNB in Step 2 indicates the slot configurations for all symbols in the slot, the provided UL/DL indications may be identical to those provided by Step 1. The following is the information element (IE) that used to configure TDD-UL-DL-ConfigDedicated.

```
TDD-UL-DL-SlotConfig ::=      SEQUENCE {
  slotIndex                     TDD-UL-DL-SlotIndex,
  symbols                       CHOICE {
    allDownlink                   NULL,
    allUplink                     NULL,
    explicit                      SEQUENCE {
      nrofDownlinkSymbols           INTEGER
                                      (1..maxNrofSymbols-1)
  OPTIONAL, -- Need S
      nrofUplinkSymbols             INTEGER
                                      (1..maxNrofSymbols-1)
  OPTIONAL -- Need S
    }
  }
}
```

Dynamic indication for a UL transmission refers to the transmission of a physical uplink shared channel (PUSCH), a physical uplink control channel (PUCCH), a physical random access channel (PRACH), or a sounding reference signal (SRS) that is indicated by a downlink control information (DCI) format, a random access response (RAR) UL grant, a fallbackRAR UL grant, or a successRAR. Dynamic indication for a DL reception refers to the reception of a physical downlink shared channel (PDSCH) and channel state information-reference signal (CSI-RS) indicated by DCI.

After Step 2, if the UE is not configured to receive DCI format 2_0, the indicated flexible symbols can be used for the dynamic reception or the transmission. In other words, dynamic grants can override a flexible symbol when DCI format 2_0 is not configured.

A UE receives a physical downlink control channel (PDCCH) and a PDSCH and a CSI-RS configured by higher layer signaling that partially/fully spans flexible symbols unless the UE receives a dynamic indication for the UL transmission. In other words, a dynamic UL overrides the RRC configured DL when they occur over flexible symbols.

For a PUCCH, a PUSCH, a PRACH, and an SRS configured by higher layer signaling that partially/fully spans flexible symbols, when a UE detects an indication of dynamic DL reception on those symbols, the UE cancels the UL transmission based on a particular timeline and UE capability.

On flexible symbols, the UE does not expect a conflict between higher layer configurations that instruct the UE to transmit or receive.

Step 3 is dynamic indication. In Step 3, a gNB can use group common-physical control channel (GC-PDCCH), DCI format 2_0 to override the flexible symbols indicated in Steps 1 and 2. The slot format indicator (SFI)-index field in DCI 2_0 points to one of the slot format combinations, slotFormatCombinations, and each combination is constructed by slotFormatCombination, as shown below. Each combination is assigned an identifier (ID) that is used to point to the combination by DCI 2_0. For each combination, slotFormats provide the slot format of consecutive slots by using a series of specified slot formats in Table 11.1.1-1 in 3GPP technical specification (TS) 38.213, as shown below.

```
SlotFormatCombination ::=           SEQUENCE {
  slotFormatCombinationId             SlotFormatCombinationId,
  slotFormats                         SEQUENCE (SIZE
(1..maxNrofSlotFormatsPerCombination)) OF INTEGER (0..255)
}
```

RRC IE for SlotFormatCombination

The provided indication applies, starting from the slot in which the UE receives DCI 2_0 for duration and depends on the number of slots included in the indicated combination.

The indicated number of slots may be greater than or equal to the monitoring periodicity of DCI 2_0. However, if the UE detects multiple DCI 2_0, the UE expects the multiple DCI 2_0 to indicate the same format for the slot.

The indicated slot format by Step 3 cannot override any symbol indicated as downlink or uplink. In other words, DCI 2_0 can only override the symbols indicated as flexible in the previous two steps and may be aligned with any uplink/downlink indicated symbols in the previous Steps 1 and 2.

The UE does not expect a conflict between dynamically indicated transmission or reception with the indication provided by DCI 2_0.

For flexible symbols indicated in the previous Steps 1 and 2, and when the UE detects DCI 2_0, the following is applied:

A PDCCH is received only if all symbols of the associated control resource set (CORESET) are indicated as "D", the UE receives any dynamic reception corresponding with any F symbol indicated by DCI 2_0, the UE transmits any dynamic transmission corresponding with any F symbol indicated by DCI 2_0, and if there is no dynamic transmission or reception on any F symbols indicated by DCI 2_0, no transmission or reception occurs on those symbols and they are treated as gaps without any DL/UL.

For transmission or reception configured by higher layer reception, the UE transmits or receives only if DCI 2_0 indicates that corresponding symbols are D (downlink) or U (uplink), respectively.

The UE does not expect a conflict between dynamic transmission or reception and DCI 2_0 indicating any of the corresponding symbols as D or U, respectively.

For the PDCCH and PDSCH and a CSI-RS configured by higher layer signaling that partially/fully spans flexible or UL symbols indicated by DCI 2_0, the UE does not receive these symbols. In other words, dynamic UL or DCI 2_0 indicating U or F (flexible) overrides the RRC configured DL when they occur over flexible symbols.

For a PUCCH, a PUSCH, and a PRACH, and an SRS configured by higher layer signaling that partially/fully spans flexible or DL symbols indicated by DCI 2_0, or when a UE detects an indication of dynamic DL reception on those symbols, the UE cancels the UL transmission based on a timeline and UE capability.

For flexible symbols indicated in Steps 1 and 2, and when the UE does not detect DCI 2_0, although being configured to received it, the UE transmits or receives the dynamic transmission or reception, receives a PDCCH, does not receive a DL configured by a higher layer, and cancels a UL configured by a higher layer according to a timeline and UE capability.

Switching a bandwidth part (BWP) requires some time to enable adjustment of the UE's transmission/reception (Tx/Rx) chain based on the new active BWP. If the switching occurs due to the reception of a PDCCH with a BWP switching command, the UE is not required to transmit/receive from the end of the $3^{rd}$ symbol of a slot where the PDCCH is received to the beginning of the slot indicated by a time domain resource assignment (TDRA) field. This time offset has to be greater than the necessary delay periods required to conduct BWP switching provided in TS-38.133.

However, if the BWP occurs due to the expiry of the BWP-Inactivity Timer, the UE is not required to transmit/receive from the beginning of a subframe in FR1 or half of a subframe in FR2 that is immediately after the expiry of the BWP inactivity timer until the beginning of the slot where the UE can transmit/receive.

FIG. 1 is a graph 100 illustrating a subband non-overlapping scheme for full-duplex operation 100.

Referring to FIG. 1, a subband non-overlapping scheme may be used to realize some of the benefits of a full duplex operation mode while maintaining reasonable implementation overhead. In this scheme, a first portion of time-frequency resources is used for the DL 101/UL 102, while the remaining time-frequency resources are used for the UL 102/DL 101, as illustrated in FIG. 1. Herein, non-overlapping indicates that the UL 102 and DL 101 are not on the same frequency resources, whereas overlapping indicates that the UL 102 and DL 101 are at least partly on the same frequency resources.

In this case, it is important to define these portions and introduce manners to provide the UE with their configurations. Further enhancements may also be needed for scheduling within the subband non-overlapping due to its relatively smaller bandwidth than the operating width if the subband is not used and legacy TDD is deployed.

For an unpaired spectrum, a DL BWP and a UL BWP with the same IDs are linked together and shall have the same center frequency. As such, there is a need in the art for a defined relationship between the non-overlapping portion of the UL/DL subband (i.e., the UL subband or DL subband) and the associated DL/UL BWP (i.e., the DL BWP or UL BWP).

In addition to configuring the UL/DL subband, there is a need in the art for enhanced scheduling the DL/UL around the configured UL/DL subband to accommodate the non-continuity of the available RBs due to the presence of the UL/DL subband. This is of particular importance for resource allocation Type 1, which relies on indicating the start and length of the grant in the frequency domain.

Accordingly, the present disclosure has been made to address at least the above-mentioned problems and/or disadvantages and to provide at least the advantages described below.

An aspect of the present disclosure is to provide procedures to define the UL/DL subband as a region of a continuous number of resource blocks (RBs).

Another aspect of the present disclosure is to provide procedures to define the UL/DL subband in the frequency domain, based on an offset relative to the associated BWP or Point A, an indication of the subband width as the number of RBs, and to change the provided subband configurations semi-statically or dynamically.

Another aspect of the present disclosure is to define the UL/DL subband in the time domain, based on slot format indication by higher layer signaling of the slot indication or a GC-PDCCH.

In accordance with an aspect of the disclosure, a method includes identifying, by a UE, a UL or DL subband configuration provided from a gNB to the UE and determining a priority between a UL transmission and a DL reception based on whether a collision between DL and UL operations occurs in a time domain, wherein the UE is a half-duplex UE which performs the UL transmission at different times than when the UE performs the DL reception.

BRIEF DESCRIPTION OF THE DRAWINGS

In the following section, the aspects of the subject matter disclosed herein will be described with reference to exemplary embodiments illustrated in the figures, in which:

FIG. 4 illustrates a period of a DL/UL pattern, according to an embodiment;

DETAILED DESCRIPTION

Figure 1:
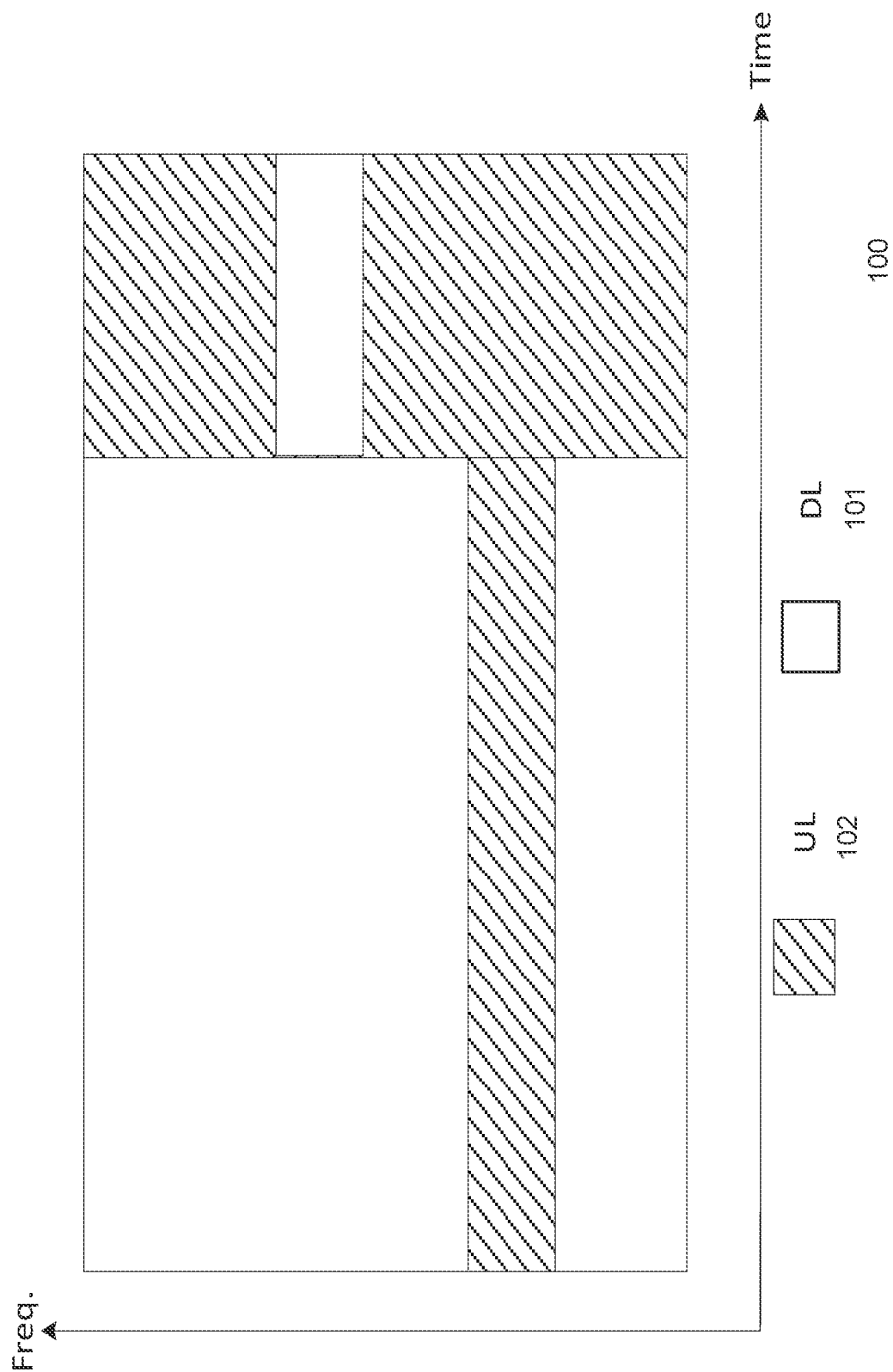
FIG. 1 is a graph 100 illustrating a subband non-overlapping scheme for full-duplex operation.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Defining the UL/DL subband(s) within the DL/UL portions, respectively, in TDD operation mode assists in revealing the benefits of full-duplex operation while minimizing the implementation complexity. The non-overlapping the UL/DL subband may include a contiguous or non-contiguous number of RBs used for the UL/DL transmission while the remaining RBs in the same orthogonal frequency domain multiplexing (OFDM) symbol, slot, subframe, etc., are used for the DL/UL transmission, respectively. The same RBs can be used DL/UL simultaneously in an overlapping the UL/DL subband scheme.

The present disclosure sets forth solutions developed for capable UEs, such as full duplex UEs, which can be applied for half-duplex UEs with some restrictions. A half-duplex UE does not expect to transmit and receive on the symbols, even if UL/DL subband is confined within a DL BWP and UL BWP, respectively. Though this restriction can be imposed by a gNB, it is challenging to ensure that no collisions occur. Hence, at least one of the following prioritization/dropping/cancelation rules may be applied.

A purpose for introducing the UL/DL subband is to reduce the latency of UL transmission/DL reception. Therefore, for a UL subband within a DL BWP or a carrier, the UE transmits the indicated UL transmission (e.g., configured by higher layer signaling, indicated by DCI, RAR UL grant, fallbackRAR UL grant, successRAR, etc.) and does not receive the DL which overlaps with any symbols used for the UL transmission within the UL subband. However, for a DL subband within a UL BWP, when a conflict occurs between DL reception (e.g., configured by higher layer, indicated by DCI, etc.) in the DL subband and UL transmission in the UL BWP or a carrier, the UE may cancel or partially cancel UL transmission within the UL BWP to receive the DL within the DL subband. This cancelation can be subject to UE capability and according to a particular timeline. For example, this may be similar to the cancellation timeline/capability when conflict occurs between RRC UL transmission and dynamic DL reception.

The UE's behavior may also be determined based on whether the grant is dynamic or configured by higher layer signaling. Dynamic scheduling may have higher priority to be transmitted/received than receiving/transmitting a transmission configured by higher layer signaling. In addition, in a DL BWP, if a UE is configured by higher layer signaling to receive a DL transmission within a set of symbols and receives dynamic UL grant scheduling within the UL transmission of a subband in any symbol in this set, the UE does not receive the DL transmission in the DL BWP and transmits on the UL within the UL subband.

For example, the UE may be configured to receive a semi-persistent scheduling (SPS) PDSCH, and a periodic CSI-RS in the legacy DL BWP and to receive a dynamic UL transmission such as a PUSCH, an SRS, or a PUCCH that fully or partially overlap in the time domain. In this case, the UE transmits the dynamic UL transmission and cancels the DL reception. Another example for a DL signal configured by the higher layer is a synchronization signal block (SSB) which may require special treatment because the UE may need the SSB for synchronization or assessing the link quality. Also, a CSI-RS is used for assessing the beam quality and declaring the beam failure. For such an important configured RS, the UE may not expect a collision to occur between dynamic UL transmission in the UL subband and such important RSs in the legacy DL BWP.

However, the UE may be configured to statically or semi-statically transmit a UL in the UL subband such as configured UL grant type 1 by RRC or configured UL grant 2 activated by a medium access control-control element (MAC-CE), periodic SRS, semi-persistent SRS, etc. In fully or partially overlapped symbols, the UE may be scheduled to receive dynamic DL transmission such as a PDSCH or a dynamic CSI-RS. In this case, the UE may cancel the UL transmission subject to a defined timeline and capability as those applied for the UL cancellation, and instead, receive the DL transmission.

A similar approach can be applied when a conflict occurs between a dynamic DL within a DL subband and a UL transmission configured by higher layer signaling in legacy UL BWP. In this case, the UE may cancel a UL transmission subject to a defined set timeline and capability as those applied for UL cancellation. Some exception may be applied as well for important UL transmission configured by higher layer signaling. For example, if the RACH occasion associated with beam failure recovery request collides with a dynamic DL with the DL subband, the UE may still prioritize the transmission of the beam failure recovery request in the legacy UL BWP.

The UE does not expect a collision to occur between dynamic DL reception and dynamic UL transmission.

Alternatively, the UE's behavior may depend on the indicated/configured priority of the conflicting transmissions. For example, if the UL transmission within a UL subband (irrespective of whether the UL subband is dynamically scheduled or configured by higher layer signaling) has higher priority than a DL reception within a DL BWP, the UE may transmit the UL and cancel DL reception. Similarly, if the DL reception within a DL subband (irrespective of whether the DL subband is dynamically scheduled or configured by higher layer signaling) has higher priority than a UL transmission within a UL BWP, the UE may receive the DL and cancel UL transmission according to a particular timeline/capability as described herein.

The priority for each transmission or reception may be determined in a similar manner as the legacy approaches based on two priority levels (high and low) which can be indicated dynamically or by higher layer signaling. However, in legacy NR, the assigned priority indication is used to compare the priority of the transmission in a particular direction. In other words, low and high priority are used to compare between different DL or UL transmissions, not to compare the DL with the UL or vice versa. This concept can be further extended to allow the comparison between DL and UL. For example, in DL reception indicated as high priority, the UE may assume this DL has higher priority than the UL transmission indicated as low priority. Similarly, in UL transmission indicated as high priority, the UE may assume this UL transmission has higher priority than the DL reception indicated as low priority. Also, some predefined signals/channels may have high priority such as common signals and channels including SSB, RMSI, RACH, etc.

The prioritization/dropping/cancelation rules may be applied, even if there is no conflict between active DL reception and UL transmission, which may be beneficial when the subband is shared by multiple UEs. Even if a particular UE has no UL transmission or DL reception in the UL or DL subband, other UEs may have such UL transmission or DL reception. In this case, if the UE is configured by higher layer signaling to transmit or receive on a regular (i.e., legacy) DL BWP or UL BWP, and that transmission or reception partially or fully overlaps in the frequency domain and/or time domain with the configured UL or DL subband, respectively, the gNB will be unable to execute both transmission directions under the non-overlapping UL/DL subband framework. For example, if a set of symbols/slots is indicated as the DL on a legacy DL BWP and some are indicated as the UL subband, the UE may cancel the DL reception configured by higher layer signaling in any of these symbols/slots even if no conflict exists with UL transmission in the UL subband.

This rule may be applied when the configured DL reception partially or fully overlaps with the RBs configured within the UL subband. However, if allocated RBs for the DL reception do not overlap with UL subband, the UE may receive the DL transmission when no conflict exists with an active UL transmission within the UL subband. For example, when some SPS PDSCH occasions collide with a UL subband, the UE may not receive those occasions. Similarly, the UE may not receive periodic CSI-RS or semi-persistent CSI-RS that collides with the UL subband. The UE may not expect important signals and channels such as the SSB and CSI-RS used for assessing beam quality to collide with the UL subband.

This rule may be applied irrespective of whether the configured DL reception partially or fully overlaps with the RBs configured within the UL subband. This may be beneficial if the UE is unaware of the frequency domain location of the subband at this point.

Though in this example, the cancelation of configured DL reception on the legacy DL BWP is described, the same concept can be extended for configured UL transmission on the legacy UL BWP when it partially or fully overlaps with the RBs configured within the DL subband following a particular timeline or according to UE capability as those applied for UL cancellation. A similar exception may be applied for an important configured UL. For example, the UE may expect a RACH occasion in legacy UL BWP used for initial access or beam failure recovery request to collide with the DL subband.

Compared to the previously described method, which affords a higher priority for the transmission or reception on a UL or DL subband, respectively, the converse is also valuable in some scenarios where operation on a subband is less important compared with operation on a legacy BWP. For example, if a set of symbols/slots is indicated as the DL on a legacy DL BWP and some of the symbols or slots are indicated as the UL subband, the UE may cancel the UL transmission configured by higher layer signaling in any of these symbols/slots, even if there is no conflict with DL reception in the legacy DL BWP. This is also beneficial in some situations when the gNB turns off the UL subband as described later herein.

UL/DL Subband as a Region

Configurations and Signaling

The UL/DL subband may be defined as a region of a contiguous number of RBs associated with a UL/DL BWP, respectively. This framework is beneficial due to its simplicity by defining only a few contiguous RBs to be used as a subband.

This association may be used to determine the frequency domain position of the UL/DL subband relative to the associated UL/DL BWP and based on the numerology of that BWP, respectively. For example, a frequency domain offset may exist between particular points in the UL/DL subband and another point in the associated UL/DL BWP, respectively. The reference point can be the first PRB, last PRB, the center RE, etc. The offset value may be indicated through higher layer signaling, such as an RRC parameter subband offset, to provide the gNB with the flexibility to configure the subband in the frequency domain. Also, if a UL/DL subband is used during an RRC idle/inactive state, such an offset may be transmitted in remaining system information (RMSI), other system information (OSI), etc.

The offset value may be predefined, such as in a specification, to reduce the signaling overhead. For example, the offset may be zero, i.e., the start of the UL/DL subband is aligned with the start of the associated UL/DL BWP, or the center frequency of the UL/DL subband and the associated UL/DL BWP may be identical.

Figure 2:
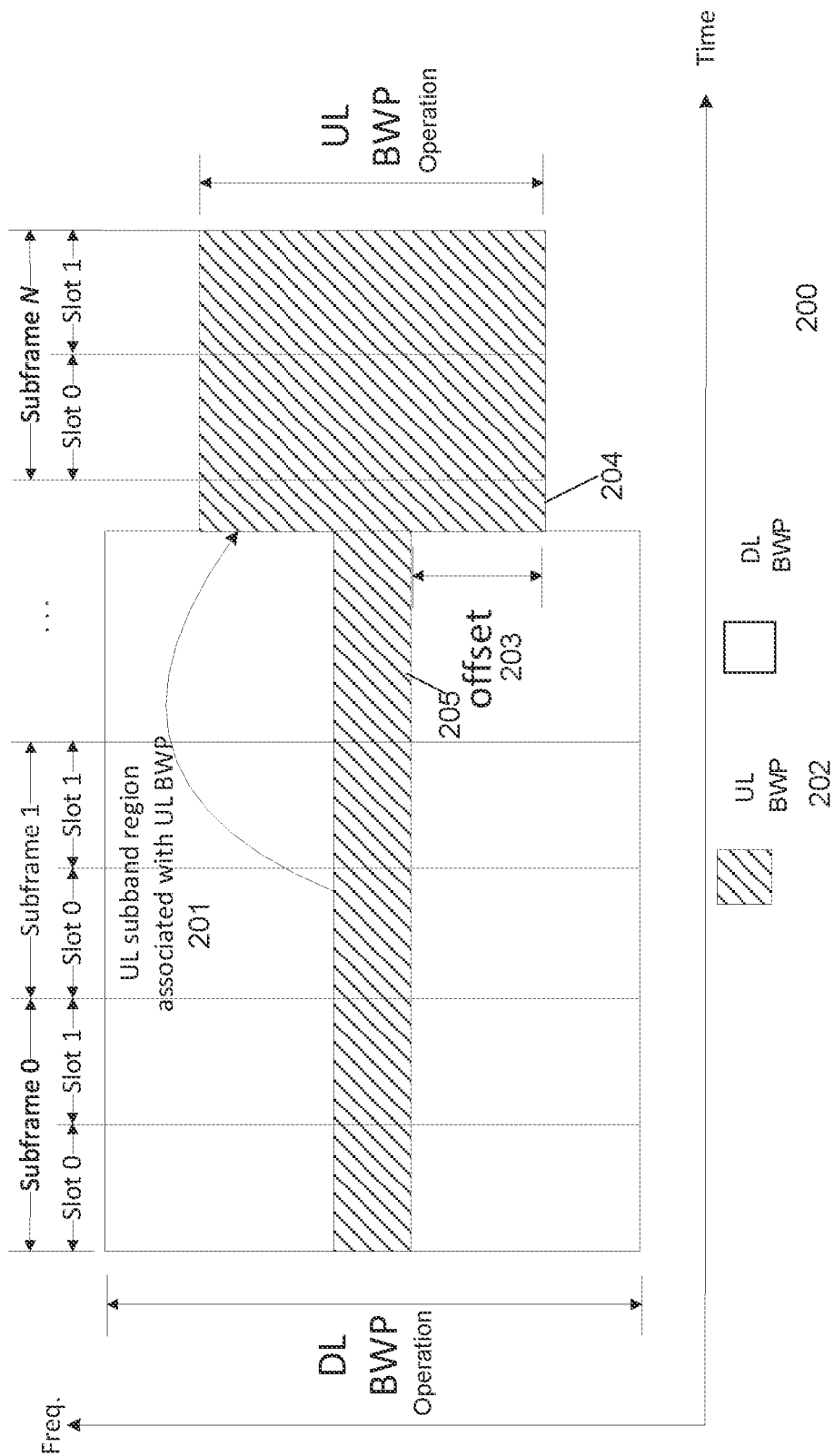
FIG. 2 is a graph 200 illustrating a UL subband position determination based on an offset from the associated UL BWP, according to an embodiment.

FIG. 2 is a graph 200 illustrating a UL subband position determination based on an offset from the associated UL BWP 202, according to an embodiment. In particular, FIG. 2 illustrates an example in which a UL subband region 201 is associated with a UL BWP 202.

Referring to FIG. 2, the position of the UL BWP 202 in the frequency domain is provided as an offset 203 from the first RB of the UL BWP 204 to the first RB of the UL subband 205 based on the UL BWP numerology.

The UL/DL subband is defined as a region of contiguous RBs. Its frequency domain position is determined relative to the associated UL/DL BWP, respectively.

For capable UEs, such as large form-factor UEs that may operate in full duplex mode, a UL/DL subband will fall in an active DL/UL BWP, respectively. For these UEs, a UL/DL subband may be associated with an active DL/UL BWP, respectively, not a UL/DL BWP. In this case, the position of the UL/DL subband may be relative to the associated active DL/UL BWP, instead of the UL/DL BWP, may be based on their numerology, and may be configured as previously described herein.

To simplify the implementation of a full duplex UE, some restrictions may be applied for the UL transmission and DL reception that occur on the same symbols. For example, the UL transmission and DL reception should have the same numerology.

In general, for half-duplex or full duplex UEs and to simplify their implementation, the numerology used for transmission/reception on the UL/DL subband may be restricted to be identical to the numerology used for the associated UL/DL BWP or DL/UL BWP.

For capable UEs, a UL/DL subband may be associated with an active DL/UL BWP, respectively, not a UL/DL BWP.

The numerology used for used for transmission/reception on the UL/DL subband may be identical to the one used for the associated UL/DL BWP or DL/UL BWP.

In either case, the offset 203 may be relative to another point that is unnecessary in the associated DL/UL BWP but the offset 203 can be associated with the carrier that contains the subband. For example, the reference point may be relative to Point A and the offset is determined based on the numerology of the associated BWP. This may be beneficial as the frequency domain location of the subband is independent of the BWP location, rendering it unnecessary for the offset 203 to be transmitted for each configured BWP. In other words, the offset 203 may be from the beginning or the center of the UL/DL subband to point A, for example. Also, the offset 203 may be relative to the beginning of the carrier or any reference point within the carrier. For example, the UL/DL subband may have the same center frequency as the containing carrier.

Point A may be used as a reference point for offset determination of the UL/DL subband.

The length of the UL/DL subband (number of PRBs) may be configured separately through higher layer signaling, such as RRC parameter subband length, or indicated in RMSI or OSI, so as to provide maximum flexibility to separately indicate the start and length of the subband. Alternatively, the offset and length of the UL/DL subband can be jointly indicated using the resource indication value (MV) method that is used to indicate that start and length of the BWP. Joint indication by the MV method reduces the number of bits needed to signal the start and length of the UL/DL subband. The RIV value may be indicated through higher layer signaling, such as RRC parameter subband_Start_length, or indicated in RMSI or OSI.

The length and start of the UL/DL subband may be separately or jointly indicated.

The start and length of the UL/DL subband (number of PRBs) may be adapted semi-statically or even dynamically to avoid RRC reconfiguration and the associated latency each time the configurations of the subband need to be updated. For example, a gNB may provide a UE with multiple lengths of the UL/DL subband through RRC and down-select through a MAC-CE, i.e., (RRC+MAC-CE). Alternatives such as RRC+DCI or RRC+MAC-CE+DCI may also be used. Such an approach is beneficial to enabling the gNB to expand or contract the bandwidth of the UL/DL subband as needed. A particular timeline can be applied to determine when the new configurations may be applied. For example, when there is a MAC-CE indication, the new configurations may be applied in the first slot after slot $n+3N_{slot}^{subframe,\mu}$ where n is the slot for the HARQ-Ack of the MAC-CE. For DCI-based adaption, the new configurations may be applied in the first symbol after m symbols from the last symbol after the CORESET carrying the DCI, for example.

The length and start of the UL/DL subband may be adjusted semi-statically (MAC-CE), or dynamically by DCI. The length of the UL/DL subband may be indicated by using the index of the last RB in the UL/DL subband, instead of indicating the number of RBs within the UL/DL subband. Therefore, another offset value may be configured to indicate the index of the last RB relative to a particular BWP or carrier. The same solutions described for configuring the offset value indicating the start of the subband can be easily extended to the offset value used for indicating the last RB in the subband.

The maximum number of possibly configured subbands may be predefined to avoid any signaling overhead or may be indicated as part of UE capability signaling to support different UE capabilities. This limit can be per cell, per BWP, per band, or per transmission direction (e.g., the maximum number of UL subbands may differ from that of DL subbands), for example.

If multiple subbands can be configured in one or more of these manners, then the gNB may instruct the UE to use a particular subband. This instruction can be through one or more of RRC, MAC-CE, and DCI. For example, if a particular BWP is associated with three subbands, then the gNB can indicate which subband is to be used when this BWP is active.

A default subband among the configured subbands can be defined based on some rules, such as the subband with the lowest index, the smallest bandwidth (number of PRBs), or the closest center frequency to the center frequency of the associated BWP. This may be beneficial when the UE does not receive an indication of which subband is to be used, or if the UE somehow misses the gNB's indication.

It may be beneficial to restrict the number of simultaneously active UL subbands to be one at any time instant to simplify UE implementation. This differs from a legacy BWP; for example, a full duplex UE may simultaneously have an active DL BWP and an active UL subband. However, capable UEs may support multiple active UL subbands that have the same or different center frequencies. The same rules regarding the number of active UL subbands can be applied to the DL subbands. The UE may not expect to have a UL subband and DL subband on the symbol.

The UE may indicate whether it supports UL/DL subband operation as part of its capability report.

To define the UL/DL subband region in time domain, one or more of the following solutions may be applied.

Slot Format-Based Indication

In legacy NR, a gNB can use tdd-UL-DL-ConfigurationCommon and/or tdd-UL-DL-ConfigurationDedicated and/or DCI format 2_0 to provide a UE with the slot format to determine the slot format and activate either DL/UL BWP. With the introduction of the UL/DL subband, if a set of symbols of a slot is indicated as or inferred to be the UL, it is unclear whether the UE should activate the UL BWP or UL subband. The same applies for the DL, i.e., if a set of symbols of a slot is indicated as or inferred to be the DL, it is unclear whether the UE should activate the DL BWP or DL subband. The symbols inferred as the DL or UL may be originally configured/indicated as a flexible symbol. Based on the scheduled/configured DL/UL channels (PDSCH/PUSCH/PRACH, etc.) and DL/UL signaling (CSI-RS, SRS, SSB, etc.), the UE can infer whether these symbols may be considered as the DL or UL.

New states may be provided that correspond to the UL/DL subband in addition to downlink (D), uplink (U) and flexible (F). For example, there may be a subband for the UL (SU) and subband for the DL (SD). Based on the provided configurations, such as tdd-UL-DL-ConfigurationCommon and/or tdd-UL-DL-ConfigurationDedicated and/or DCI format 2_0 providing the slot format, a UE can determine at which symbol/slot/subframe/frame the UL/DL subband should start or end.

Figure 3:
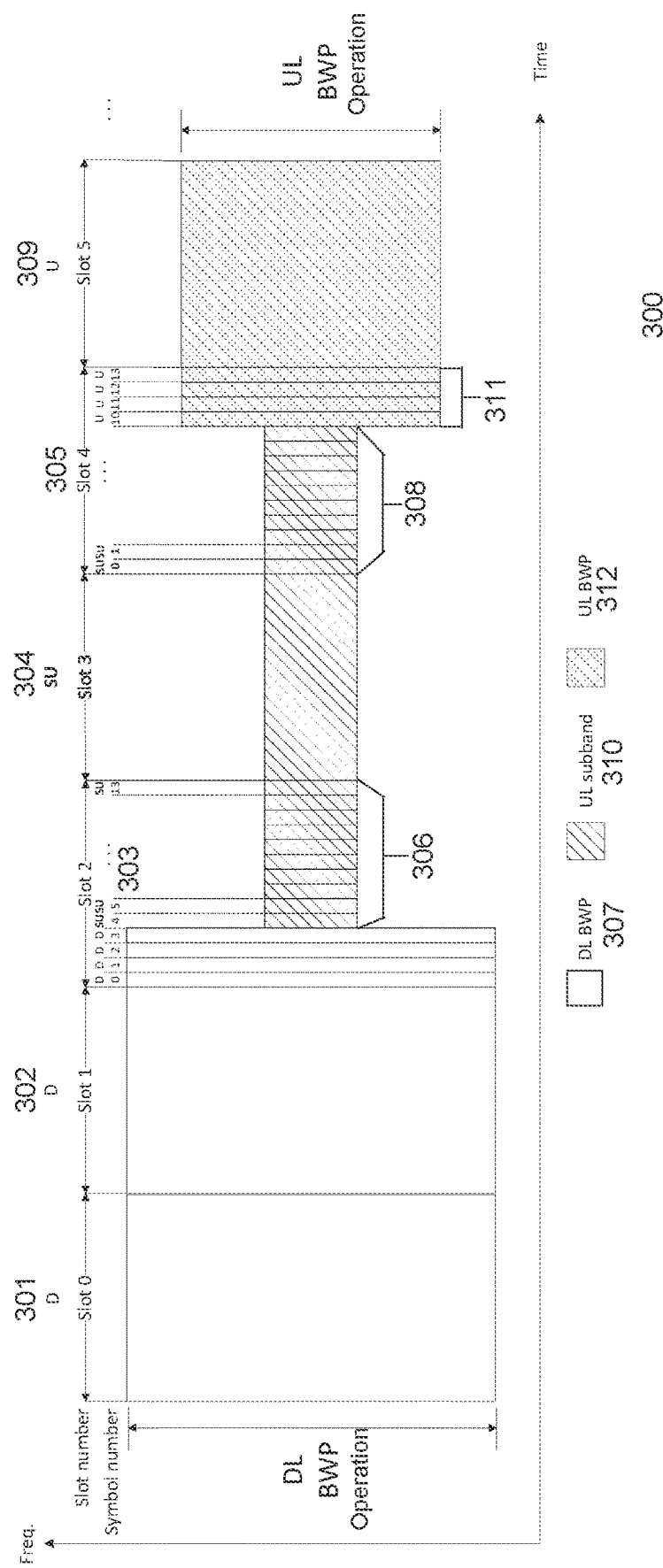
FIG. 3 is a graph 300 illustrating a UL subband configuration provided as part of a slot format configuration, according to an embodiment.

FIG. 3 is a graph 300 illustrating when, in Slot 0 301, Slot 1 302 and OFDM symbols 0-3 303 of Slot 2 304 are indicated as the DL BWP 305, according to an embodiment.

Referring to FIG. 3, for Slot 0 301, Slot 1 302, and OFDM symbols 0-3 of Slot 2 303, the UE expects to receive the DL transmission within the bandwidth of the active DL BWP 305. Thereafter, OFDM symbols 4-13 306 of Slot 2 303, Slot 3 304 and OFDM symbols 0-9 308 of Slot 4 305 are indicated as the UL subband 310. In this set of OFDM symbols, the UE expects to transmit a UL transmission with a bandwidth that does not exceed the bandwidth of the UL subband 310. OFDM symbols 10-13 311 of Slot 4 305 and Slot 5 309 are indicated as a legacy UL BWP 312. In other words, in this set of OFDM symbols, the UE expects to transmit a UL that falls within the UL BWP 312 which is wider than the UL subband 310.

In addition to slot formats denoted by D, U, and F, disclosed herein are new slot format states, i.e., UL subband and DL subband, to indicate where the UL/DL subbands start and end.

A gNB may provide a UE with information about which symbols/slots are configured as the UL/DL subband through higher layer signaling. For example, such information may be provided as part of tdd-UL-DL-ConfigurationCommon and/or tdd-UL-DL-ConfigurationDedicated. RRC parameters such as nrofDownlinkSubbandSlots, nrofDownlinkSubandSymbols, nrofUplinkSubbandSlots, or nrofUplinkSubbandSymbols can be used as follows.

Based on Tdd-UL-DL-ConfigurationCommon:

Configuring a subband using common signaling is beneficial to reduce the signaling overhead as this signal is simultaneously received by multiple UEs.

The tdd-UL-DL-ConfigurationCommon IE referenced herein may be identical to the same IE used in legacy NR in either ServingCellConfigCommon or ServingCellConfigCommonSIB. To avoid impacting legacy UEs, the disclosed IE can differ from the used in legacy NR. Though the IE is labeled herein as tdd-UL-DL-ConfigurationCommon, the IE may have a different name, such as ConfigurationCommonSubband, than the IE used by legacy NR. For example, ServingCellConfigCommon or ServingCellConfigCommonSIB may be referred to as at least one of tdd-UL-DL-ConfigurationCommon and tdd-UL-DL-ConfigurationCommonSubband. The disclosed slot format states may be included in the latter, while the former may follow the legacy signaling procedure.

For the UL Subband:
  nrofUplinkSubbandSlots indicates the number of full slots to be used by the UL subband; and
  nrofUplinkSubbandSymbols indicates the number consecutive symbols to be used by UL subband symbols.

The locations of slots/symbols used for the UL subband can be anywhere within the period in which slot configurations are provided by tdd-UL-DL-ConfigurationCommon, for example.

FIG. 4 illustrates one period of DL/UL pattern, according to an embodiment.

Referring to FIG. 4, pursuant to the legacy procedure, the slots/symbols used for the DL BWP 401 and 402 are defined at the beginning of the period. Similarly, the slots/symbols used for UL BWP 403 and 404 are defined at the end of the period. The slots/symbols used for a UL subband 405, 406, and 407 precede the slots/symbols for the UL BWP 403 and 404. The remaining symbols/slots without indication 408, i.e., which are not indicated as a DL/UL for the DL/UL BWP or as a UL for an uplink subband, are considered as flexible.

Although in the example of FIG. 4, the symbols/slot for the UL subband 405, 406, and 407 precede the symbols/slots for the UL BWP 403 and 404, the symbols/slot for the UL subband 405, 406, and 407 may be after the symbols/slots for the DL BWP 401 and 402 (preceding flexible symbols 408, if any). In this case, separate higher layer parameters may indicate symbols/slots for a UL subband 405, 406, and 407 that follow the slots/symbols for the DL BWP 401 and 402, indicated by nrofDownlinkSlots/nrofDownlinkSymbols, or that precede the slots/symbols for the UL BWP 403 and 404, indicated by nrofUplinkSlots/nrofUplinkSymbols.

For example, the following RRC parameters can be used nrofUplinkSubbandSlotsAfterDL, nrofUplinkSubbandSymbolsAfterDL, nrofUplinkSubbandSlotsBeforeUL, and/or nrofUplinkSubbandSymbolsBeforeUL. This provides more flexibility in indicating the symbols/slots used for the UL subband 405, 406, and 407 with the additionally introduced signal.

For the DL subband: the same approach as that used to configure symbols/slots for the DL subband can be applied.

New higher layer signaling is disclosed herein to indicate the number of slots/symbols to be used as the UL/DL subband within the DL-UL pattern period based on tdd-UL-DL-ConfigurationCommon.

Symbols/slots for the UL subband can be after the symbols/slots indicated as the DL by nrofDownlinkSymbols/ nrofDownlinkSlots, or before the symbols/slots indicated as the UL by nrofUplinkSymbols/nrofUplinkSlots.

Based on Tdd-UL-DL-ConfigurationDedicated:

In contrast to tdd-UL-DL-ConfigurationCommon, which is cell specific and common for all UEs in the cell, a gNB can override the flexible symbols through UE-specific signaling, i.e., tdd-UL-DL-ConfigurationDedicated. This is beneficial as the UL/DL subband can be adjusted based on service requirements for each individual UE.

Further enhancements may be provided for this IE to allow the gNB to indicate the UL/DL subband as well, in addition to the legacy UL/DL. For example, TDD-UL-DL-SlotConfig can indicate the entire slot is for the UL/DL subband using RRC parameters allUplinkSubband and allDownlinkSubband. For symbol level granularity, the gNB may indicate the number of symbols to be used as the UL/DL subband. For example, nrofDownlinkSubbandSymbols may indicate the number of consecutive symbols for the DL subband that follow the number of DL symbols indicated by nrofDownlinkSymbols, if configured.

Otherwise, nrofDownlinkSubbandSymbols may indicate the number of consecutive symbols for the DL subband from the beginning of the slot. Similarly, nrofUplinkSubbandSymbols may indicate the number of consecutive symbols for the UL subband that precede the number of the UL symbols indicated by nrofUplinkSymbols, if configured.

Otherwise, nrofUplinkSubbandSymbols may indicate the number of consecutive symbols at the end of the slot.

Table 1 below illustrates disclosed RRC parameters, i.e., configuring the UL/DL subband based on tdd-UL-DL-ConfigurationDedicated. It is noted that additional RRC parameters can be introduced to define a UL/DL subband before/after the flexible symbols.

TABLE 1

```
TDD-UL-DL-SlotConfig ::=        SEQUENCE {
  slotIndex                       TDD-UL-DL-SlotIndex,
  symbols                         CHOICE {
    allDownlink                     NULL,
    allUplink                       NULL,
    allDownlinkSubband              NULL,
    allUplinkSubband                NULL,
    explicit                        SEQUENCE {
      nrofDownlinkSymbols             INTEGER
                                      (1..maxNrofSymbols-1)
OPTIONAL, -- Need S
      nrofDownlinkSubbandSymbols      INTEGER
                                      (1..maxNrofSymbols-1)
OPTIONAL, -- Need S
      nrofUplinkSubbandSymbols        INTEGER
                                      (1..maxNrofSymbols-1)
OPTIONAL -- Need S
      nrofUplinkSymbols               INTEGER
                                      (1..maxNrofSymbols-1)
OPTIONAL -- Need S
}
```

A gNB can indicate the symbols for the UL/DL subband to the UE through a bitmap of length 14 bits, for example. The gNB can flexibly indicated which symbols are for the UL/DL subband. There may be a bitmap for the symbols for the UL subband and another bitmap for the DL subband. For example, if the bit for a symbol is set to 1, the symbol is used for the UL subband or DL subband, respectively. These bitmaps may override the symbols indicated for the DL/UL based on an active legacy DL/UL BWP. For example, if nrofDownlinkSymbols indicates that the first four symbols are DL based on an active legacy DL BWP, and the bitmap corresponding to the DL subband indicates that any of these symbols is for the DL subband, the UE can assume that these symbols are for the DL subband and are not based on the active legacy DL BWP.

New higher layer signaling is disclosed to indicate which slots or the symbol within a slot are used as the UL/DL subband within the DL-UL pattern period based on tdd-UL-DL-ConfigurationDedicated.

The UE does not expect that any symbol/slot indicated to be downlink or uplink based on a legacy active DL or UL BWP, by tdd-UL-DL-ConfigurationCommon to be indicated as the uplink or downlink subband by tdd-UL-DL-ConfigurationDedicated.

However, any symbol/slot indicated to be downlink or uplink based on the legacy active DL or UL BWP, by tdd-UL-DL-ConfigurationCommon may be indicated as downlink or uplink subband by tdd-UL-DL-ConfigurationDedicated.

As another example, the symbols indicated as D or U by tdd-UL-DL-ConfigurationCommon cannot be changed to SD (subband for the downlink) or SU (subband for the uplink), respectively, by tdd-UL-DL-ConfigurationDedicated.

An RRC IE tdd-UL-DL-ConfigurationDedicated does not change the transmission directions explicitly indicated by tdd-UL-DL-ConfigurationCommon. However, for the same transmission direction, tdd-UL-DL-ConfigurationDedicated can override tdd-UL-DL-ConfigurationCommon from the legacy active DL/UL BWP to the DL/UL subband.

In legacy NR, if a UE is not configured to monitor DCI format 2_0, for the symbols indicated as flexible based on tdd-UL-DL-ConfigurationCommon or tdd-UL-DL-ConfigurationDedicated, the UE can receive a PDSCH/CSI-RS based on the scheduling DCI or transmit a PUSCH, a PUCCH, a PRACH, or an SRS based on indication received in the DCI, RAR, etc. With the introduction of the UL/DL subband, it is unclear whether the transmission/reception may be confined within the UL/DL subband or regular active UL/DL BWP.

Herein, if a UE is configured with a UL/DL subband, the UE may assume that UL transmission or DL reception will occur within the UL or DL subband on the flexible symbols.

To provide additional flexibility to the gNB, if a UE receives indication for the DL reception or UL transmission on any symbol of the flexible symbols set that is wider than the DL or UL subband, the UE expects to operate based on the legacy active UL/DL BWP.

For flexible symbols and when a UE is not configured to receive DCI 2_0, the UE expects to operate based on the bandwidth UL/DL subband if these subbands are configured.

For flexible symbols and when a UE is not configured to receive DCI 2_0, the UE operates on based on the legacy UL/DL BWP if the bandwidth of the indicated transmission or reception is wider than the configured UL or DL subband.

Based on DCI 2_0:

Slots/symbols to be used as a UL/DL subband may be indicated through a GC-PDCCH, such as an SFI-index field in DCI 2_0. This provides the gNB with the ability to adjust the slot format dynamically with lower latency compared with the solutions based on higher layer signaling. To this end, the reserved values of Table 11.1.1-1 in TS 38.213 may be used to indicate the symbols used for SU and SD, in addition to F and D/U which are mainly defined relative to the legacy active DL BWP or UL BWP. Table 2 below illustrates values to be added to above-described Table 11.1.1-1.

TABLE 2

| 53 | D | D | F | F | F | F | U | D | D | F | F | F | F | U |
|----|---|---|---|---|---|---|---|---|---|---|---|---|---|---|
| 54 | F | F | F | F | F | F | F | D | D | D | D | D | D | D |
| 55 | D | D | F | F | F | U | U | U | D | D | D | D | D | D |
| 56 | D | D | SD | SD | F | F | F | SU | SU | SU | U | U | U | U |
| 57 | SD | SD | SD | SD | SD | SD | SD | SD | SD | SD | SD | SD | SD | SD |
| 58 | SU | SU | SU | SU | SU | SU | SU | SU | SU | SU | SU | SU | SU | SU |
| 59 | SD | SD | SD | F | F | F | F | F | F | SU | SU | SU | SU | SU |
| . | . | . | . | . | . | . | . | . | . | . | . | . | . | . |
| . | . | . | . | . | . | . | . | . | . | . | . | . | . | . |
| . | . | . | . | . | . | . | . | . | . | . | . | . | . | . |
| xx-254 | | | | | | Reserved | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

Specifically, Table 2 illustrates a slot format for a normal cyclic prefix (CP). For DCI 2_0, SU and SD are introduced in addition to D/F/U by exploiting the reserved values.

For a set of symbols of a slot that is indicated as downlink or uplink by tdd-UL-DL-ConfigurationCommon, or tdd-UL-DL-ConfigurationDedicated, the UE does not expect to detect a DCI format 2_0 with an SFI-index field value indicating the set of symbols of the slot as the uplink subband or downlink subband, respectively. In other words, DCI 2_0 does not change the transmission directions indicated by tdd-UL-DL-ConfigurationCommon, or tdd-UL-DL-ConfigurationDedicated.

However, for the same transmission direction (DL/UL), DCI 2_0 can change from "D" for the legacy active DL BWP to downlink subband "SD", and from "U" for the legacy active UL BWP to uplink subband "SU". For flexible symbols determined based on the configurations provided by tdd-UL-DL-ConfigurationCommon, or tdd-UL-DL-ConfigurationDedicated, DCI 2_0 can indicate whether they are SD, SU, D, U, or F.

Alternatively, the symbols indicated as D/U by tdd-UL-DL-ConfigurationCommon, or tdd-UL-DL-ConfigurationDedicated may not be changed to SD/SU, respectively, by DCI 2_0.

DCI 2_0 can override the symbols indicated by tdd-UL-DL-ConfigurationCommon, or tdd-UL-DL-ConfigurationDedicated as D or U to be SD or SU, respectively, but may not change D or U to be SU or SD, respectively.

Regardless of the manner in which the slots/symbols are indicated to be a UL/DL subband, rules regarding whether a UE expects to transmit/receive may be identical to those specified for the legacy UL/DL BWP. However, the distinction is that the UL transmission in the UL subband or DL reception in the DL subband is limited to the bandwidth of the UL or DL subband, respectively.

For flexible symbols and upon the detection of DCI 2_0, the same rules as those defined to determine whether the UE transmits or receives can be applied when the UL/DL subband is configured. The UE may assume that the UL/DL subband is to be applied unless any of the scheduled UL/DL transmission spans a bandwidth that is wider than the bandwidth of the UL/DL subband. In this case, the UE may assume that the legacy active UL/DL BWP is applied.

The UE cancels the reception of a CSI-RS or a PDSCH configured by higher layer signaling when the UE detects DCI 2_0 indicating that the symbols are for an uplink subband, flexible, or UL for the legacy UL BWP or the UE receives indication for the UL transmission.

For the transmission of an SRS, a PUCCH, a PUSCH, or a PRACH configured by higher layer signaling, and when a UE detects DCI 2_0 indicating that symbols are for a downlink subband, flexible, or downlink with a legacy DL BWP, then the same timeline for cancelation/partial cancelation that is used for legacy NR can be applied.

For flexible symbols and when DCI 2_0 is undetected, the same rules as those defined to determine whether the UE transmits or receives can be applied when the UL/DL subband is configured. The UE may assume that the UL/DL subband is to be applied unless any of the scheduled UL/DL transmissions span a bandwidth that is wider than the bandwidth of the UL/DL subband. In this case, the UE may assume that the legacy active UL/DL BWP is applied.

Though it can be understood that a symbol or slot indicated as uplink/downlink for the legacy BWP at any particular signaling stage (tdd-UL-DL-ConfigurationCommon or tdd-UL-DL-ConfigurationDedicated) can be overridden to be a UL/DL subband, respectively, in the subsequent signaling stage (tdd-UL-DL-ConfigurationDedicated or DCI 2_0), the converse may also occur. For example, DCI 2_0 may indicate that symbols or slots that were previously indicated as the UL/DL subband have become uplink/downlink for the legacy BWP. Alternatively, tdd-UL-DL-ConfigurationCommon or tdd-UL-DL-ConfigurationDedicated can (re)configure the symbols or slots by changing them from the UL/DL subband to uplink/downlink for the legacy BWP, respectively.

To configure/indicate the symbols/slots to be used for the UL/DL subband, the UE may be provided with a particular time offset relative to some point in time such as the beginning of radio frame. This solution may be applied on the legacy slot format indicator or any of the slot format indicators disclosed herein. Specifically, the indicated offsets are applied for each configured period of the indicated slot format, e.g., summation of periodicities indicated by pattern1 and pattern2.

Figure 5:
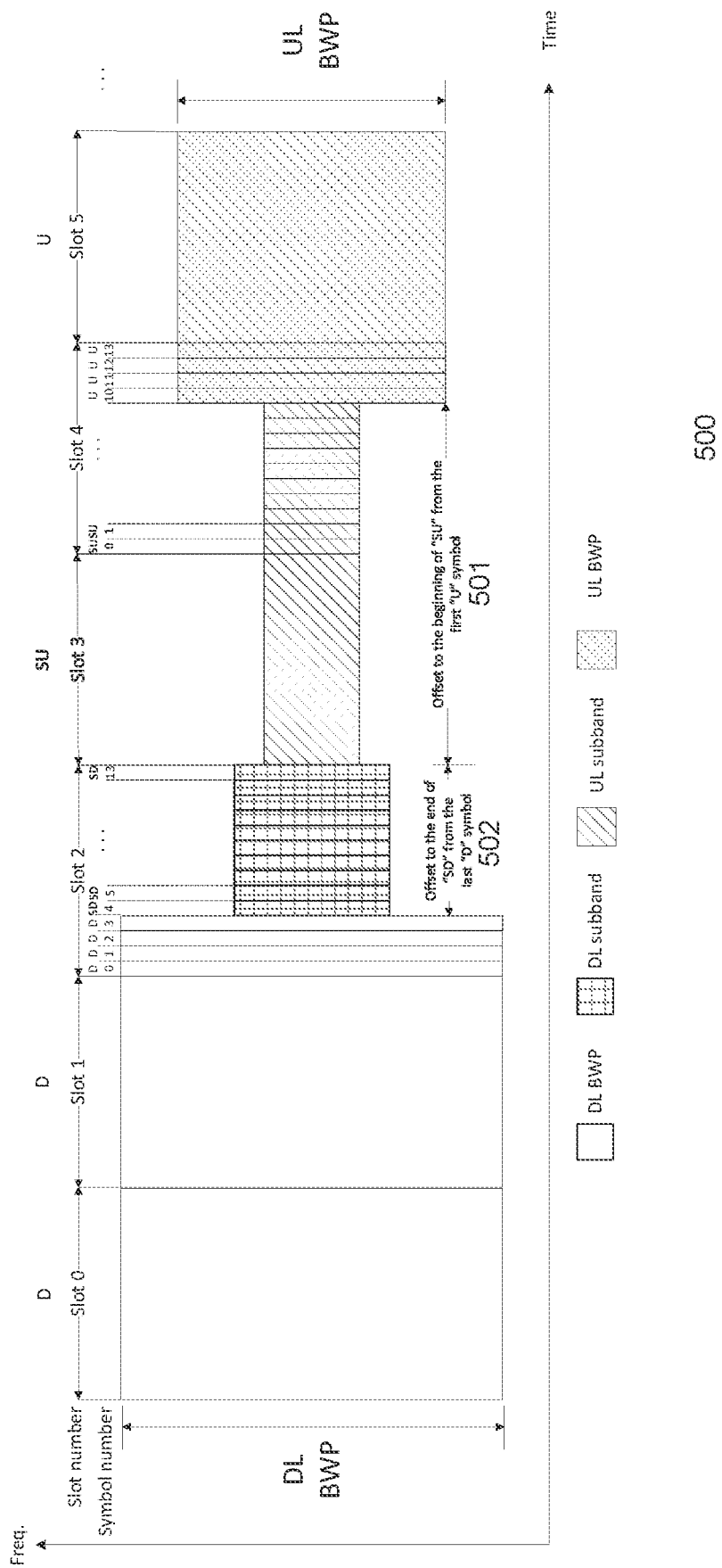
FIG. 5 is a graph 500 illustrating symbols indicated by an offset for an uplink subband (SU) and a downlink subband (SD), according to an embodiment.

FIG. 5 is a graph 500 illustrating symbols indicated by an offset for an SU and an SD, according to an embodiment.

Referring to FIG. 5, an offset 501 configured by higher layer signaling can indicate the beginning of the UL subband relative to the first UL symbol for the legacy UL BWP, and another offset 502 indicates the end of DL subband relative to the last DL symbol for the legacy DL BWP.

The offset values may be configured through higher layer signaling, and multiple values may be provided and down selection is performed by MAC-CE, i.e., RRC+MAC-CE, or a combination of RRC+DCI or RRC+MAC-CE+DCI. The offset value may be indicated by RMSI or OSI, as well.

The beginning of SU 504 or the end of SD 503 can be indicated as an offset relative to the first UL symbol or from the last DL symbol, respectively. The offset value may be provided by higher layer signaling.

Herein, an overlaying signaling procedure is provided in which an overlaying signaling on the legacy signaling is used to indicate the configurations and slot format for the UL/DL subband. This embodiment reduces the impact on legacy UEs and provides the time locations of the UL/DL subband.

This approach can be used by UEs supporting subband full duplex wherein the UE can transmit and receive in the symbol, but in non-overlapping RBs. Moreover, this approach can be applied by a half-duplex UE which is able to either transmit or receive at any particular symbol.

Two separate sets of indicators are provided, wherein the set may contain {tdd-UL-DL-ConfigurationDedicated, tdd-UL-DL-ConfigurationDedicated, DCI format 2_0, or offset value pointing to the start/end of the subband}. One set, i.e., Set 1, is used to indicate D/F/U based on the legacy active DL BWP and UL BWP. In other words, Set 1 may be similar to the legacy slot format indication procedure. Another set (i.e., Set 2) is used to indicate SD/F/SU based on the downlink subband and uplink subband. In this case, indicator Set 2 may act as an overlay signaling to indicate the subband configurations. An additional state can be added to Set 2 to indicate that no subband is configured, denoted by "No", in addition to SD and SU. This new state for indicating no subband, "No", can be introduced in the same procedure as for introducing SD and SU described in this disclosure. Set 2 may indicate the downlink subband and uplink subband by using the newly disclosed symbol/slot formats, e.g., SD or SU, or by using the legacy symbol/slot format, e.g., D or U, as explained herein.

Figure 6:
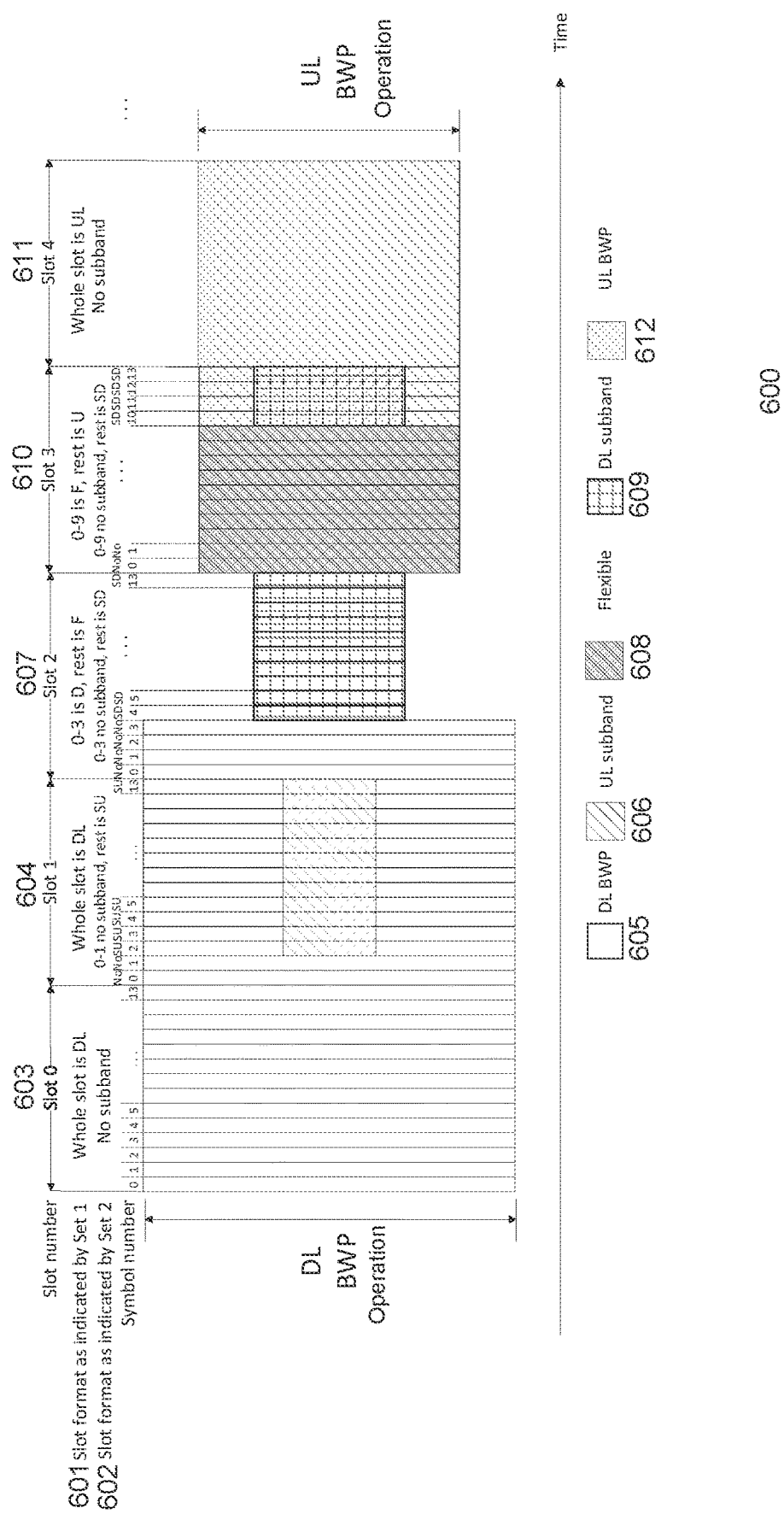
FIG. 6 is a graph 600 illustrating two slot format indicator sets provided to a UE by a gNB in a single DL-UL pattern period, according to an embodiment.

FIG. 6 is a graph 600 illustrating two slot format indicator sets provided to a UE by a gNB in a single DL-UL pattern period, according to an embodiment.

Referring to FIG. 6, the UE can determine the transmission direction by using the slot format indicator sets. Specifically, the slot format indicated by Set 1 601 (hereinafter, Set 1) indicates the operation based on the legacy DL/UL BWP and the slot format indicated by Set 2 (hereinafter, Set 2) is for a subband operation. The indications by Sets 1 and 2 can be overlaid to determine which symbols can be used as a legacy BWP or the subband operation.

In Slot 0 603 and Slot 1 604, Set 1 601 instructs the UE to consider that the entirety of Slot 0 603 and Slot 1 604 is for the DL based on the legacy DL BWP 605. However, for Slot 0 603, Set 2 602 indicates that there is no subband operation and symbols from 2 to 13 are for the UL subband 606 in Slot 1 604. In this case, the UE is instructed to operate as a full duplex device over a non-overlapped UL subband 606 while receiving the DL on the remaining RBs within the legacy active DL BWP 605.

In Slot 2 607, Set 1 601 instructs the UE to operate as the DL in symbols 0-3 based on the legacy active DL BWP and as flexible for the remaining symbols. However, Set 2 602 overrides the flexible symbols to be in the DL subband 609.

In Slot 3 610, symbols 0-9 are instructed to be flexible by Set 1 601 and as no subband by Set 2 602. In this case, these symbols remain flexible and their status is determined as described herein. The remaining symbols in the slot are indicated to be the UL based on the legacy active UL BWP. Concurrently, Set 2 602 indicates the remaining symbols as being on the DL subband 609.

Slot 4 611 is instructed as being the UL by Set 1 601 based on the legacy active UL BWP 612 with no subband operation as instructed by Set 2 602.

The example described in FIG. 6 may be extended to when Set 2 602 uses the legacy symbol/slot format, D, U, or F, to indicate the UL subband or DL subband. Additional symbol/slot formats may be used to indicate no subband. The UE may infer the presence of a subband when Set 2 602 indicates the opposite direction of Set 1 601 to the UE. Specifically, the UE's behavior may be defined by at least one of the following inferences.

For the set of symbols/slots instructed to be D (or U) by Set 1 601 and instructed to be U (or D) by Set 2 602, the UE may infer the presence of the UL (or DL) subband within the legacy DL (or UL) BWP, respectively.

For the set of symbols/slots instructed to be F by Set 1 601 and instructed to be U (D) by Set 2 602, the UE may infer the presence of the UL (DL) subband within the legacy DL (UL) BWP, respectively. Similar to the previous example, Set 2 602 may override the flexible symbols/slots to be the DL or UL subband.

For the set of symbols/slots instructed to be D (or U) by Set 1 601 and instructed to be no subband by Set 2 602, the UE may infer the absence of the UL (or DL) subband within the legacy DL (or UL) BWP, respectively. Indicating no subband in this case may be realized by introducing a new symbol/slot format indicating such as no subband, by the absence of the any instructions based on Set 2 602, or by indicated F by Set 2 602 while D/U by Set 1 601.

For the set of symbols/slots instructed to be F by Set 1 601 and Set 2 602, these symbols remain flexible and their status is determined as described herein.

Throughout the disclosure, indicator Set 2 602 instructing a UE of a set of symbols/slots as UL/DL subband implies either using the new symbol/slot format indicator or legacy symbol/slot format indicator, as described herein.

Figure 7:
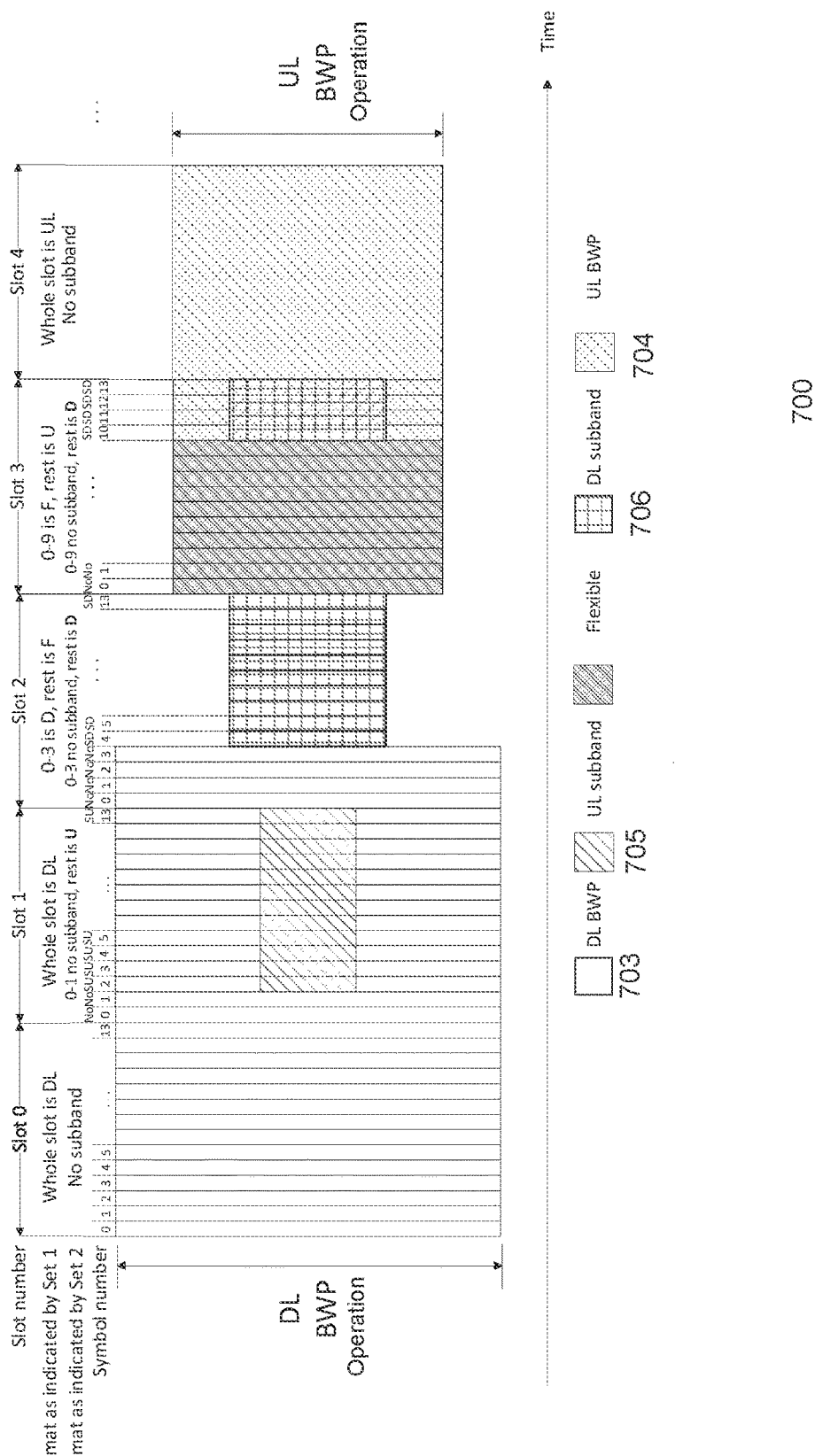
FIG. 7 is a graph 700 illustrating a method of determining a transmission direction by two slot format indicator sets based on a legacy symbol/slot format indicator, according to an embodiment.

FIG. 7 is a graph 700 illustrating a method of determining a transmission direction by two slot format indicator sets based on a legacy symbol/slot format indicator, according to an embodiment. Specifically, FIG. 7 illustrates Set 2 702 providing indications of a UL subband or DL subband using legacy symbol/slot format indicators, i.e., based on "D", "U", "F" and "no subband".

Referring to FIG. 7, the UEs are configured with two slot format indicator sets. Set 1 701 indicates the slot format based on the legacy active UL BWP 704 and DL BWP 703, while Set 2 702 overlays signaling and is for the UL subband 705 and DL subband 706.

Figure 8:
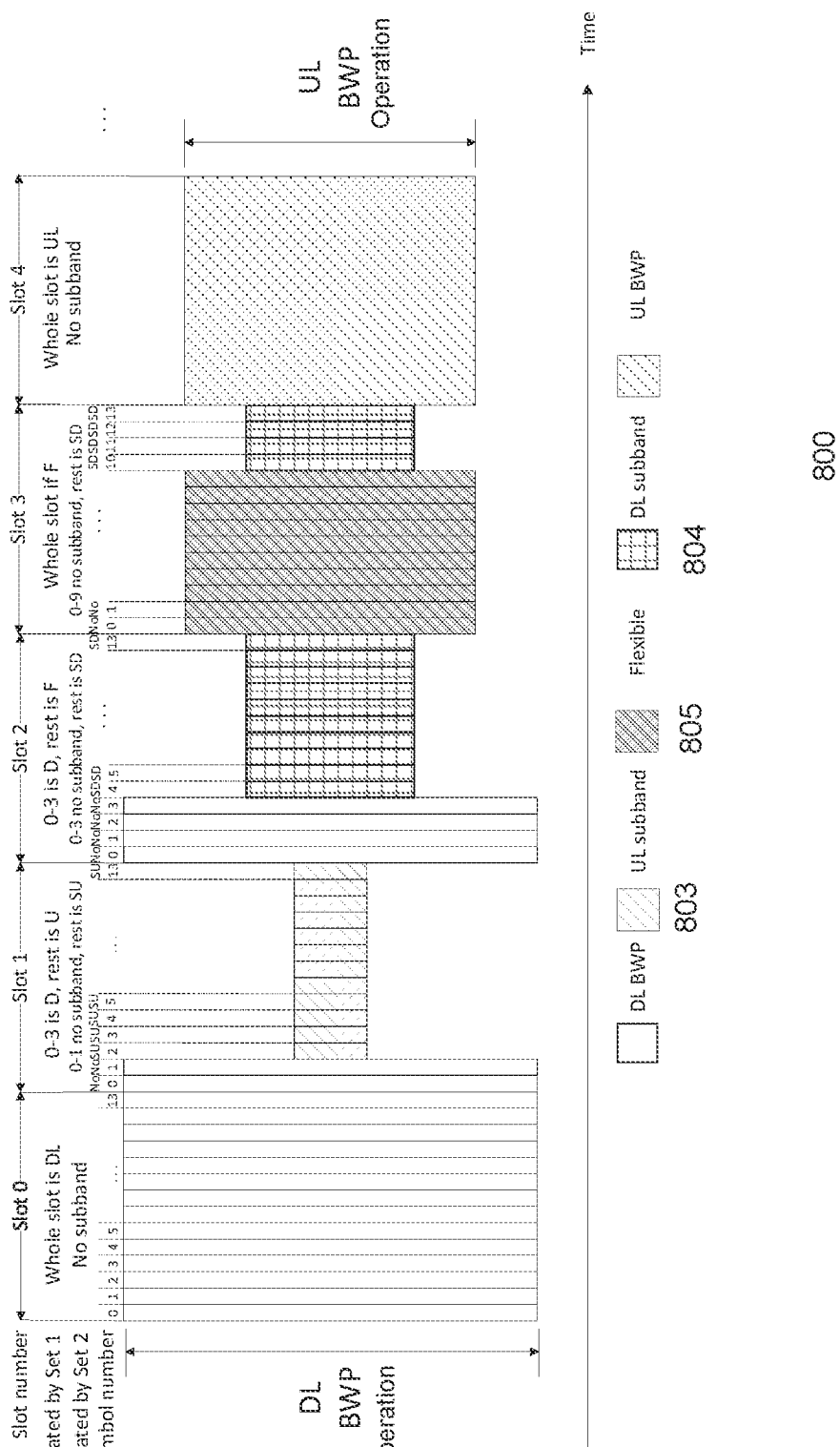
FIG. 8 is a graph 800 illustrating a slot format indicator for a half-duplex UE with two sets of indicators, according to an embodiment.

FIG. 8 is a graph 800 illustrating a slot format indicator for a half-duplex UE with two sets of indicators, according to an embodiment. Specifically, although FIG. 7 depicts the behavior of a full duplex UE, the procedure of overlaying signaling may also be used for half duplex UEs as illustrated in FIG. 8. Compared with FIG. 7, the UE can either transmit or receive at any symbol in FIG. 8.

Referring to FIG. 8, the indication provided by Set 2 802 may use the above-described symbol/slot formats SD and SU, or the legacy symbol/slot format D or U. Providing indicators of Set 2 by new slot formats SD and SU is beneficial to reduce the specification impact. In other words, SD and SU clearly indicate whether the symbol/slot should be used as the DL subband or UL subband. Though the indicators of Set 2 by the legacy symbol/slot format could still be used, additional rules would be needed to assist the UE in determining whether the symbol/slot should be used as the subband or legacy BWP as described herein. The aforementioned UE behavior may be applied to determine the presence of the UL subband 803 or DL subband 804.

Set 1 801 and Set 2 802 can provide the slot format by either higher layer signaling such as tdd-UL-DL-ConfigurationCommon and/or tdd-UL-DL-ConfigurationDedicated for Set 1 801 or tdd-UL-DL-ConfigurationCommonSubband and/or tdd-UL-DL-ConfigurationDedicatedSubband and/or offset parameter(s) indicating the start or the end of the subband for Set 2 802 (as an overlaying signal on the legacy signaling), or dynamic indication in DCI 2_0, or any other DCI. When Set 2 802 uses the legacy symbol/slot format indicator, e.g., D, U, or F, the legacy RRC configurations may be reused with an additional suffix such as tdd-UL-DL-ConfigurationCommon-r18 and/or tdd-UL-DL-ConfigurationDedicated-r18. If the UE receives the legacy RRC parameter and the new parameter, the UE determines that it receives subband configurations. If Set 2 802 has a new no subband format for a set of symbols/slots, it can be defined similar to how D, U, F, SD or SU is linked to a particular symbol/slot.

For dynamic indication of each set, the transmissions may be in the same DCI 2_0, but one field is based on configurations provided by Set 1 and another field is based on the configurations provided by Set 2 as shown in Table 2 or using the legacy symbol/slot format indication in addition to the subband indication. In this case, separate positionInDCI parameters may be used to indicate the location of each field in the DCI 2_0. Alternatively, two DCI 2_0 signals with different cyclic redundancy check (CRC) scrambled RNTIs may be provided by higher layer signaling or transmitted in different monitoring instances by being associating with different search spaces. However, the UE may expect that both DCIs have the same size to reduce the number of blind decodes (BDs).

Set 1 801 and Set 2 802 can be provided by higher layer signaling or dynamically by RRC or DCI 2_0, respectively. For Set 2 802 in the subband operation, the UL subband 803, DL subband 804, flexible 805, or no subband may be indicated.

Therefore, it is important to specify the UE behavior for different collision scenarios between the indicated slot format provided by Set 1 801 or Set 2 802. Accordingly, at least one of the following may be performed.

For a set of symbols indicated to be UL/DL based on the legacy active BWP by DCI 2_0 based on Set 1 801, the UE does not expect to receive Set 2 802 of the UL/DL instructing any of these symbols to be the UL subband 803 or DL subband 804, respectively.

For a set of symbols indicated to be flexible 805 based on Set 1 801, if any of these symbols is indicated to be the UL subband 803 or DL subband 804 by Set 2 802, the UE may assume that these symbols follow the instruction provided by Set 2 802.

If the set of symbols is indicated to be flexible 805 by RRC signaling in Set 1 801 and DCI 2_0 of Set 1 801 is configured but is not received, the UE may prioritize the indication from one set and disregard the indication from the other set. For example, the UE may apply the indication from Set 1 801 and apply the legacy behavior when DCI 2_0 is configured but not received, on a set of symbols/slots indicated as flexible 805 based on the legacy BWP.

If the dynamic indication of both Set 1 801 and Set 2 802 instructs the UE to consider a set of symbols as flexible 805, the UE does not receive any PDCCH in these symbols.

If a CORESET spans some RBs indicated as the UL subband 803 by Set 2 802, the UE may assume that these RBs are not in the CORESET in the set of symbols indicated as the UL subband 803. Since each bit frequencyDomain-Resources in ControlResourceSet IE corresponds to a group of 6 RBs, the UL subband 803 may be misaligned with the beginning or the end of a particular group. Therefore, the entire RB group is dropped and assumed as not belonging to the CORESET.

To simplify the UE implementation and avoid the change of the CORESET from one monitoring occasion to another based on the presence of absence of the UL subband 803, the UE may not expect such behavior to occur. In other words, the RBs belonging to the CORESET do not change based on the existence of the UL subband 803. Alternatively, the UE does not expect any RBs belonging to the CORESET to be part of the UL subband 803.

In addition to the existing conditions, if a UE is configured by higher layer signaling to receive a PDSCH or CSI-RS in the set of symbols of the slot, the UE receives PDSCH or CSI-RS only if none of these symbols are instructed to be the UL subband 803 by dynamic indication of Set 2 802 that overlaps with any RB/RE carrying the PDSCH or CSI-RS.

Otherwise, the UE cancels the reception of the PDSCH or CSI-RS when collision occurs.

In addition to the existing conditions, if a UE is dynamically instructed to receive the PDSCH or CSI-RS on a set of symbols, the UE does not expect to receive dynamic indication of Set 2 802 indicating any of these symbols to be the UL subband 803 when any RB/RE of PDSCH or CSI-RS overlaps with the UL subband 803.

In addition to the existing conditions, if a UE is configured by a higher layer to transmit a PUCCH, PUSCH, SRS or PRACH in the set of symbols of the slot, the UE performs this transmission only if none of these symbols are instructed to be the DL subband 804 by dynamic indication of Set 2 802 that overlaps with any RB/RE carrying the PUCCH, PUSCH, SRS or PRACH. Otherwise, the same full cancellation or partial cancelation timeline/rules as those used for DCI 2_0 for legacy NR can be applied when collision occurs.

In addition to the existing conditions, if a UE is dynamically instructed to transmit a PUCCH, PUSCH, SRS or PRACH on a set of symbols, the UE does not expect to receive dynamic indication of Set 2 802 indicating any of these symbols to be the DL subband 804 when any RB/RE of PDSCH or CSI-RS overlaps with the UL subband 803.

For a half-duplex UE receiving the above-described two sets of slot indicators, or even for full duplex UE, at least one of the following may be applied.

If a set of symbols configured by higher layer signaling of Set 1 801 indicates the symbols to be UL/DL and the UE is not configured to receive DCI 2_0, or the UE is configured to receive DCI 2_0 but the set indication is not detected, the UE does not expect to receive any indicator (RRC or DCI) from Set 2 802 for a subband configuration that indicates that any of those symbols are the DL subband 804 or UL subband 803, respectively. In other words, no conflict in the transmission direction can occur between the RRC indications of Set 1 801 and any indication of Set 2 802.

However, it may be possible that any indicator (RRC or DCI) of Set 2 802 can override the configuration instead of the legacy BWP to be subband. For example, if Set 1 801 indicates that a set of symbols is downlink in the legacy BWP, the indicators of Set 2 802 can change the indication to be the DL subband 804, instead of the legacy BWP. The same applies for the uplink.

If a set of symbols is indicated dynamically to be UL/DL by DCI 2_0 of Set 1 801, the UE does not expect to receive any indicator (RRC or DCI) from Set 2 802 for a subband configuration that indicates that any of those symbols are the DL subband 804 or UL subband 803, respectively. In other words, no conflict in the transmission direction can occur between the dynamic indication of Set 1 801 and any indication of Set 2 802.

If the RRC indications of Set 2 802 are such that any of these symbols are the UL/DL subband, the UE may apply the indication provided by DCI 2_0 of Set 1 801 and use the legacy UL/DL BWP. In other words, if static configurations of Set 2 802 indicate a UL/DL subband, but the dynamic indication of Set 1 801 indicates the legacy UL/DL BWP, the UE performs the legacy UL/DL BWP operation.

The UE does not expect the dynamic indication of Set 2 802 to indicate any of those symbols to be the UL/DL subband. In other words, it cannot be indicated for any symbol by dynamic indication of Set 1 801 and Set 2 802 to be the UL/DL BWP and UL/DL subband.

As another possibility to handle the configurations conflict (indicating a set of symbols/slots as the DL based on the legacy DL BWP and the UL based on UL subband, for example) between the indications of Set 1 801 and Set 2 802 is to define the UE behavior and apply the indication from one of the sets.

The indication by Set 2 802 for subband configurations may take precedent over the configurations provided by Set 1 801 when a conflict in the transmission direction occurs. The converse may be performed if the subband operation has lower priority than the legacy BWP operation, for example.

Alternatively, higher layer signaling (not DCI 2_0) of Set 1 801 for legacy can be overridden by the DCI indication of Set 2 802 for the subband operation. This may be applied when DCI 2_0 of Set 1 801 is not configured.

If DCI 2_0 of Set 1 801 is configured but not received, the UE may prioritize the indication from one set and disregard the other set. For example, the UE may apply the indication from Set 1 801 and apply the legacy behavior when DCI 2_0 is configured, but not received, on a set of symbols/slots indicated as flexible based on the legacy BWP.

Moreover, higher layer signaling of Set 2 802 for the legacy subband operation can be overridden by the DCI 2_0 indication of Set 1 801 for BWP operation.

If DCI 2_0 of Set 1 801 is configured but not received, the UE may prioritize the indication from one set and disregard the other set(s). For example, the UE may apply the indication from Set 2 802 and apply the legacy behavior when DCI 2_0 is configured but not received, on a set of symbols/slots indicated as flexible based on subband configurations indicated by Set 2 802.

If a set of symbols is indicated to be flexible by higher layer signaling in Set 1 801 and DCI 2_0 is not configured, or is configured but not detected, the UE applies the received indicator (RRC or DCI) from Set 2 802 for subband configuration. In other words, if a set of symbols is determined to be flexible based on the legacy procedure, the indications provided by Set 2 802 are applied and those symbols and are assumed as indicating the UL/DL subband.

If Set 2 802 also indicates that any of these symbols are flexible, then any of the aforementioned approaches can be applied.

The UE may expect no conflict to occur at least in the transmission direction between different dynamic grants. For example, if dynamic PDSCH is scheduled on these flexible symbols, the UE does not expect to receive another DCI instructing the UE to transmit a dynamic PUSCH on any sets of these symbols.

If a collision occurs between RRC downlink transmission and dynamic UL transmission, legacy behavior can be applied in terms of canceling the downlink reception, for example.

If a collision occurs between RRC uplink transmission and dynamic DL transmission, legacy behavior can be applied in terms of canceling the uplink transmission of uplink, for example.

If Set 2 802 indicates that the symbols are flexible, the UE applies the legacy behavior for the transmission and reception based on the legacy BWP.

If a set of symbols indicated to be flexible by DCI 2_0 of Set 1 801, the UE applies the received indicator (RRC or DCI) from Set 2 802 for the subband configuration. In other words, if a set of symbols is determined to be flexible based on the legacy procedure, the indications provided by Set 2 802 is applied and those symbols can be assumed as the UL/DL subband.

The legacy behavior is applied if DCI 2_0 of Set 2 802 also indicates that the symbol is flexible or has no subband. For example, the UE does not receive DCI on these symbols.

Also, if there are no dynamic grants on these symbols, then these symbols are treated as a gap with no transmission/reception to occur on them.

If a set of symbols is indicated as a No subband operation by Set 2 802, the UE applies the legacy behavior in determining U/D/F and operates based on the legacy BWP.

Although in legacy NR, the symbols indicated for SSB transmission cannot be overlap with any symbol indicated as the UL, this constraint may be unnecessary if the gNB is capable of subband full duplex operation. Therefore, Set 2 802 may indicate any of these symbols as the UL as long as RBs/REs spanned by the SSB do not overlap with RBs/REs of the UL subband, for example.

For a set of symbols of a slot corresponding to a valid PRACH occasion and $N_{gap}$ symbols before the valid PRACH occasion, the UE does not expect Set 2 802 to indicate any of these symbols as the DL subband if RBs/REs spanned by PRACH overlap with RBs/REs of the DL subband, for example.

In general, any potential mismatch in the gNB and UE when dynamic indication of Set 1 801 or Set 2 802 is missed should be avoided. A solution may depend on the priority order of different indications in Set 1 801 and Set 2 802, i.e., RRC of Set 1 801, DCI of Set 1 801, RRC of Set 2 802, and DCI of Set 2 802. For example, the following order may be assumed as RRC of Set 1>RRC of Set 2> DCI of Set 1> DCI of Set 2. The same approach can be extended to different indication priorities. This ordering may indicate that, e.g., DCI of Set 2 802 can only convert flexible of DCI of Set 2 802 from the legacy BWP operation to the subband operation, but not any other symbol. In this case, the failsafe mechanism would be that, when the UE misses the DCI of Set 1 801, the UE assumes that all flexible symbols are unavailable for subband transmissions indicated by higher layer signaling. The essence of this solution is that if symbols are indicated as flexible symbols and DCI is configured but not received, the legacy monitoring behavior is applied. Such application based on the legacy BWP or subband depends on the priority order.

If the indicators of Set 2 802 instruct a UE to consider that a set of symbols/slots are flexible and the UE receives DCI 2_0 for Set 2 802, then the same rules as those applied when the UE is provided with flexible symbols and detected DCI 2_0 can be applied to determine the UE behavior regarding the transmission/reception, but based on the confines of the bandwidth of the UL/DL subband. The same approach applies when DCI 2_0 for Set 2 802 is undetected.

When the subband is shared by multiple UEs, and if a particular UE has no UL transmission or DL reception in a UL or DL subband, other UEs may have such UL transmission or DL reception. In this case, if that UE is configured by higher layer signaling to transmit or receive on a legacy DL BWP or UL BWP, and that transmission or reception partially or fully overlaps in the frequency domain with the configured UL or DL subband, the gNB will be unable to handle both transmission directions under the non-overlapping UL/DL subband framework. Therefore, if a UE is configured or expects to receive UL/DL subband configurations by any of the indicators in Set 2 802, such as a GC-PDCCH or by any other means, and the UE has yet to detect the indicators, the UE may skip the reception or cancel the transmission of grants configured by higher layer signaling according to a particular timeline and depending on UE capability in the legacy DL or UL BWP, if those grants partially or fully overlap with the RBs for the UL or DL subband.

This rule may be applied irrespective of whether there is such an overlap. This may be beneficial if the UE is aware that there is a subband, but still does not know its frequency domain location.

This solution may also be applied if the subband configurations are indicated by other aforementioned solutions. For example, if UL-DL-ConfigurationCommon and/or tdd-UL-DL-ConfigurationDedicated and/or DCI format 2_0 are modified to carry subband configurations, and have yet to be received or detected, the UE may skip the reception or the transmission of grants configured by higher layer signaling in the legacy DL or UL BWP, as previously described.

To provide the gNB with additional flexibility, the gNB nay indicate whether the skipping of the reception or the transmission of grants configured by higher layer signaling in the legacy DL or UL BWP, as described above, will be applied. For example, higher layer signaling, such as an RRC parameter sharedSubband, can be used to inform the UE whether the subband is shared by other UEs. If the subband is shared with other UEs, then the skipping can be applied even if there is no active conflict. If the subband is not shared with other UEs, the other aforementioned solutions can be applied which are based on cancellation up on the occurrence of the actual conflict.

The indicators of Set 2 802 indicate whether legacy BWP or subband is to be applied, while the direction of the transmission (UL or DL) is determined based on the indications from Set 1 801. To this end, disclosed is a new field provided by RRC or DCI, i.e., a bitmap indicating which symbols/slots are used as a legacy BWP or subband, while DL or UL is determined based on the existing slot format indicator such as indicators of Set 1 801 or any other procedure, such as the opposite transmission direction of that provided by Set 1 801. For example, 0 may indicate the subband and 1 may indicate the legacy BWP, where each bit has a certain granularity extending from one symbol to multiple symbols, slots, subframes, etc. Also, the indicators of Set 2 802 may indicate the number and location of symbols/slots to be used as subband or legacy BWP similar to the aforementioned procedures, while DL or UL is determined based on the existing slot format indicator such as those of Set 1 801 or any other procedure.

Figure 9:
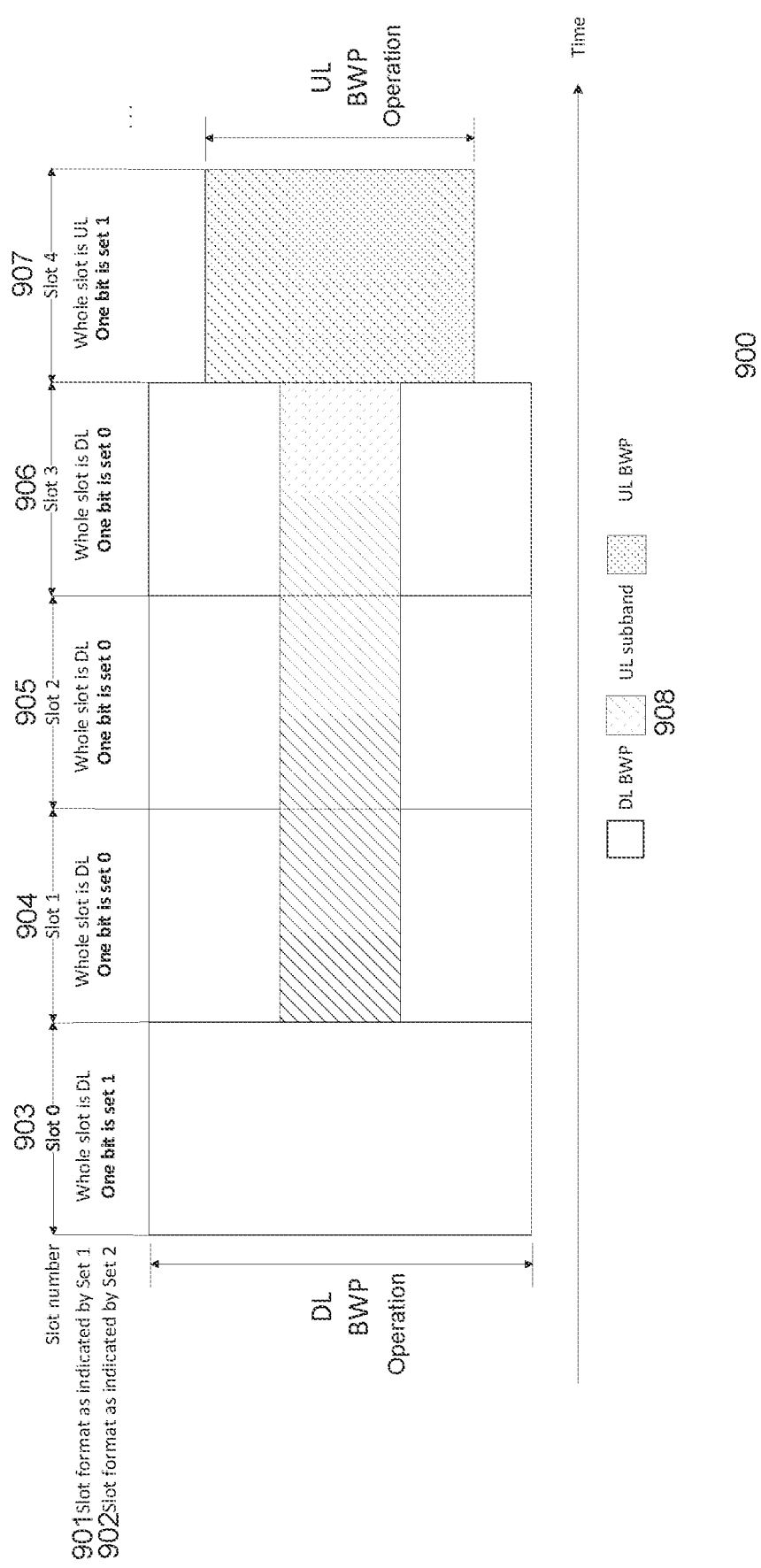
FIG. 9 is a graph 900 illustrating an indicator Set 2 as a bitmap indicating the presence of a UL subband, according to an embodiment.

FIG. 9 is a graph 900 illustrating an indicator Set 2 as a bitmap indicating the presence of a UL subband, according to an embodiment.

Referring to FIG. 9, Set 1 901 provides the UE with DDDDU for slot 0 903, slot 1 904, slot 2 905, slot 3 906 and slot 4 907, respectively. Concurrently, Set 2 902 provides the UE with the following bitmap 10001 corresponding to slots 0-4 903-907, respectively. In this case, the UE may assume the presence of the UL subband 908 in slots 1-3, as the opposite transmission direction of is the DL indicated by Set 1 901. The location of the subband may be configured as described in this disclosure.

A BWP or carrier may be divided into multiple subbands. The same approach used to define to define the subbands and their guard band, known as RB sets, for NR-U may be used. In this case, a separate Set 2 902 may be used for each RB set to indicate whether to follow the indication from Set 1 901 as a legacy BWP or the opposite transmission direction as the subband from Set 2 902, for example.

Figure 10:
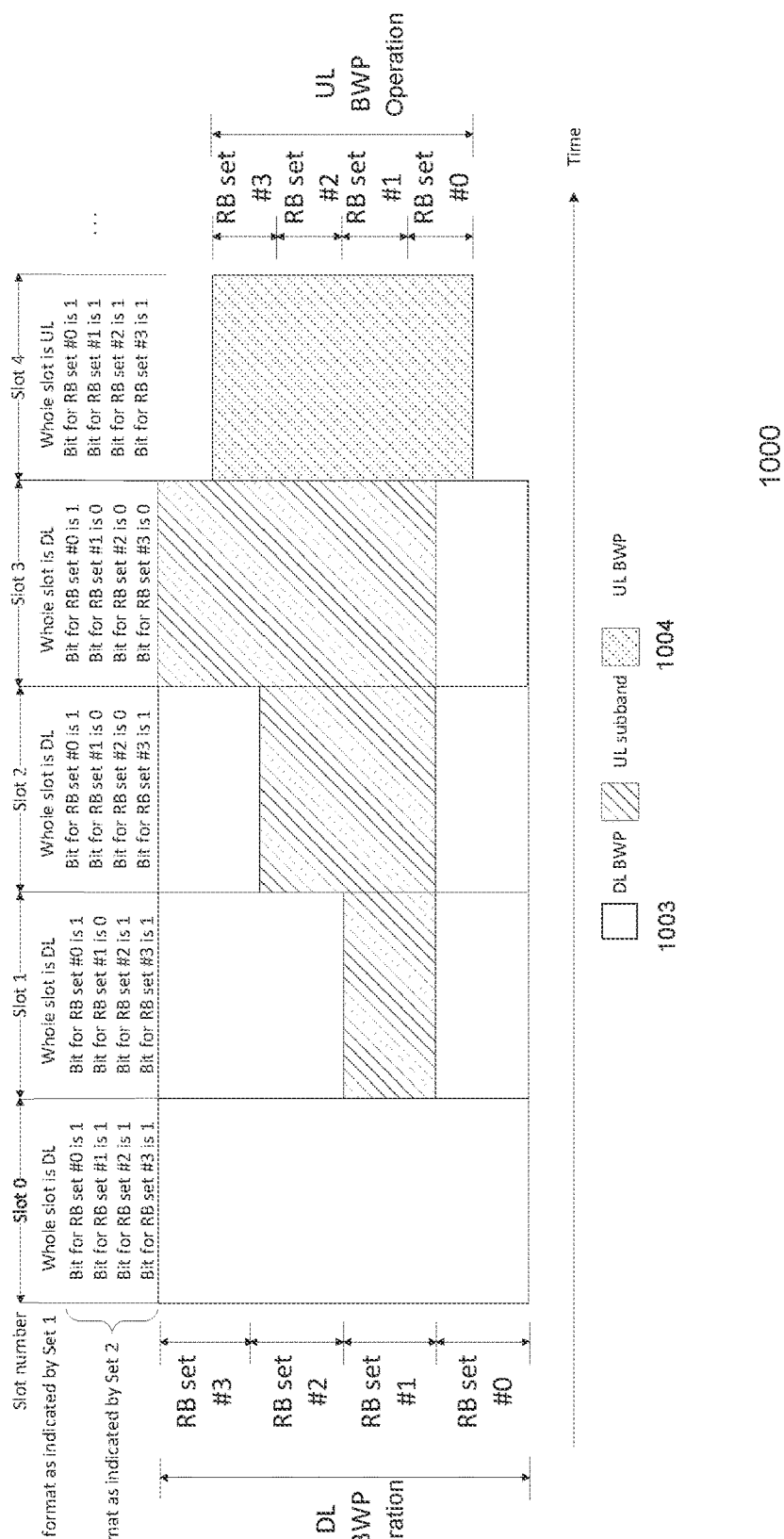
FIG. 10 is a graph 1000 illustrating indicator Set 2 as a bitmap indicating the presence of a UL subband for different RB sets, according to an embodiment.

FIG. 10 is a graph 1000 illustrating a legacy DL BWP 1003 and UL BWP 1004 being divided into four RB sets, according to an embodiment.

Referring to FIG. 10, Set 2 1002 individually indicates whether the subband or legacy BWP applies for each RB set. This approach provides the gNB with further flexibility in determining the size of the UL subband from one slot to another.

To reduce the field size, a table of different configurations may only indicate subband or legacy BWP. The DL or UL is determined based on the existing slot format indicator or any other procedure. The new field then points to the index of one of these rows. This can be similar to the manner in which SFI-index is defined but is used to indicate whether the legacy BWP or subband may be applied. The indication granularity can extend from one symbol to multiple symbols, slots, subframes, etc.

When there are multiple RB sets within the legacy DL/UL BWP, the signaling of Set 2 1002 may be through any combination of the following.

Table 3 below illustrates a new RRC parameter to be included in tdd-UL-DL-ConfigurationDedicated for RRC based signaling.

TABLE 3

| | |
|---|---|
| TDD-UL-DL-SlotConfig ::= | SEQUENCE { |
| slotIndex | TDD-UL-DL-SlotIndex, |
| symbols | CHOICE { |
| allDownlink | NULL, |
| allUplink | NULL, |
| SlotSubband-bitmap | BIT Sring (SIZE (1..maxNrofRB-Sets-r17)), |
| explicit | SEQUENCE { |
| nrofDownlinkSymbols | INTEGER (1..maxNrofSymbols−1) |
| OPTIONAL, -- Need S | |
| ULSubbandSymbols | BIT Sring (SIZE (1..maxNrofRB-Sets-r17)), |
| OPTIONAL, -- Need S | |
| nrofUplinkSymbols | INTEGER (1..maxNrofSymbols−1) |
| OPTIONAL -- Need S | |
| DLSubbandSymbols | BIT Sring (SIZE (1..maxNrofRB-Sets-r17)), |
| OPTIONAL, -- Need S } | |

In Table 3, each bit in SlotSubband-bitmap corresponds to one of the configured RB sets within the slot identified by slotIndex. If the bit corresponding to a particular RB set is set to 1, the UE applies the indicated transmission direction indicated by Set 1 and assumes that this RB set belongs to the legacy DL/UL BWP. If the bit corresponding to a particular RB set is set to 0, the UE assumes that this RB set is the subband with the opposite transmission direction to that indicated by Set 1.

For the symbol level indication, similar RRC parameters may be used for indicating which RB set is used as a DL/UL subband as by ULSubbandSymbols and ULSubbandSymbols.

Specifically, each bit in ULSubbandSymbols corresponds to one of the configured RB sets within the slot identified by slotIndex. For the symbols indicated as the DL by a legacy RRC parameter, i.e., by nrofDownlinkSymbols, if the bit corresponding to a particular RB set is set to 0, the UE assumes that this RB set is the UL subband.

Although the new RRC parameters are included tdd-UL-DL-ConfigurationDedicated, these parameters can also be included in a separate RRC IE.

For DCI based indication, an approach similar to SFI indication in DCI 2_0 may be used with the following modifications. For particular time domain granularity, e.g., slot level, the gNB may provide, e.g., via RRC, the UE with a table of different bitmaps for each time domain unit (slot) or such a table predefined in ae specification. Each bit in the bitmap corresponds to a particular RB set indicating whether the legacy BWP indication based on Set 1 or the subband in the opposite direction to that indicated by Set 1 is being followed.

Thereafter, the gNB may use GC-PDCCH, e.g., DCI 2_0, to indicate the index of combinations to be applied. As described above, this indication can be carried in DCI 2_0 and the field position in the DCI is indicated by higher layer signaling, or a new DCI format may be used with different scrambling RNTI. The size of the field is determined based on the number of configured combinations.

Regarding the time domain applicability, similar rules to SFI may be applied. For example, the indicated combinations should cover a time period greater than or equal to the GC-PDCCH monitoring periodicity. The indication applies starting from the slot where the UE detects the GC-PDCCH. Table 4 below illustrates subband combinations for RB sets in a bitmap.

provided by Set 2 when a conflict in the transmission direction occurs on symbols/slots indicated as D or U by indicators Set 1, or the UE may not expect the occurrence of such a conflict.

Turn Subband On/Off

In the aforementioned embodiments, a gNB can turn on/off the subband based on the configurations. For example, if no configurations are provided or the configurations are released, the subband operation may be disabled. Thus, it may be beneficial to provide the gNB with tools to turn on/off subband operation explicitly to avoid any potential ambiguity between the UE and gNB.

To that effect, disclosed herein are new values to be added to above-described Table 11.1.1-1 in TS 38.213, indicating the subband operation is off when DCI 2_0 is indicated as being in the off state. Alternatively, one bit field in GC-PDCCH, such as DCI 2_0, or UE-specific DCI indicates whether subband operation is on/off. For example, if the bit field is set to one/zero, subband operation is on/off, respectively. Also, on/off subband operation may be based on toggling of this bit. Alternatively, a MAC-CE can be used to turn on/off the subband operation. A timeline can be applied to determine when the indication may be applied. For example, when there is a MAC-CE indication, the new

TABLE 4

| Combination index | Slot 1 | Slot 2 | Slot 3 | Slot 4 | ... |
|---|---|---|---|---|---|
| 0 | BIT Sring (SIZE (1..maxNrofRB-Sets-r17)), | | | | |
| 1 | BIT Sring (SIZE (1..maxNrofRB-Sets-r17)), | | | | |
| 2 | BIT Sring (SIZE (1..maxNrofRB-Sets-r17)), | BIT Sring (SIZE (1..maxNrofRB-Sets-r17)), | BIT Sring (SIZE (1..maxNrofRB-Sets-r17)), | BIT Sring (SIZE (1..maxNrofRB-Sets-r17)), | |
| . | | | | | |
| . | | | | | |
| . | | | | | |

The bitmap illustrated in Table 4 is equivalent to indicating whether the RB set in the frequency domain is the DL or UL.

Alternatively, a single set of symbol/slot format indicators may be used to separately indicate the transmission direction for each RB set. For RRC based indication, on the top of legacy signaling, e.g., tdd-UL-DL-ConfigurationDedicated, the gNB may indicate to the UE to which RB set the indicated D, U, or F is to be applied, via a new RRC signaling indicating the applicable RB set. The UE may apply the cell specific slot format indication, i.e., tdd-UL-DL-ConfigurationCommon, until the reception of dedicated signaling for each configured RB set. For DCI based indication, either separate GC-PDCCH for each RB set is transmitted to indicate the applied slot format, or to indicate the same DCI but by use of a different field. For the former case, GC-PDCCH for each RB set may be scrambled with different RNTI and may have different monitoring occasions, for example.

The aforementioned embodiments may be applied irrespective of the manner in which the UL/DL subband is indicated.

According to an embodiment, being applied by either half duplex or full duplex UE, indications provided by Set 2 are only applied to the flexible symbols as provided by the indicators of Set 1. The UE may disregard the indications configurations may be applied in the first slot after slot $n+3N_{slot}^{subframe,\mu}$ where n is the slot for HARQ-Ack of MAC-CE. For using DCI, the new configurations may be applied in the first symbol after n symbols from the last symbols of the CORESET carrying this DCI, for example, where n can be predefined in a specification, indicated by the UE as part of its capability signaling, or configured by higher layer signaling. To provide the gNB with further flexibility, the gNB may be indicated when the UL subband is to be turned off in the future. For example, the gNB may use a start and length indicator (SLIV)-like approach to indicate when the UL subband is to be cancelled.

For example, the gNB may use the configured TDRA table to indicate the slot at which the subband is to be turned on/off based on the K0 value. The start "S" may indicate in which symbol the UL subband is to be turned on/off. The UE may disregard the indicated length such that the UL subband remains on/off until receiving a new indication or configurations. Alternatively, the UE may interpret the length as the duration at which the UL subband is on/off. After the end of this duration, the UL subband returns to the previous state before receiving the on/off indication.

The UE may be configured with a separate TDRA table than the one used for scheduling the PDSCH or PUSCH. Alternatively, the UL subband indication may carry a separate indication for the start or length at which the indication is applied. For example, the multiple candidate start locations (e.g., slot or symbol) and duration can be configured via or provided by higher layer signaling. Then, dynamic signaling such as MAC-CE or DCI can be used to separately indicate the start and length by separate fields, for example. The gNB can turn on/off the subband operation either statically by an RRC, semi-statically by a MAC-CE, or dynamically by DCI.

Indicating that the UL subband is off is also beneficial to allow the UE to cancel the UL transmission that was intended to be transmitted in the UL subband either dynamically or as configured. For example, the UE being configured to transmit a configured UL grant type 1 or type 2 in the UL subband, and receiving indication that UL subband is canceled, may be equivalent to the UE receiving a release command for configured UL grant type 1 or deactivation DCI for UL grant type 2. When the gNB turns on the UL subband either by using a 1-bit field or by transmitting a new configuration for the UL subband, a new activation or configuration is needed for the configured UL grant. While this example concerns the configured grant, this example can apply to another periodic or semi-persistent UL transmission such as P-SRS, SP-SRS, and RACH occasions in the UL subband.

The UE may consider the RACH occasions configured in the UL subband as invalid when the gNB turns off the UL subband.

This solution may also be applied to dynamic UL transmission. Specifically, after the UE receives the dynamic UL grant, e.g., the scheduling DCI, the UE receives an indication of cancelling the UL subband before receiving the scheduled UL grant. In this case, the UE may cancel the transmission of the UL grant if the UL subband cancellation is received early enough relative to the dynamic grant itself. A particular timeline may be predefined in the specification. For example, at least n symbols should separate the last symbol carrying the UL subband cancelation indication to the first symbol of the dynamic grant. Also, the UE may provide the gNB with the value of n as part of its capability signaling. Another possible timeline may be similar to the cancellation timeline/capability in case of a conflict between an RRC UL transmission and dynamic DL reception for either full or partial cancellation.

Moreover, the UE may indicate to the gNB whether it supports cancellation of the UL transmission configured by higher layer signaling or dynamically.

To simplify the UE implementation, the UE may not expect to receive a UL subband cancellation indication before transmitting the dynamically scheduled/triggered UL transmission.

For UL transmission with multiple repetitions such as the PUSCH with a configured aggregation factor, some repetitions may fall with the UL subband. The UL subband may be cancelled before the completion of all repetitions. In this case, the UE may transmit the repetitions that fall within the UL subband before being cancelled. A timeline between the UL subband cancellation indication and UL transmission, or between when the UL subband is supposed to be cancelled and UL transmission, is needed to ensure that the UE has enough time to cancel the UL transmission. When the UL subband is turned off, the UE may apply the slot format indicated by the legacy slot format indicator or by the slot format indicator based on Set 1 described herein. In this case, the UE may apply the configurations associated with the DL BWP.

Updating Subband Configuration when BWP Switching Occurs

The association between UL/DL subband and UL/DL BWP or DL/UL BWP may be realized using explicit or implicit methods.

One possibility for the explicit association is that the UL/DL subband with a particular ID configured through higher layer signaling, such as RRC parameter subband Id, is associated with UL/DL BWP or DL/UL BWP that has the same BWP Id. It is noted that for a non-initial UL/DL BWP, the BWP ID is provided by bwp-Id in BWP Downlink or BWP-Uplink IE. For an initial UL/DL BWP, the BWP ID is zero and is not provided by bwp-Id. Therefore, if the ID of the UL/DL subband is zero, then it is associated with the initial UL/DL BWP or DL/UL BWP.

The UL/DL subband and UL/DL BWP or DL/UL BWP that have the same ID are associated together.

Another method of the explicit association is that the configurations of the UL/DL subband, such as start and length, are provided as part of the configurations of the BWP with which the UL/DL subband is to be associated. As such, the gNB may not need to signal the subband ID, which may reduce the signaling overhead. For example, the start and length of the UL/DL subband may be provided as part of the configurations of the BWP to be associated with such as BWP-Downlink, BWP-Downlinkdedicated, BWP-Uplink, BWP-Uplinkdedicated, pdsch-config, pusch-config, etc.

The UL/DL subband and UL/DL BWP or DL/UL BWP are associated together when the configurations of the UL/DL subband are provided as part of that BWP.

However, the implicit association may also be based on confinement. Specifically, if UL/DL subband spans a set of RBs that is confined within a configured/active DL/UL BWP or UL/DL BWP, these subbands and BWPs are considered to be associated to reduce the signaling overhead. If the UL/DL subband spans a set of RBs that is confined in multiple DL/UL BWPs, the association can be determined based on predefined rules, such as whether the BWP type is for the uplink or downlink, and then performed based on the BWP ID.

In legacy NR, when the DL BWP and UL BWP have the same ID, they are paired and a UE expects them to have the same center frequency. In this case, BWP switching occurs for both DL and UL. When BWP switching occurs, the UL/DL subband may switch with the associated UL/DL BWP or DL/UL BWP, as the following will describe.

Figure 11:
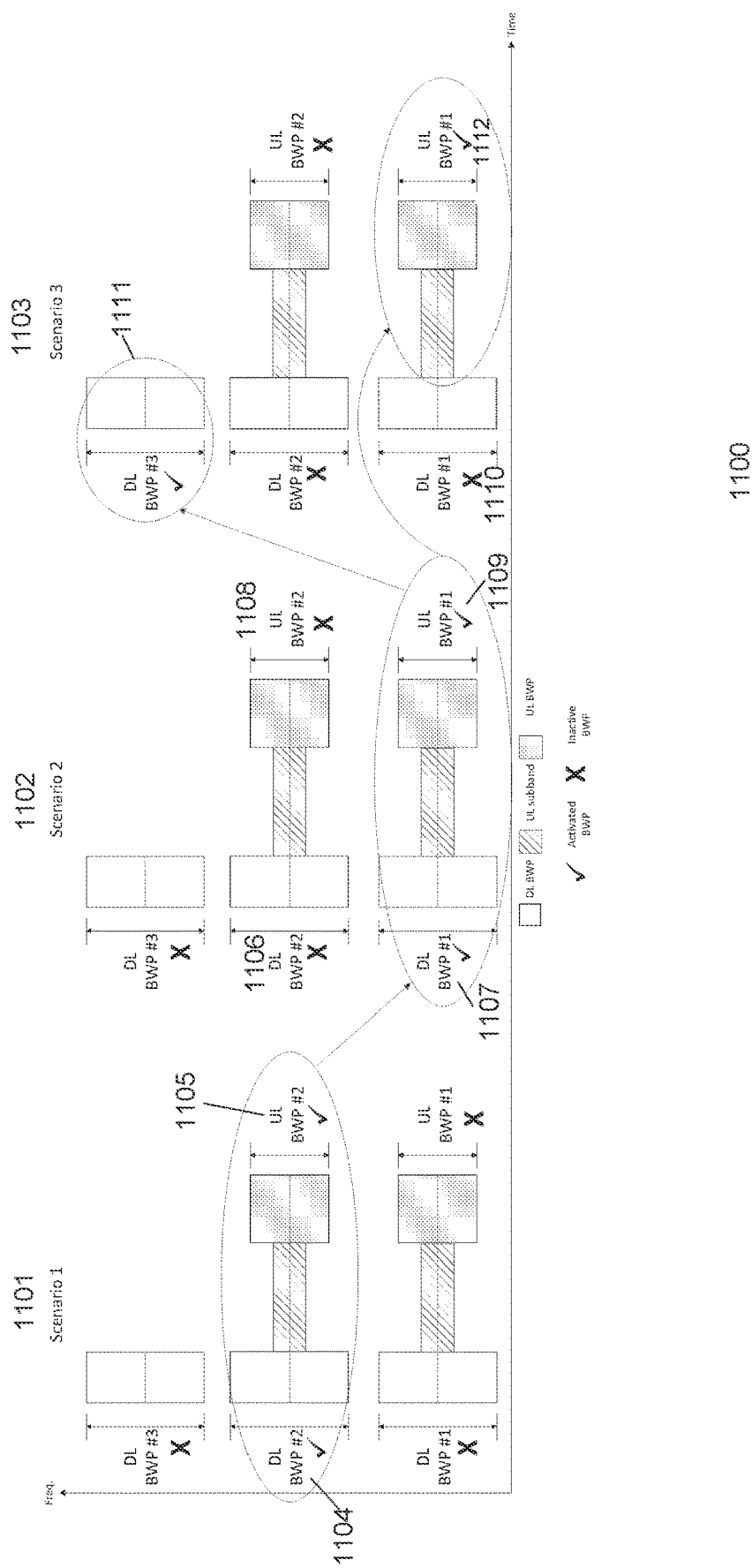
FIG. 11 is a graph 1100 illustrating a used UL subband determined based on the associated active UL BWP, according to an embodiment.

FIG. 11 is a graph 1100 illustrating a UL subband associated with a UL BWP, according to an embodiment. Specifically, a used subband in FIG. 11 is determined based on the associated active UL BWP.

Referring to FIG. 11, three DL BWPs are configured and only two UL BWPs are configured and only DL or UL BWP is active at any time. In Scenario 1 1101, DL BWP #2 1104 and UL BWP #2 1105 are active and both have the same center frequency. The UL subband associated with UL BWP #2 1105 is used on symbols/slots based on the indicated slot format as explained above, or by any other method.

In Scenario 2 1102, a UE performs BWP switching, i.e., deactivates DL BWP #2 1106 and activates DL BWP #1 1107. The same occurs with respect to the UL BWP, i.e., the UE switches from UL BWP #2 1108 to UL BWP #1 1109. This is performed since {DL BWP #2 1106 and UL BWP #2 1108} are paired, so when BWP switching occurs, the UE activates {DL BWP #1 1107 and UL BWP #1 1109} since they are also paired. In this case, the UL subband associated with UL BWP #1 1109 is used based on symbols/slots per the indicated slot format as explained above, or by any other suitable method.

In Scenario 3 1103, DL BWP #3 1111 is unpaired with any UL BWP. In this case, when the UE switches from DL BWP #1 1110 to DL BWP #3 1111, the active UL BWP remains UL BWP #1 1112. Consequently, the UL subband associated with UL BWP #1 1112 is used based on symbols/slots based on the indicated slot format as explained above, or by any other method.

The UL/DL subband switches with the associated UL/DL BWP or DL/UL BWP when BWP switching occurs.

Within the UL/DL subband, the UE may apply PUSCH-Config/PDSCH-Config, PUCCH-Config/PDCCH-Config, etc., provided for the associated UL/DL BWP. In this case, the UE may need to determine how to interpret the different configurations related to the frequency domain because the UL/DL subband may have a different start and end compared with the associated UL/DL BWP.

For example, the frequency domain location CORESET is provided by bitmap, via frequencyDomainResources, where each bit corresponds to a group of 6 RBs where the grouping is performed relative to a common resource block (CRB). If the group of 6 RBs is not fully contained in the associated DL BWP, the corresponding bit may be set to zero. When applying the same frequencyDomainResources to the associated DL subband, some bits may be set to one, though the associated group of 6 RBs is not included in the DL subband.

To handle this situation, at least one of the following may be applied.

frequencyDomainResources is interpreted relative to the beginning of the DL subband, instead of $N_{BWP}^{start}$. In other words, the first (most significant) bit corresponds to a group of 6 RBs where the first CRB of the first one is given by $6 \cdot \lceil N_{DL\ subband}^{start}/6 \rceil$, where $N_{DL\ subband}^{start}$ is the common RB index of first RB in the DL subband. The UE does not expect any bit to be set to 1, if it corresponds to a group of RBs that does not belong to the DL subband.

Imposing such a constraint that the UE does not expect any bit to be set to 1, if it corresponds to a group of RBs that does not belong to the DL subband may be restrictive as the same bitmap is used for the legacy DL BWP. To relax this constraint, the UE may disregard the bits that are set to one when they correspond to a group of 6 RBs not fully contained within the DL subband.

To further enhance the alignment between the bitmap and DL subband, the first common RB of the first group of 6 RBs has common RB index $N_{DL\ subband}^{start}+N_{RB}^{offset,\ DL\ subband}$ where is $N_{RB}^{offset,\ DL\ subband}$ is provided by higher layer signaling. If not provided, the UE may apply rb-Offset of the associated DL BWP.

Alternatively, frequencyDomainResources may be interpreted relative to the DL BWP and only the groups of 6 RBs that overlap with the associated DL subband belong to the CORESET with the DL subband.

Another example relates to inheriting a PUCCH-Config from the associated UL BWP. Specifically, the gNB can configure the UE with the index of a first RB of a PUCCH by startingPRB, the number of allocated RBs by nrofPRBs when applicable depending on PUCCH format, the index of first RB after hopping by secondHopPRB, etc. Also, a PUCCH location in the frequency domain is determined based on some rules depending on the UL BWP size when using pucch-ResoruceCommon.

To allow the UE to inherit such configurations to the UL subband, at least one of the following may be applied.

The UE may apply the same rules but replace NM of the UL BWP with the size of the associated UL subband.

For startingPRB and secondHopPRB, the UE assumes that these indicate an RB index within the UL subband where the first PRB in the UL subband is zero.

The startingPRB and secondHopPRB may be beyond the boundaries of the UL subband. In this case, some rules may be applied to translate these values to valid RBs within the UL subband. As one possibility, the first PRB for a first PUCCH may be given by mod startingPRB, the size of the UL subband, and the first PRB for a second PUCCH hop may be given by mod secondHopPRB, the size of the UL subband. Alternatively, the gNB may provide the UE with an offset to be applied to the indicated PRB of PUCCH within the UL subband. This offset may be provided by higher layer signaling.

For the nrofPRBs, the UE may expect the same value to be applied and the resultant PUCCH location is fully confined within the UL subband. To relax this constraint, the gNB may configure the UE with an offset value to be applied when the PUCCH is transmitted in the UL subband.

Separate PUSCH-Config/PDSCH-Config, PUCCH-Config/PDCCH-Config, etc., for the UL/DL subband may be provided, if the UL/DL subband is associated with the DL/UL BWP, respectively, or even when the UL/DL subband is associated with UL/DL BWP, respectively. Separate configurations imply that a set of RRC parameters can be separately configured while the remaining RRC parameters are inherited. For example, separate frequencyDomainResources, startingPRB, secondHopPRB, nrofPRBs, etc., may be configured.

When the PUCCH is repeated across multiple slots including some which should be used as the UL subband and others to be used in the legacy UL BWP, if the UE is provided with a single PUCCH-Config, different PUCCH parameters needs to be translated to be valid when PUCCH repetition is transmitted in the UL subband. In this case, the aforementioned schemes to adjust the different parameters, such as startingPRB, secondHopPRB, and nrofPRBs, may be applied on the repetitions transmitted in the UL subband. For PUCCH repetitions transmitted in the legacy BWP, the corresponding parameters are applied without any modification.

When separate PUCCH-Configs are provided for the PUCCH in the UL subband and legacy UL BWP, the location of PUCCH repetition determines which PUCCH-Config should be applied. Specifically, for PUCCH repetitions that fall in the UL subband, the PUCCH-Config associated with the UL subband should be applied. For the remaining PUCCH repetitions that fall in the legacy UL BWP, the PUCCH-Config associated with legacy UL BWP should be applied. This may or may not apply for different parameters related to frequency hopping. This applies for different procedures associated with the PUCCH. For example, when frequency hopping is configured, then for the PUCCH falling in the UL subband, the frequency hopping occurs according to PUCCH-Config associated with the UL subband. The same is applied for the PUCCH in the legacy UL BWP.

The UE may indicate to the gNB via capability signaling whether it supports transmitting PUCCH repetitions in slots/subslots falling in a different UL subband and legacy UL BWP where different PUCCH-Configs are applied or a single PUCCH-Config is applied and the parameters are transferred from those used by the legacy UL BWP to those used by the UL subband. The UE may indicate that the same PUCCH-Config is applied for all PUCCH repetitions without any transformation. In this case, the UE expects that all parameters are valid for slots/subslots in the UL subband or legacy UL BWP.

For the UL/DL subband, use the same PUSCH-Config/PDSCH-Config as that provided for the associated UL/DL BWP, respectively.

If the UL/DL subband is associated with DL/UL BWP, respectively, a separate PUSCH-Config/PDSCH-Config is provided.

The developed solutions can also apply to RRC connected UEs and RRC idle/inactive UEs.

Optimization for Scheduling

Since the bandwidth of the UL/DL subband is expected to be much smaller than the associated UL/DL BWP or DL/UL BWP, the following enhancement for the scheduling procedures is disclosed.

An RBG, a PRG, a VRB bundle, and a PRB bundle may be defined as a relative CRB based on the starting point and length of the UL/DL subband and independent of the associated UL/DL BWP or DL/UL BWP. The same procedure used to determine these quantities in the legacy UL/DL BWP can be applied for the UL/DL subband. Consequently, the first and last RBG, PRG, VRB bundle and PRB bundle may have fewer RBs than the remaining RBs in the UL/DL subband.

An RBG, a PRG, a VRB bundle, and a PRB bundle within the UL/DL subband are defined similar to the legacy UL/DL BWP but are also defined relative the CRB based on the beginning point and length of the UL/DL subband.

The size of the RBG, the PRG, the VRB bundle, and PRB bundle of a UL/DL subband may be signaled separately from the corresponding parameters of the associated UL/DL BWP or DL/UL BWP. If not provided, the UE may apply the same parameters of the associated UL/DL BWP or DL/UL BWP.

The corresponding parameters of the RBG, the PRG, the VRB bundle, and the PRB bundle within the UL/DL subband may be signaled/determined separately from the associated UL/DL BWP or DL/UL BWP. Otherwise, the parameters of the associated UL/DL BWP or DL/UL BWP can be applied.

The frequency indicator can be interpreted relative to the UL/DL subband and may include the frequency domain resource assignment FDRA field of the scheduling DCI, frequencyDomainAllocation RRC parameter of a UL configured grant, or PUSCH frequency resource allocation in RAR Msg2. Therefore, the bitlength of frequency indicator for the UL/DL subband is expected to be less than the corresponding field in regular active UL/DL BWP. This may be beneficial to further reduce the DCI payload and enhance payload reliability.

A frequency indicator of PUSCH/PDSCH within the UL/DL subband is interpreted relative to the start and length of the UL/DL subband.

A UE can infer whether to interpret the frequency indicator based on the bandwidth of a legacy UL/DL BWP or the bandwidth of the UL/DL subband. One approach is based on confinement in time domain.

Figure 12:
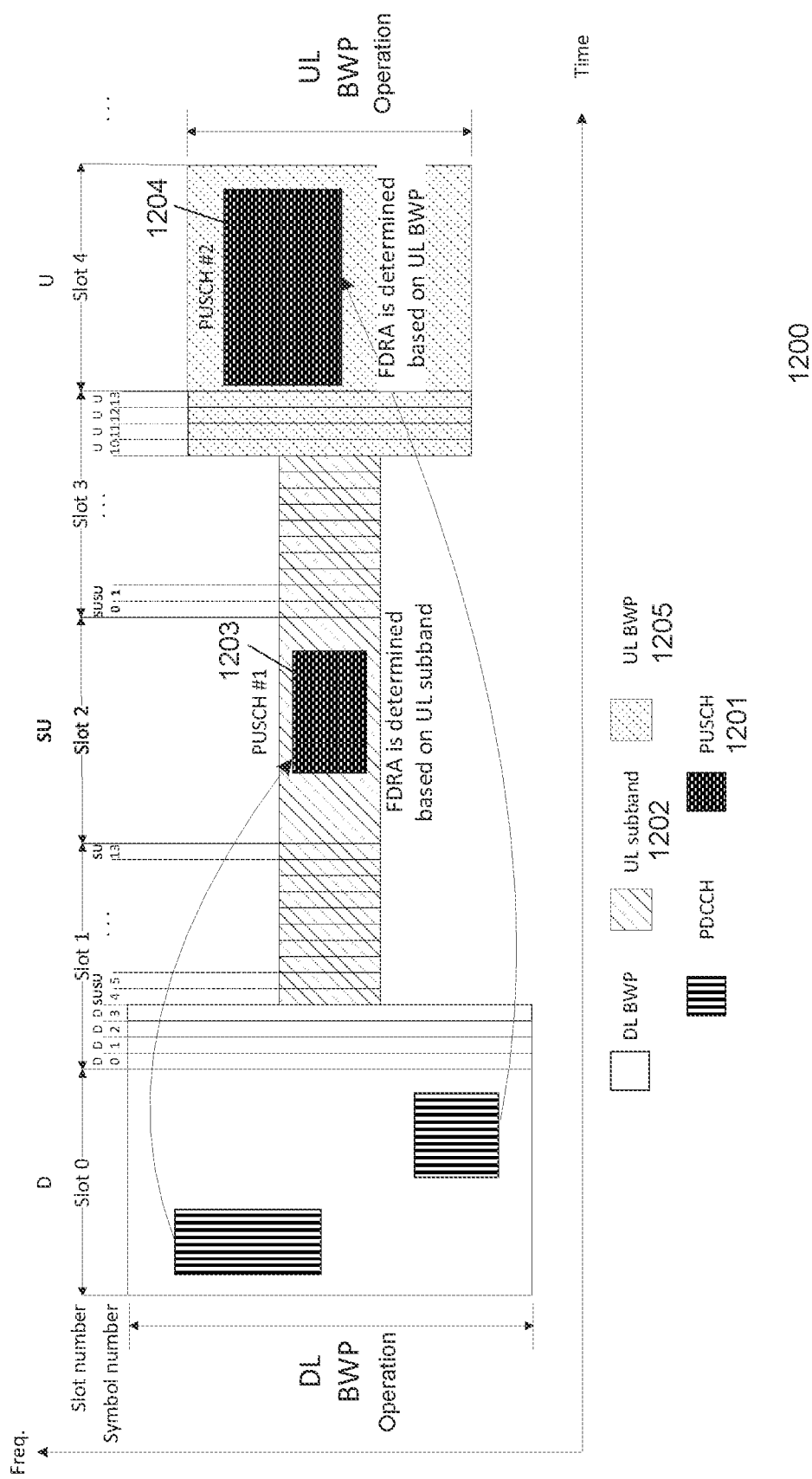
FIG. 12 is a graph 1200 illustrating an FDRA interpreted based on a UL subband and a legacy UL BWP, according to an embodiment.

FIG. 12 is a graph 1200 illustrating an FDRA interpreted based on a UL subband and a legacy UL BWP, according to an embodiment.

Referring to FIG. 12, if symbols spanned by a scheduled PUSCH/PDSCH are fully confined within the symbols indicated/determined to be part of the UL/DL subband as described herein, the UE may interrupt the frequency indicator based on the UL/DL subband 1202, or vice versa for the legacy UL/DL BWP.

As illustrated in FIG. 12, PUSCH #1 1203 is fully confined within symbols that are indicated to be used as the UL subband 1202, while PUSCH #2 1204 is fully confined within symbols that are indicated to be used as a legacy UL BWP 1205. In this case, the UE interprets the FDRA in PDCCH scheduling PUSCH #1 1203 and PUSCH #2 1204 based on the configured UL subband 1202 and legacy UL BWP 1205, respectively.

If the PUSCH/PDSCH partially overlap with symbols that are indicated as the UL/DL subband, respectively, the frequency indicator can be determined based on some rules. For example, the frequency indicator is interpreted based on the UL/DL subband, or based on the number of symbols indicated as the UL/DL subband. For example, if most of the symbols of PUSCH/PDSCH are indicated as the UL/DL subband, respectively, the UE interpret frequency indicator based on the UL/DL subband.

The confinement-based solution to determine the interpretation of the frequency indicator can be extended to when the PUSCH/PDSCH is repeated. For example, the determination may be based on the first PUSCH/PDSCH repetition, or on the confinement of every repetition of the PUSCH/PDSCH.

Based on the symbols spanned by the PUSCH/PDSCH, the UE can determine how to interpret the frequency indicator based on the UL/DL subband or UL/DL BWP.

The FDRA field size may be fixed irrespective of whether the PUSCH/PDSCH is confined within the UL/DL subband or a legacy UL/DL BWP and may be equal to the maximum bitwidth among the bitwidth of FDRA fields of the legacy BWP or subband. However, the number of useful information bits and their interpretation depends on whether the scheduling is within the subband or legacy BWP. For example, if a PUSCH/PDSCH is scheduled in a UL/DL subband, only the least significant bits of the FDRA field are used and are interpreted relative to the beginning and length of the subband. This approach is beneficial by reducing the number different DCI sizes and to satisfy the DCI budget and size constraints. Also, a fixed size of the FDRA field, enables the UE to first interpret the TDRA field to determine whether the grant is confined within a subband or a legacy BWP and then determine how to interpret the FDRA field.

The size of FDRA field is fixed irrespective of whether the grant is within the subband or legacy BWP, but the information bits within the field depends on the grant location in the time domain.

The CRC of the scheduling DCI within the UL/DL subband may be scrambled with different RNTI from the one used for scheduling in the legacy UL/DL BWP. This enables the UE to know whether the subband or legacy BWP is to be used even before mapping the grant to certain time resources. Alternatively, the search space for scheduling DCI within the UL/DL subband may differ from the search space used for scheduling within legacy UL/DL BWP. This may be realized by introducing a new search space or defining a flag by higher layer signaling within the search space configurations, such as RRC parameter purpose which can be set for the subband or legacy BWP, for example.

Use of different RNTI or monitoring occasions to indicate to the UE how to interpret FDRA field is performed as follows.

UL/DL Subband as a BWP

Configurations and Signaling

A UL/DL subband may be configured to be based on a BWP framework. This may be advantageous because the signaling of the start and bandwidth of the UL/DL subband can be inherited from legacy BWP configurations in addition to other configurations for the DL reception and UL transmission. The above embodiments can be easily extended and applied to when the UL/DL subband is defined based on a BWP framework.

A UL/DL subband is defined as a BWP. Its frequency domain position is determined using the same procedure as that used for defining the legacy BWP.

The above embodiments can be easily extended or applied to define when the UL/DL subband based on the BWP framework starts/ends. For example, the introduction of the subband for the UL (SU) and subband for the DL (SD) in addition to D/F/U in RRC signaling or GC-PDCCH can be applied when the UL/DL subband is defined based on the BWP framework. Also, the usage of two overlaying slot format indicator sets can be applied in this case.

Determining the UE behavior when configuration conflicts of the UL/DL subband exist based on the BWP framework can be similar to the aforementioned solutions when the UL/DL subband is defined as a region.

For the UL/DL subband defined based on the BWP framework, the indications of which symbols/slots to be used as the UL/DL subband can be identical to the indication disclosed for when the UL/DL subband defined as a region.

In legacy NR, the maximum number of configured BWPs is four. This may be restrictive of regular UL/DL BWP and UL/DL subband based on the BWP framework counted towards this limit. This issue is addressed herein by increasing the maximum number of configured BWPs subject to UE capability. The UE may indicate how many additional configured BWPs can be supported as part of its capability report.

Alternatively, the configured BWPs used as the UL/DL subband are counted separately from the legacy configured UL/DL BWP. For example, the maximum number of configured BWPs for the usage as the UL/DL subband can be four, in addition to the four BWPs for the legacy UL/DL BWP, subject to UE capability. Specifically, the UE may indicate in its capability signaling the maximum number of BWPs used as UL/DL subbands.

The gNB may indicate the purpose of the BWP through higher layer signaling, such as RRC parameter purpose which can be set for subband or legacy BWP, for example. In this case, the BWP ID for two BWPs can be the same, but may have a different purpose. For example, the gNB may configure UL BWP #1 as a legacy UL BWP in the legacy NR and UL BWP #1 as the UL subband.

Alternatively, irrespective of whether UL BWP is used as a legacy UL BWP or as the UL subband, the BWP IDs cannot be identical. The same applies for the DL BWP.

Through higher layer signaling, a gNB can indicate the purpose of a BWP as a legacy BWP based on legacy NR or as a subband.

The UL/DL subband based on BWP framework can be associated with a legacy UL/DL BWP or DL/UL BWP as described herein for the UL/DL subband defined as a region. For example, UL BWP used as subband is associated with UL BWP used as a legacy BWP if they have the same ID. When the BWP ID can be repeated irrespective of the purpose of the BWP, the association can be determined based on some rules. For example, BWP IDs 1-4 are used for the legacy UL BWP where the maximum number that can be configured is 4, and BWP IDs 5-6 are used for the BWP used as the UL subband, where the maximum number that can be configured is 2, and the pair {BWP ID #1 and BWP ID #5} and {BWP ID #2 and BWP ID #6} are associated. Alternatively, this rule may be the "mod" operation. Specifically, if the BWP ID based on the legacy BWP is x and the BWP ID used as the subband is y, then both BWPs are associated when x=mod (y, maximum number of subbands) when mod (y, maximum number of subbands)·0, otherwise, x=y/maximum number of the subband. Approaches based on confinement, as described above, may also be used.

When the UL/DL subband (defined as a BWP or a region, for example) is associated with a legacy BWP, some restrictions may apply. For example, the UE may assume that they have the same center frequency and apply the same numerology.

The association between UL/DL subband based on BWP framework and regular (UL/DL BWP or DL/UL BWP) can be similar to the association procedure described to associate UL/DL subband defined a region with a legacy UL/DL BWP or DL/UL BWP.

When a UE switches from a UL/DL to a DL/UL, respectively, or switches between different BWPs, even if both the old BWP and the new BWP are used for transmission or reception, there is a gap in which the UE cannot transmit or receive. For the UL/DL subband that is associated with a legacy UL/DL BWP, respectively, the switching gap can be reduced based on their relative locations in the frequency domain. This switching gap can be less than what is currently specified.

For example, if the UL/DL subband and its associated legacy UL/DL BWP, respectively, have the same center frequency and/or same numerology, then the switching time can be significantly reduced or become zero.

If the center frequencies of the UL/DL subband and its associated legacy UL/DL BWP, respectively, are not aligned, but the UL/DL subband spans a set of RBs that is fully confined within the associated UL/DL BWP, then the switching time may increase and depend on the offset amount between the two center frequencies.

Alternatively, the switching gap between the UL/DL subband and its associated legacy UL/DL BWP may not depend on their relative locations in the frequency domain.

The UE may indicate to the gNB, such as via its capability signaling, whether it supports switching between BWPs having any of the above constraints with a reduced switching gap compared with switching between any arbitrary BWPs.

Figure 13:
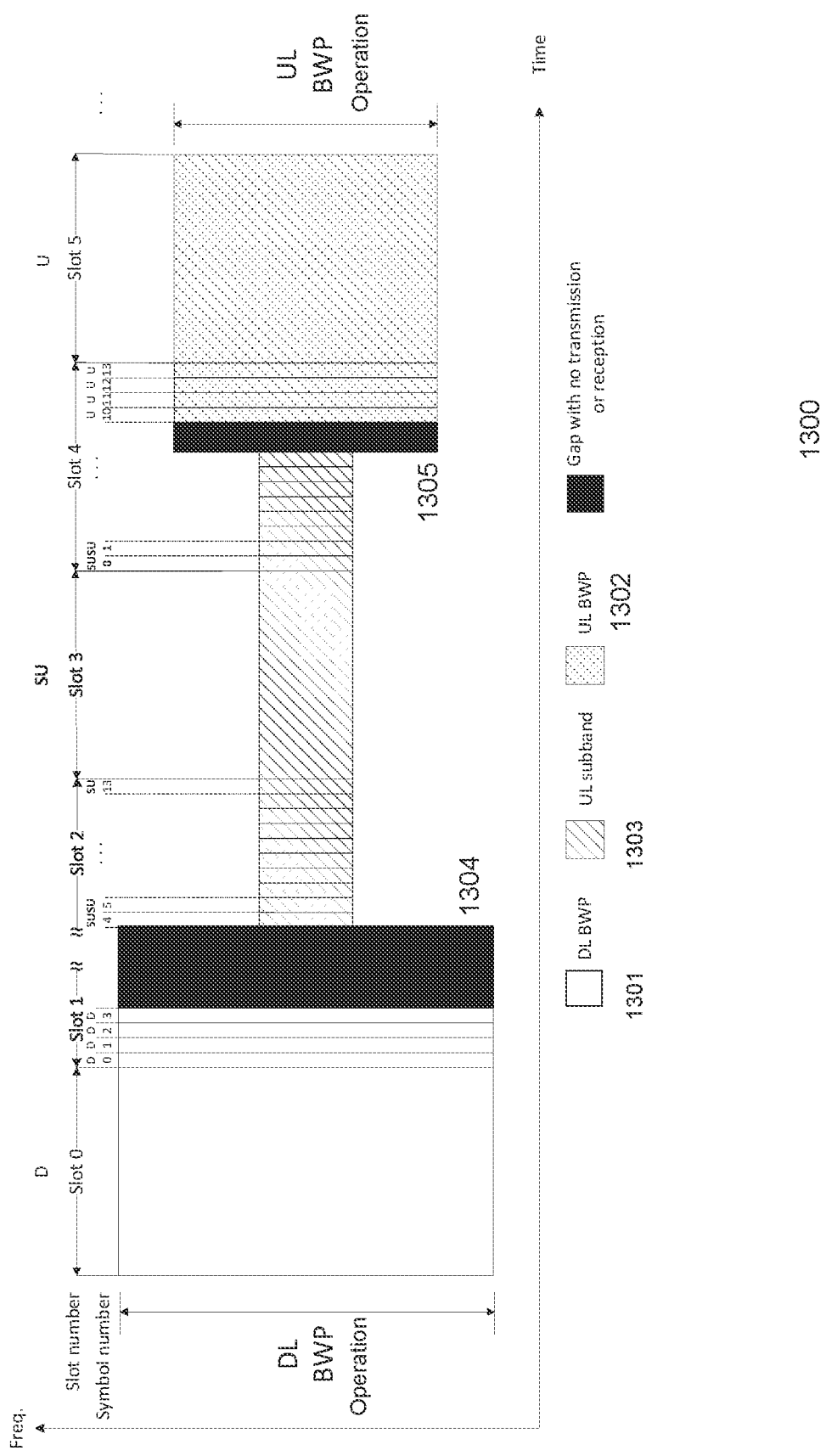
FIG. 13 is a graph 1300 illustrating a time gap when switching from the UL subband to the legacy UL BWP, according to an embodiment.

FIG. 13 is a graph 1300 illustrating a time gap when switching from a UL subband to a legacy UL BWP, according to an embodiment.

Referring to FIG. 13, switching gaps 1304 are 1305 are utilized when switching from the UL/DL subband to the associated UL/DL legacy BWP. The switching gap enables the UE to adjust its radio frequency front end based on the frequency of the new BWP.

In legacy NR, for a paired DL BWP 1301 and UL BWP 1302 by having the same ID, a UE expects the pair to have the same center frequency and BWP switching is common for both the DL and UL. With the disclosed UL/DL subband based on the BWP framework, the pairing can be further extended to join three or more BWPs together.

In this case, if any of the paired DL BWP 1301 and UL BWP 1302 is associated with the UL/DL subband (UL subband 1303 in FIG. 13), then all of the DL BWP 1301, UL BWP 1302, and UL/DL subband 1303 are assumed to be paired together and the UE anticipates that they will have the same center frequency. When BWP switching occurs, it applies to each of the DL BWP 1301, UL BWP 1302, and UL/DL subband 1303. The same disclosed solutions for when the UL/DL subband is defined as a region can be applied here, as well.

Since UL/DL subband is defined using the BWP framework, the scheduling procedures follow the legacy approach and the BWP indicator field can identify which BWP is to be used. If the BWP IDs are not repeated, the bitlength may need to be increased to accommodate the scheduling in the legacy BWP and UL/DL subband based on the BWP framework.

If the same BWP ID can be used for the legacy BWP and subband operation, then solutions similar to those described above can be used to enable the UE to determine whether the scheduling is for the legacy BWP or the subband. For example, different RNTI and monitoring occasions can be used.

Also, in the symbols/slots indicated as the UL or DL for the UL or DL subband based on the BWP framework, respectively, the UE may apply the configurations associated with the UL or DL. For example, for PDCCH monitoring in the DL subband, the UE may apply PDCCH-Config provided as part of the DL subband. The same can be applied for different configuration IEs such as PDSCH-Config, PUSCH-Config, etc.

To further utilize the existing BWP switching framework, scheduling or non-scheduling DCI may provide multiple BWP IDs for multiple possible switching points in the future. For scheduling DCI, there may be two bandwidth part indicator fields wherein the first field indicates one BWP ID to be used based on legacy procedures and the second field indicates the other BWP ID to be used based on legacy slot format indication or any other procedure indicating the slot format.

Figure 14:
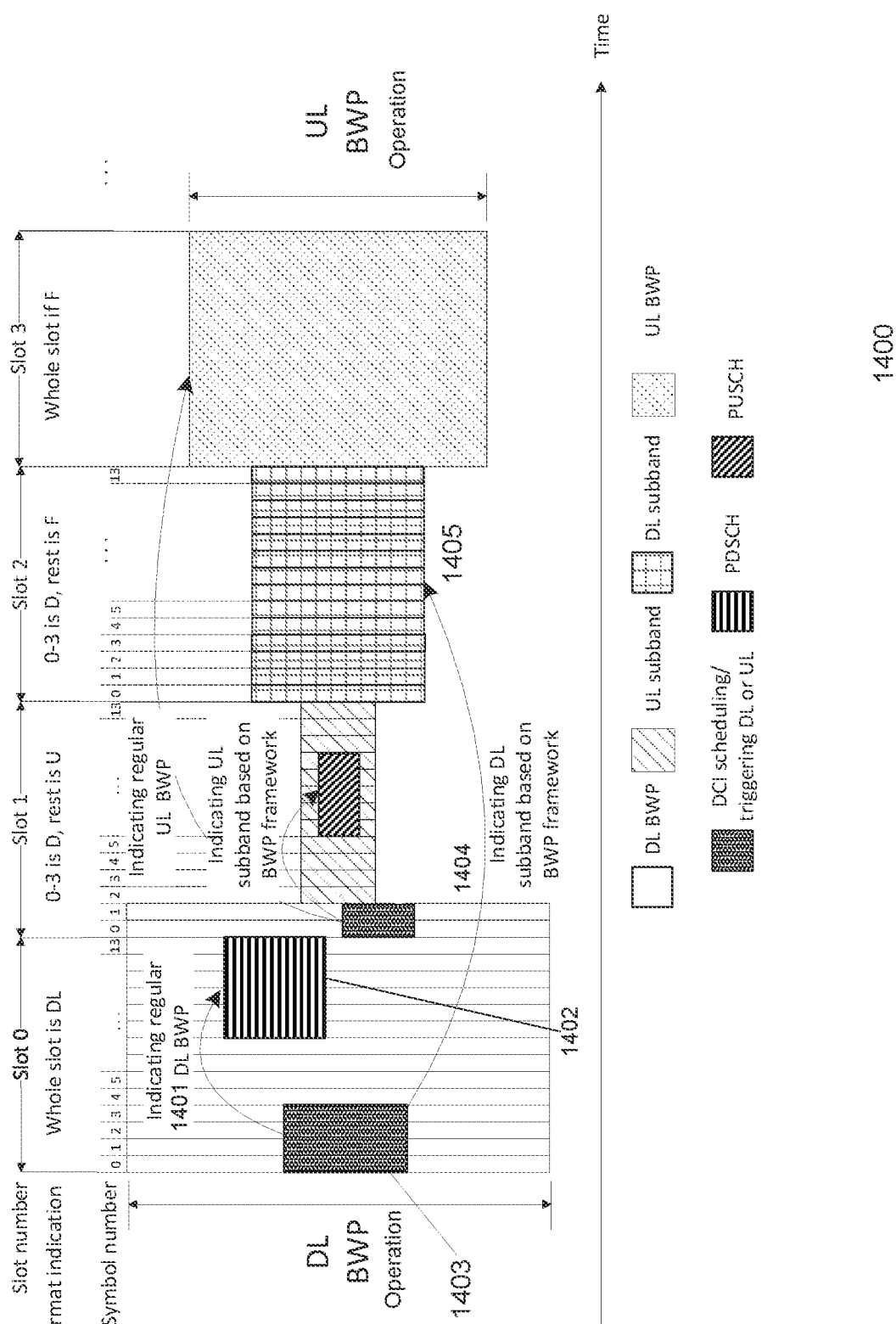
FIG. 14 is a graph 1400 illustrating scheduling of DCI indicating multiple BWP IDs for multiple switch points, according to an embodiment.

FIG. 14 is a graph 1400 illustrating scheduling of DCI indicating multiple BWP IDs for multiple switch points, according to an embodiment.

Referring to FIG. 14, DCI 1403 points to a legacy DL BWP 1401 carrying a PDSCH 1402 by a first bandwidth part indicator field. This DL BWP ID is applied for all contiguous symbols that are indicated as the DL based on legacy slot format indication. The second bandwidth part indicator field in DCI 1403 points to the DL BWP ID 1405 that is used as the DL subband in the subsequent contiguous symbols/slots indicated as the DL subband based on the indicated slot format indication provided herein or any other suitable means.

Similarly, DCI 1403 indicates to the UL BWP ID that is used as the UL subband by first bandwidth part indicator field. This UL BWP ID is applied for all contiguous symbols that are indicated as the UL based on the indicated slot format indication. The second bandwidth part indicator field in DCI 1403 points to the UL BWP ID that is used as a legacy UL BWP in the subsequent contiguous symbols/slots indicated as the UL based on the indicated slot format indication.

The indicated subband configurations can be repeated in the UL-DL pattern period and can be updated by DCI 2_0 or by other scheduling DCIs.

If the UL-DL pattern period has more than two contiguous sets of symbols/slots, then the indication of whether the legacy BWP or subband by the last DCI can be cycled or the last indication is applied.

Though in FIG. 14, the scheduling DCI may have two bandwidth part indicator fields, there can be more than two. The number of these fields can be configured by higher layer signaling.

For non-scheduling DCI, such DCI 2_0, a new field is introduced to indicate the BWP ID associated with the indicated SFI-index field in DCI 2_0. The new field may extend from indicating the BWP ID for each symbol to indicating the BWP ID for contiguous symbols that are indicated to be in the same direction, D/F/U. The new field may be a bitmap indicating which symbols/slots are used as a legacy BWP or the subband where DL or UL is determined based on the existing slot format indicator or any other suitable procedure. For example, e.g., 0 may indicate subband and 1 may indicate regular BWP and each bit has a certain granularity that may extend from one symbol to multiple symbols, slots, subframes, etc.

To reduce the DCI payload size, a table of different configurations as a legacy DL BWP, DL subband, UL subband, or a legacy UL BWP is predefined. Alternatively, the table may indicate only the subband or a legacy BWP. The DL or UL is determined based on the existing slot format indicator or any other suitable procedure. Then the new field may point to the index of one these rows, similar to the manner in which SFI-index is defined but is used to indicate whether a legacy BWP or subband may be applied. The indication granularity can extend from one symbol to multiple symbols, slots, subframes, etc.

The above-disclosed embodiments addressed issues for the UE operating in the UL/DL subband, e.g., UE 1 in FIG. 15 as described below. The following will focus on the UE operating on the complement of the UL/DL subband within the legacy DL/UL BWP, respectively, e.g., UE 2 in FIG. 15.

Figure 15:
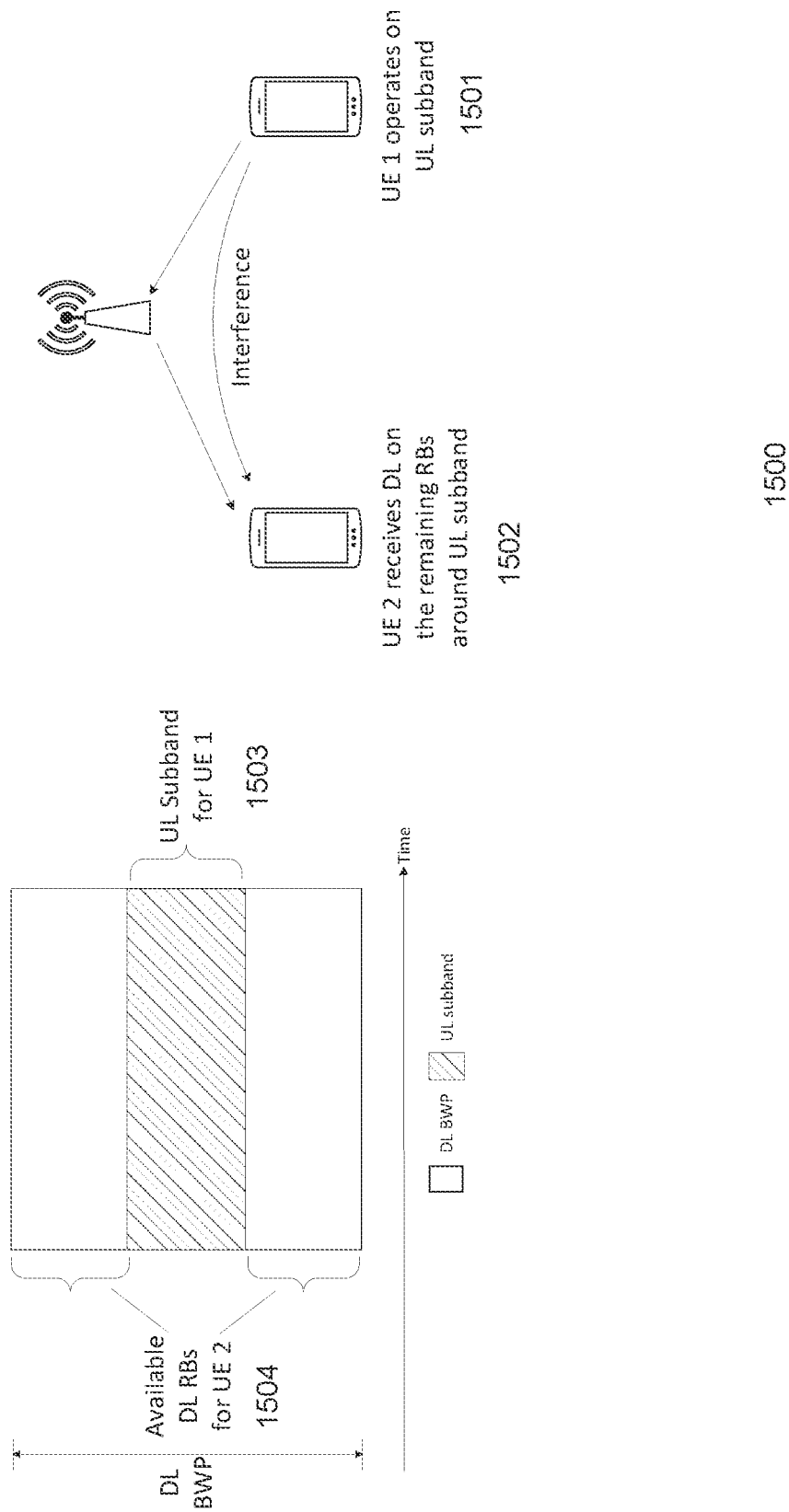
FIG. 15 illustrates the use of DL RBs around the UL subband, according to an embodiment.

FIG. 15 illustrates the use 1500 of DL RBs around the UL subband, according to an embodiment.

Referring to FIG. 15, it is beneficial for UE 2 1502 to be aware of the subband configurations even if UE 2 1502 uses the RBs 1504 around this subband. For example, UE 2 1502 may apply special interference canceling schemes to reduce the interference received from UE 1 1501 using the UL subband 1503.

Figure 16:
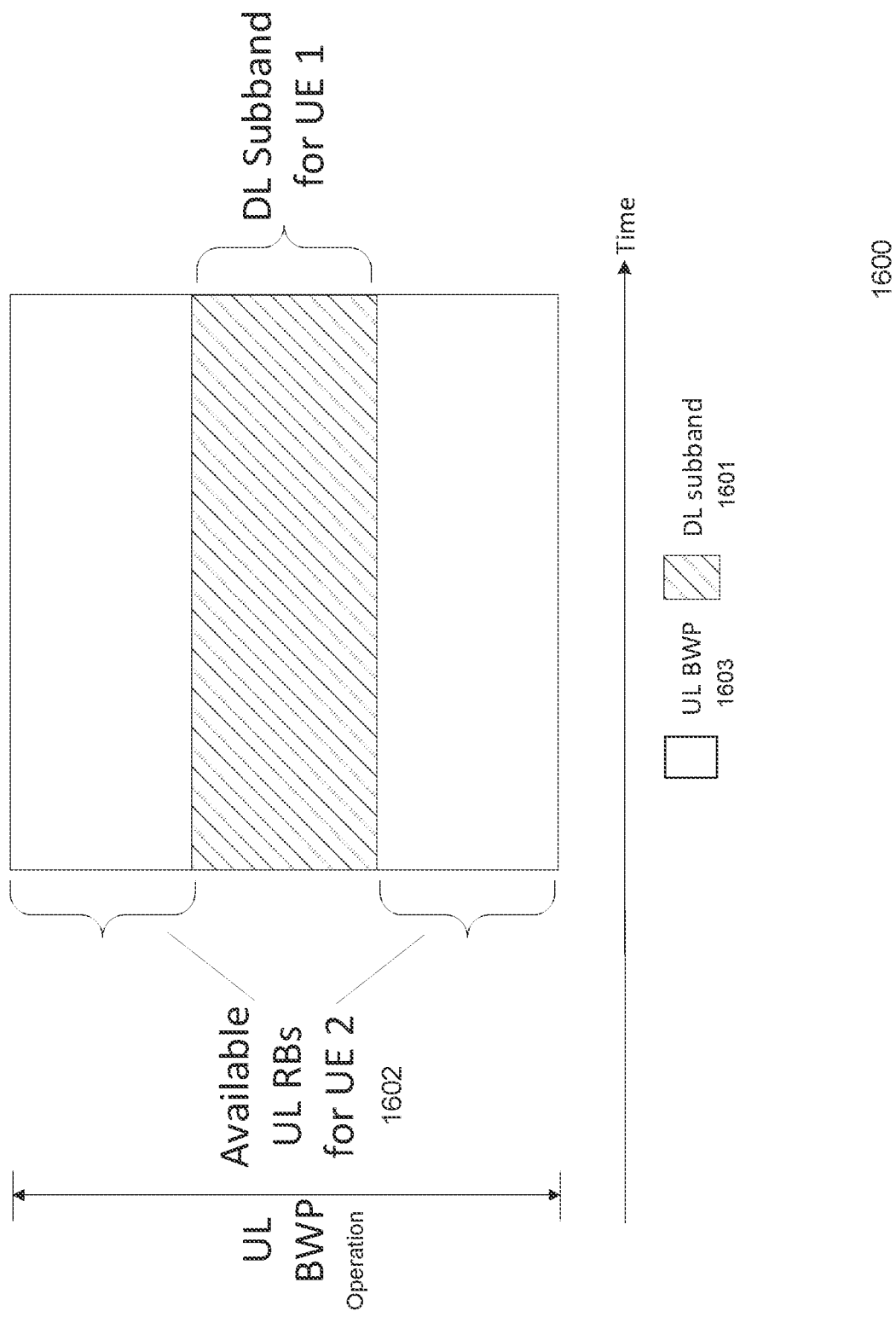
FIG. 16 is a graph 1600 illustrating the use of UL RBs around a DL subband, according to an embodiment.

FIG. 16 is a graph 1600 illustrating the use of UL RBs around a DL subband, according to an embodiment. That is, as the converse to FIG. 15, when the DL subband 1601 is confined within a legacy UL BWP 1603, knowledge of the presence of the DL subband 1601 is beneficial even if the UE uses UL RBs 1602 around it. That is, in FIG. 16, UE 2 may transmit a UL in RBs 1602 around a DL subband 1601 used by the UE 1. For example, when PUSCH frequency hopping is configured/indicated, if any of the hops (intra-slot hopping, inter-slot hopping, inter-repetition hopping, etc.) falls within the DL subband, certain UE behavior may be defined, as will be described below in more detail.

Though the following embodiments enable the UE to operate around the RBs that are configured/indicated as a subband, based on the knowledge of where and when this subband is active, these embodiments can be extended for the UE operating on the RBs within the configured/indicated subband.

The foregoing embodiments configure/indicate a subband in either time domain or frequency domain and can be applied to the UE operating on RBs around the configured/indicated subband to indicate/configure where and when the UL/DL subband is actively used by other UEs. Thus, a UE should know how to determine whether it operates on RBs within the subband or RBs around the subband.

To address this matter, the UE may assume that it operates on RBs around the configured UL/DL subband within a legacy DL/UL BWP, respectively, unless indicated otherwise, i.e., unless indicated to operate on RBs within the configured UL/DL subband. This indication may be provided through higher layer signaling such as RRC parameter operating mode, for example.

If set to subband, the UE operates on RBs within subband based on the provided configurations. If set to the legacy BWP, the UE operates on RBs around the subband, but with the knowledge of the presence of the subband. Upon the absence of operating mode, default mode may be defined such as operating on RBs around the subband, for example.

To provide the network with more flexibility, the operation mode may be indicated through a MAC-CE, a GC-PDCCH such as DCI 2_0, or a UE-specific PDCCH. For example, a 1-bit field may indicate operating mode, the subband operation is assumed if it is set to 1, and a legacy BWP is assumed if the bit is set to 0. If the UE is configured to receive this indication by being provided with the position of this field within the GC-PDCCH or it is indicated that this field is present in a UE-specific PDCCH by higher layer signaling, but the indication is not yet received, a default operation mode may be applied such as operating on RBs around the subband, for example.

A UE may receive the configurations of the UL/DL subband but may not operate in the UL/DL subband. Instead, the UE operates on RBs in the legacy DL/UL BWP around the configured UL/DL subband.

The UE may be indicated to operate in the configured subband or in the RBs surrounding the UE by an RRC, MAC-CE, GC-PDCCH, or UE-specific PDCCH.

Absent an explicit indication, the UE may operate according to a default operation mode, e.g., in the RBs around the subband.

For a UE operating on RBs around the subband, when it is activated, the UE may assume the scheduled/configured PDSCH will be rate matched or punctured around the UL subband within the legacy DL BWP. The same can be applied for a PUSCH scheduled/configured around a DL subband within a legacy UL BWP. Rate matching/puncturing for a PUSCH in the UL subband within a legacy DL BWP may be beneficial to enable the gNB to perform measurements of cross-link interference from other gNBs. The determination of whether the subband is active may be realized based on the indicated symbols/slots that will have the subband based on the aforementioned schemes or any other suitable schemes. For example, if a set of slots/symbols is indicated to have the subband, then the UE may assume that the subband is active; otherwise, it is assumed that the subband is inactive.

Figure 17:
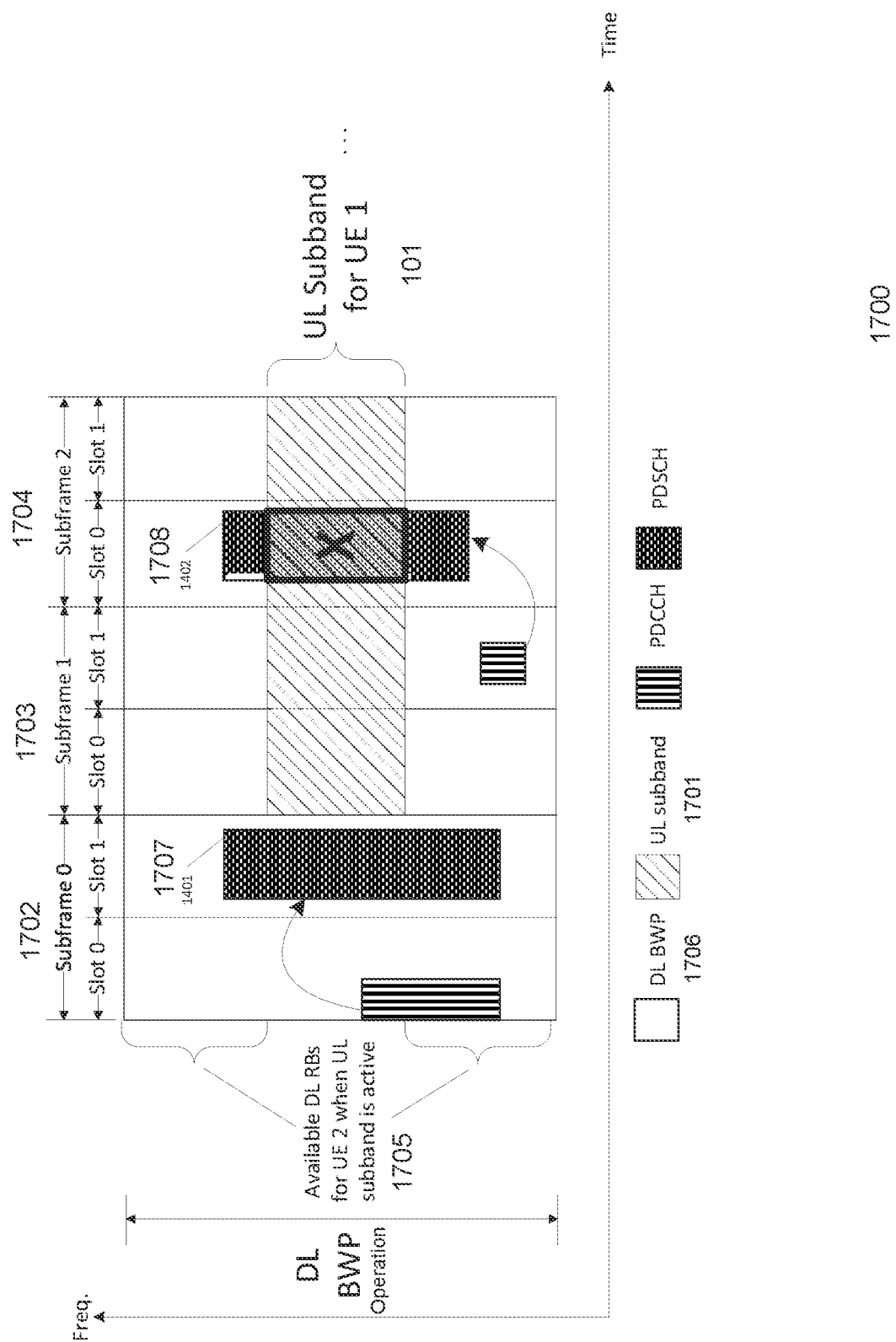
FIG. 17 is a graph 1700 illustrating rate matching or puncturing of a PDSCH which overlaps with an active UL subband, according to an embodiment.

FIG. 17 is a graph 1700 illustrating rate matching or puncturing of a PDSCH which overlaps with an active UL subband 1701, according to an embodiment.

Referring to FIG. 17 a UL subband 1701 is active in Subframe 1 1703 and Subframe 2 1704, but not in Subframe 0 1702. UE 1 operates on the UL subband 1701, while UE 2 operates on RBs 1705 around the UL subband 1701 within the legacy DL BWP 1706. When the UL subband 1701 is not activated, i.e., Subframe 0 1702, the scheduled PDSCH 1707 can span all RBs within the legacy DL BWP 1706. However, for PDSCH 1708 that partially overlaps with an active UL subband 1701, the UE assumes that the PDSCH 1708 is rate matched or punctured around the RBs within the active UL subband 1701. Although FIG. 17 illustrates a PDSCH 1708 around a UL subband 1701, the same example can be extended for a PUSCH around the DL subband.

Although FIG. 17 illustrates a dynamic PDSCH, the same procedure can also be extended to an SPS scenario and different PDSCH repetitions schemes, as well as to CG PUSCH type 1 and 2 and different PUSCH repetition schemes. For example, if a set repetitions of PDSCH or PUSCH does not overlap with an active subband, this set will be transmitted similarly to legacy behavior. However, for the set of repetitions of PDSCH or PUSCH that overlaps with an active subband, the UE may assume that the PDSCH or PUSCH is rate matched or punctured around the RBs within the active subband.

If the PDSCH or PUSCH overlaps with an active subband, rate matching or puncturing occurs around those RBs within the active subband.

As to PDSCH or PUSCH repetition, rate matching or puncturing is applied for each repetition separately based on whether the PDSCH or PUSCH overlaps with an active subband.

To simplify the UE implementation and avoid different treatments for different repetitions based on whether the scheduled/configured channels overlap with an active subband, the repetition that overlaps with an active subband may be dropped and may not be received or transmitted for the PDSCH or PUSCH, respectively. However, if all repetitions overlap with the same active subband, they may be transmitted or received because no special treatments are required for different repetitions.

More advanced rules may be applied to determine which repetitions are dropped and which are transmitted or received for PDSCH or PUSCH, respectively. For example, the majority rule may be used. If most of the repetitions overlaps with an active subband, they transmitted or received with rate matching or puncturing taking place for RBs that overlap with an active subband. In this case, the remaining repetitions will be dropped though they do not overlap with an active subband. This may be beneficial if the gain of repetitions exceeds the negative impact of rate matching or puncturing.

Rules such as the majority rule may be applied to determine which repetitions are to be dropped and which are to be transmitted or received.

To allow a victim gNB to measure the received interference from an aggressor gNB, it may be beneficial to ensure that UEs served by the victim gNB refrain from transmitting the UL on the same resources used by the reference signal (RS) transmitted by the aggressor gNB for this purpose. Though this can be handled by the victim gNB for dynamic UL scheduling, it is difficult for this to be avoided for a configured UL transmission. Even for dynamic UL scheduling, completely avoiding such collisions may lead to inefficient scheduling.

For example, the victim gNB may provide its UEs with the configurations of the RS transmitted by the aggressor gNB. Therefore, the UE may assume that the REs occupied by such RS are unavailable for the UL transmission. The UE may either puncture or rate match around those REs. The victim gNB may provide a channel state information reference signal (CSI-RS) resource set to the UE and indicate that the REs spanned by CSI-RS in this resource set is used for conducting gNG-to-gNB CLI measurement and the UE should not transmit UL on those REs. For example, an RRC parameter such as availability may be used.

Instead of puncturing or rate match around the REs occupied by the RS transmitted by the aggressor gNB, the UE may puncture or rate match around any RB that partially or fully overlaps with this RS.

This procedure (in which the victim gNB provides its UEs with the configurations of reference signals transmitted by the aggressor gNB and the UE rate matches or punctures around the RBs/REs occupied by these reference signals) may be performed when the RS transmitted by the aggressor gNB overlaps with the UL subband of the victim gNB in both time domain and frequency domain, e.g., when both gNBs belong to the same operator and the victim gNB uses full duplex operation while the other the aggressor gNB deploys a legacy TDD system (intra subband interference). However, the RS transmitted by the aggressor gNB may only overlap with the UL subband in time domain and the victim gNB measures the leakage in the UL subband. This occurs when the aggressor gNB belongs to another operator or when both gNBs use full duplex operation mode. In this case, the victim gNB may choose particular REs/RBs to conduct the measurements based on a received signal strength indicator (RSSI) or total received power, for example.

To this end, the legacy rate matching used for PDSCH can be extended to be applied for the UL transmission, as well. Specifically, the same rateMatchPatternToAddModList, rateMatchPatternGroup1 and rateMatchPatternGroup2 provided for PDSCH can be applied for the UL transmission. The UE may reinterpret the RRC parameter resourceBlocks which in legacy NR provides an RB level bitmap in the frequency domain. A bit in the bitmap set to 1 indicates that the UE shall apply rate matching in the corresponding RB in accordance with the symbolsInResourceBlock bitmap. If used as a cell-level rate matching pattern, the bitmap identifies CRBs. If used as a BWP-level rate matching pattern, the bitmap identifies PRBs inside the BWP or UL subband.

Therefore, for cell-level rate matching patterns, resourceBlocks can be directly applied as it is defined relative to the CRB which may be the same for the DL and UL in TDD operation. However, for BWP-level rate matching patterns, the UE may interpret resourceBlocks relative to the UL subband which depends on start and size of the UL subband. The symbolsInResourceBlock for the DL PDSCH can be applied for the UL subband to identify the symbols on which the UE should perform rate matching for the UL transmission.

To provide the gNB with more flexibility and decouple the rate matching patterns for the DL and UL, the following may be applied to indicate the rate matching resources for the UL.

```
-- ASN1START
-- TAG-RATEMATCHPATTERN-START
RateMatchPattern ::=                    SEQUENCE {
    rateMatchPatternId                  RateMatchPatternId,
    patternType                         CHOICE {
        bitmaps                         SEQUENCE {
            resourceBlocks                      BIT STRING (SIZE (275)),
            symbolsInResourceBlock              CHOICE {
                oneSlot                         BIT STRING (SIZE (14)),
                twoSlots                        BIT STRING (SIZE (28))
            },
            periodicityAndPattern               CHOICE {
                n2                              BIT STRING (SIZE (2)),
                n4                              BIT STRING (SIZE (4)),
                n5                              BIT STRING (SIZE (5)),
                n8                              BIT STRING (SIZE (8)),
                n10                             BIT STRING (SIZE (10)),
                n20                             BIT STRING (SIZE (20)),
                n40                             BIT STRING (SIZE (40))
            }                                                   OPTIONAL, -- Need S
            ...
        },
        controlResourceSet              ControlResourceSetId
    },
        Bitmaps-UL                      SEQUENCE {
        resourceBlocks-UL                       BIT STRING (SIZE (275)),
        symbolsInResourceBlock-UL               CHOICE {
            oneSlot                             BIT STRING (SIZE (14)),
            twoSlots                            BIT STRING (SIZE (28))
        },
        periodicityAndPattern-UL                CHOICE {
            n2                                  BIT STRING (SIZE (2)),
            n4                                  BIT STRING (SIZE (4)),
            n5                                  BIT STRING (SIZE (5)),
            n8                                  BIT STRING (SIZE (8)),
            n10                                 BIT STRING (SIZE (10)),
            n20                                 BIT STRING (SIZE (20)),
            n40                                 BIT STRING (SIZE (40))
        }                                                       OPTIONAL, -- Need S
    }
    subcarrierSpacing                   SubcarrierSpacing   OPTIONAL, --
Cond CellLevel
    subcarrierSpacing-UL                        SubcarrierSpacing
OPTIONAL, -- Cond CellLevel
    dummy                               ENUMERATED { dynamic, semiStatic },
    ...,
    [[
    controlResourceSet-r16                      ControlResourceSetId-r16
OPTIONAL -- Need R
    ]]
}
-- TAG-RATEMATCHPATTERN-STOP
-- ASN1STOP
```

| RateMatchPattern field descriptions |
| --- |
| Undefined parameters follow the legacy definitions.
Bitmaps-UL
Indicates UL rate matching pattern by a pair of bitmaps resourceBlocks and symbolsInResourceBlock to define the rate match pattern within one or two slots, and a third bitmap periodicityAndPattern to define the repetition pattern with which the pattern defined by the above bitmap pair occurs.
periodicityAndPattern-UL
A time domain the UL repetition pattern at which the pattern defined by symbolsInResourceBlock and resourceBlocks recurs. This slot pattern repeats itself continuously. Absence of this field indicates the value n1.
resourceBlocks-UL
A UL resource block level bitmap in the frequency domain. A bit in the bitmap set to 1 indicates that the UE shall apply rate matching in the corresponding resource block in accordance with the symbolsInResourceBlock. If used as cell-level rate matching pattern, the bitmap identifies "common resource blocks (CRB)". If used as BWP-level rate matching pattern, the bitmap identifies "physical resource blocks" inside the BWP. The first/leftmost bit corresponds to resource block 0, and so on (see TS 38.214, clause 5.1.4.1).
subcarrier Spacing-UL
The SubcarrierSpacing for this UL resource pattern. If the field is absent, the UE applies the SCS of the associated BWP. The value kHz15 corresponds to $\mu = 0$, the value kHz30 corresponds to $\mu = 1$, and so on.
Only the following values are applicable depending on the used frequency (see TS 38.214, clause 5.1.4.1):
FR1: 15, 30 or 60 kHz
FR2-1: 60 or 120 kHz
FR2-2: 120, 480, or 960 kHz
symbolsInResourceBlock-UL
A UL symbol level bitmap in time domain. It indicates with a bit set to true that the UE shall rate match around the corresponding symbol. This pattern recurs (in time domain) with the configured periodicity AndPattern.
For oneSlot, if ECP is configured, the first 12 bits represent the symbols within the slot and the last two bits within the bitstring are disregarded by the UE; Otherwise, the 14 bits represent the symbols within the slot.
For twoSlots, if ECP is configured, the first 12 bits represent the symbols within the first slot and the next 12 bits represent the symbols in the second slot and the last four bits within the bit string are disregarded by the UE; Otherwise, the first 14 bits represent the symbols within the first slot and the next 14 bits represent the symbols in the second slot.
For the bits representing symbols in a slot, the most significant bit of the bit string represents the first symbol in the slot and the second most significant bit represents the second symbol in the slot and so on. |

Alternatively, a new set of RRC IEs rateMatchPattern-ToAddModList, rateMatchPatternGroup1 and rateMatchPatternGroup2 can be provided as part of PUSCH-Config or in ServingCellConfig or ServingCellConfigCommon with suffix UL. The same procedures for PDSCH may be extended to be applied for the PUSCH. The UL scheduling DCIs, e.g., DCI format 0_1 or DCI format 0_2, may have new fields to indicate which rate matching group is to be applied.

Also, a victim gNB may indicate to its UEs the unavailable resources in RE level, similar to the zero-power-CSI-RS (ZP-CSI-RS) procedures for the DL. In legacy NR, indicating the unavailable REs uses the same framework to indicate the time domain and frequency domain location of the NZP-CSI-RS. Specifically, CSI-RS-ResourceMapping and CSI-ResourcePeriodicityAndOffset are used to define RE mapping of the ZP-CSI-RS and the corresponding periodicity/offset for the periodic and semi-persistent ZP-CSI-RS, respectively.

Therefore, PUSCH-Config may include the RRC parameters for aperiodic, semi-persistent and periodic ZP-CSI-RS. The UL scheduling DCIs, e.g., DCI format 0_1 or DCI format 0_2, may have new fields to indicate which aperiodic ZP-CSI-RS resource is to be applied.

Regarding the time location of ZP-CSI-RS used for the PUSCH, the UE may follow the legacy NR to determine the time domain location. For the frequency domain location of ZP-CSI-RS, the UE may interpret freqBand in CSI-RS-ResourceMapping relative to the UL subband depending on how it is defined, i.e., either as subband or UL BWP.

Since the bandwidth of the UL subband is expected to be narrow, nrofRBs indicating the number of PRBs spanned by ZP-CSI-RS for PUSCH is not necessary to multiples of 4 and may have a granularity of a single RB or RE. Also, the ZP-CSI-RS is unnecessary to occupy contiguous RBs in the UL subband. Therefore, a bitmap can be used to indicate which RBs or REs in the UL subband are occupied by ZP-CSI-RS for PUSCH. Each bit may be mapped to a single RB or multiple RBs depending on the size of the UL subband. The gNB may indicate to the UE how to interpret each bit and determine its resolution.

Also, it is unnecessary for the number of RBs spanned by ZP-CSI-RS for PUSCH to be greater than minimum (24, the size of the UL subband). This condition can be relaxed depending on how many resources the victim gNB intends to use to conduct the measurements.

The UE may indicate to the gNB whether it supports any of the aforementioned procedures via UE capability signaling, with even finer granularity for different UL transmission natures. For example, rate matching or puncturing may be applied for periodic or semi-persistent UL transmission, but not for dynamic UL transmission. This enables the UE to have sufficient time to determine whether a puncture or rate matching for the UL transmission will occur. Also, for the UL rate matching patterns, the UE may indicate that it only supports the RRC configured rate patterns, not the dynamically indicated rate patterns. Similarly, for ZP-CSI-RS for PUSCH, the UE may indicate that it only supports periodic or semi-persistent ZP-CSI-RS for the PUSCH, and not aperiodic ZP-CSI-RS for the PUSCH.

To further simplify the UE implementation, when the UL transmission partially or fully overlaps with an RS used for gNB-to-gNB CLI, resources indicated by rate matching patterns for the UL or resources indicated by ZP-CSI-RS for the UL, the UE may partially or fully cancel the UL transmission. For example, there may be a timeline/capability similar to the cancellation timeline/capability when a conflict occurs between RRC UL transmission and dynamic DL reception in the context of TDD slot configurations.

Figure 18:
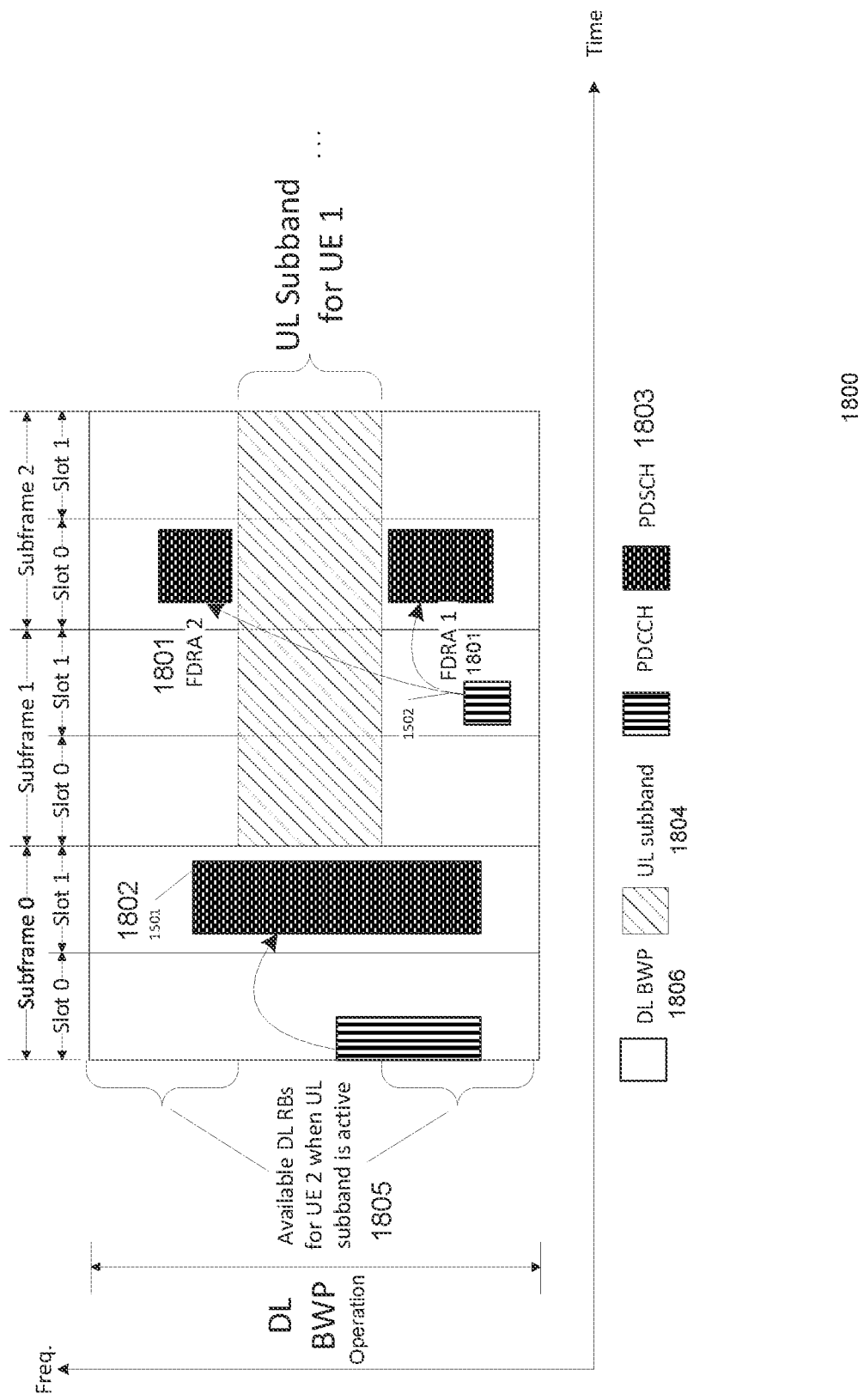
FIG. 18 is a graph 1800 illustrating use of multiple FDRA indications to determine the frequency domain allocation of the PDSCH above and below an active UL subband, according to an embodiment.

FIG. 18 is a graph 1800 illustrating use of multiple FDRA indications to determine the frequency domain allocation of the PDSCH above and below an active UL subband, according to an embodiment. That is, FIG. 18 provides another solution to enhance the scheduling granularity and provide the gNB with more scheduling flexibility. The same approach can be used for scheduling/configuring a PUSCH around the DL subband.

Referring to FIG. 18, multiple FDRA indications 1801 and 1802 are used for indicating the allocated frequency domain resources for the same PDSCH 1803 or PUSCH. For example, if a UL/DL subband 1804 is surrounded by DL/UL RBs 1805 of a legacy DL BWP 1806, respectively, then two FDRA indications 1801, 1802 are used. A first 1802 of these indications provides the frequency domain allocation in the lower set of RBs and a second indication 1801 provides the higher set of RBs.

In FIG. 18, PDSCH 1802 is scheduled based on legacy procedure because it does not overlap with the active UL subband 1804. However, the frequency domain allocation of PDSCH 1801 is indicated by two FDRA fields. FDRA 1 indicates the frequency domain allocation of PDSCH below the active UL subband while FDRA 2 indicates the frequency domain allocation of PDSCH above the active UL subband. Though FIG. 18 shows an example of a PDSCH 1801 around the UL subband 1804, the same example can be extended for a PUSCH around the DL subband 1806.

Although FIG. 18 illustrates multiple FDRA fields for dynamic scheduling, the same concept can be extended for configured scheduling such as SPS and UL CG Type 2 where those fields can be carried in the activation DCIs. For UL CG Type 1, multiple FDRAs can be provided by higher layer signaling.

Hereinafter, a new field is defined for the second FDRA in DCI used for scheduling the PDSCH or PUSCH around the active subband. The size of the field may be determined based on bandwidth of the legacy BWP.

As an alternative for avoiding alternating the DCI size, the legacy FDRA field determined based on the bandwidth of regular active BWP is repurposed to indicate both FDRA 1 and FDRA 2. The size of FDRA 1 and FDRA 2 may be determined number of available RBs in each portion above and below the active subband. The RBG, PRG, VRB bundle, or PRB bundle may also be defined relative to each portion of the available RBs above and below the active subband, similar to how they are defined within an active subband as described herein.

Figure 19:
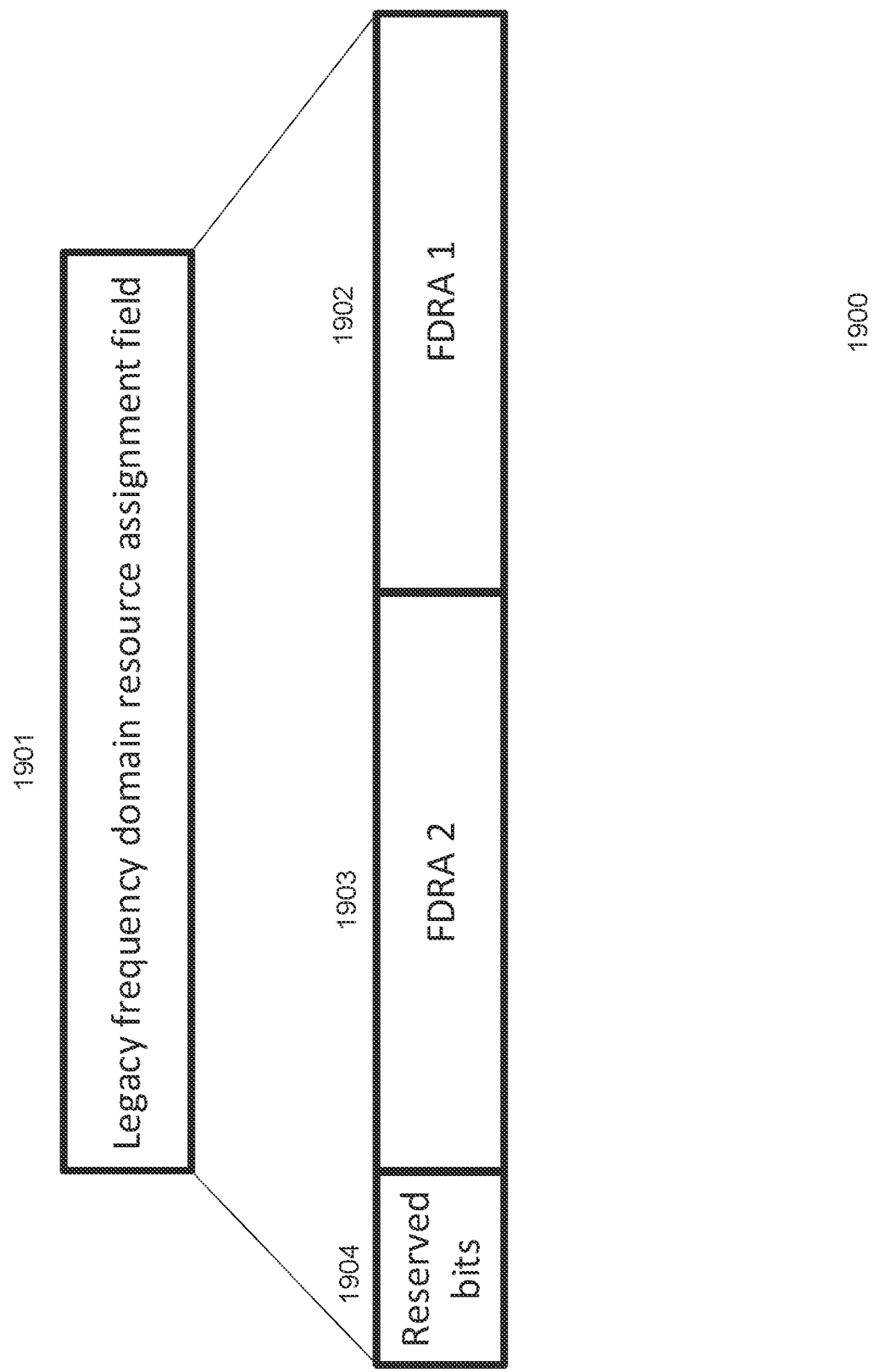
FIG. 19 is a graph 1900 illustrating a modification of the legacy FDRA field to carry FDRA1 and FDRA 2, according to an embodiment.

FIG. 19 is a graph 1900 illustrating a modification of the legacy FDRA field to carry FDRA1 and FDRA 2, according to an embodiment.

Referring to FIG. 19, a legacy FDRA field 1901 accommodates FDRA 1 1902 and FDRA 2 1903. If the size of the legacy FDRA field 1901 is larger than the sizes of FDRA 1 1902 and FDRA 2 1903, the remaining bits are reserved 1904. This may be beneficial as the FDRA field size is fixed irrespective of whether the FDRA field 1901 schedules a PDSCH or PUSCH around an active subband or performs legacy scheduling with an active subband. For example, for resource allocation type 0, the size of FDRA 1 1902 and FDRA 2 1903 are determined based on the number of RBGs within the lower and upper portions of RBs around the active subband, respectively. For resource allocation type 1, the sizes of FDRA 1 1902 and FDRA 2 1903 are determined based on the number of RBs within the lower and upper portions of RBs around the active subband, respectively.

The UE may assume that same resource allocation type is applied no matter whether the scheduling is for the PDSCH or PUSCH around an active subband or merely legacy scheduling with an active subband with the same corresponding configurations for simplicity though the configurations can be different.

The reserved bits 1904, such as the MSB for example, may still be used to indicate the resource allocation type when resourceAllocation is configured as 'dynamicSwitch'. Also, the reserved bits 1904 can be used to indicate the frequency hopping offset value. The indicated offset value may be applied for both portions of PUSCH below and above the active DL subband within the legacy UL BWP.

For additional flexibility, it may be possible to provide different frequency offset values for each portion of PUSCH. In this case, the frequency offset indicator of the first portion of PUSCH may be lumped (appended) to FDRA 1 1902 and the frequency offset indicator of the second portion of PUSCH may be lumped (appended) to FDRA 2 1903.

Thought the above description was for FDRA field in DCI used for dynamic scheduling or triggering SPS or UL CG type 2, the same concept can be applied when the FDRA field 1901 is indicated by higher layer signaling such as in UL CG type 1.

An RBG, a PRG, a VRB bundle, or a PRB bundle can be defined based on the available RBs above and below the active subband.

The resource allocation type and its corresponding parameters can be the same irrespective of whether the PDSCH or PUSCH is scheduled according to legacy procedures or around the active subband.

Hereinafter, some constraints are disclosed for use when the PDSCH/PUSCH is rate matched or punctured around the UL/DL subband, respectively. These constraints may be applied when PDSCH/PUSCH can be scheduled around the UL/DL subband, respectively.

The support for allocating PUSCH or PDSCH around the DL subband or UL subband may be subject to UE capability. In other words, as part of UE capability report, UE may indicate whether it supports PUSCH or PDSCH to be allocated around the active DL subband or UL subband, respectively, within the legacy BWP. This allocation may be by scheduling around the subband or due to rate matching/puncturing around the subband as previously described.

In legacy NR, for PUSCH resource allocation type 0, the scheduling must be contiguous or almost contiguous. For PUSCH resource allocation type 1, only non-interleaved scheduling is supported. For unlicensed band operation, PUSCH resource allocation type 2 is used based on an interlace structure in which RBs are uniformly distributed with the BWP.

The PUSCH is considered almost non-contiguous with respect to PUSCH resource allocation type 0, if the following conditions are satisfied by the following expression, $$N_{RB\_gap}/(N_{RB\_alloc}+N_{RB\_gap}) \leq 0.25 \text{ and } (N_{RB\_alloc}+N_{RB\_gap}) > X,$$

where X is 106, 51 or 24 RBs for 15 kHz, 30 kHz or 60 kHz, respectively, $N_{RB\_gap}$ is the total number of unallocated RBs between allocated RBs, and $N_{RB\_alloc}$ is the total number of allocated RBs.

Figure 20:
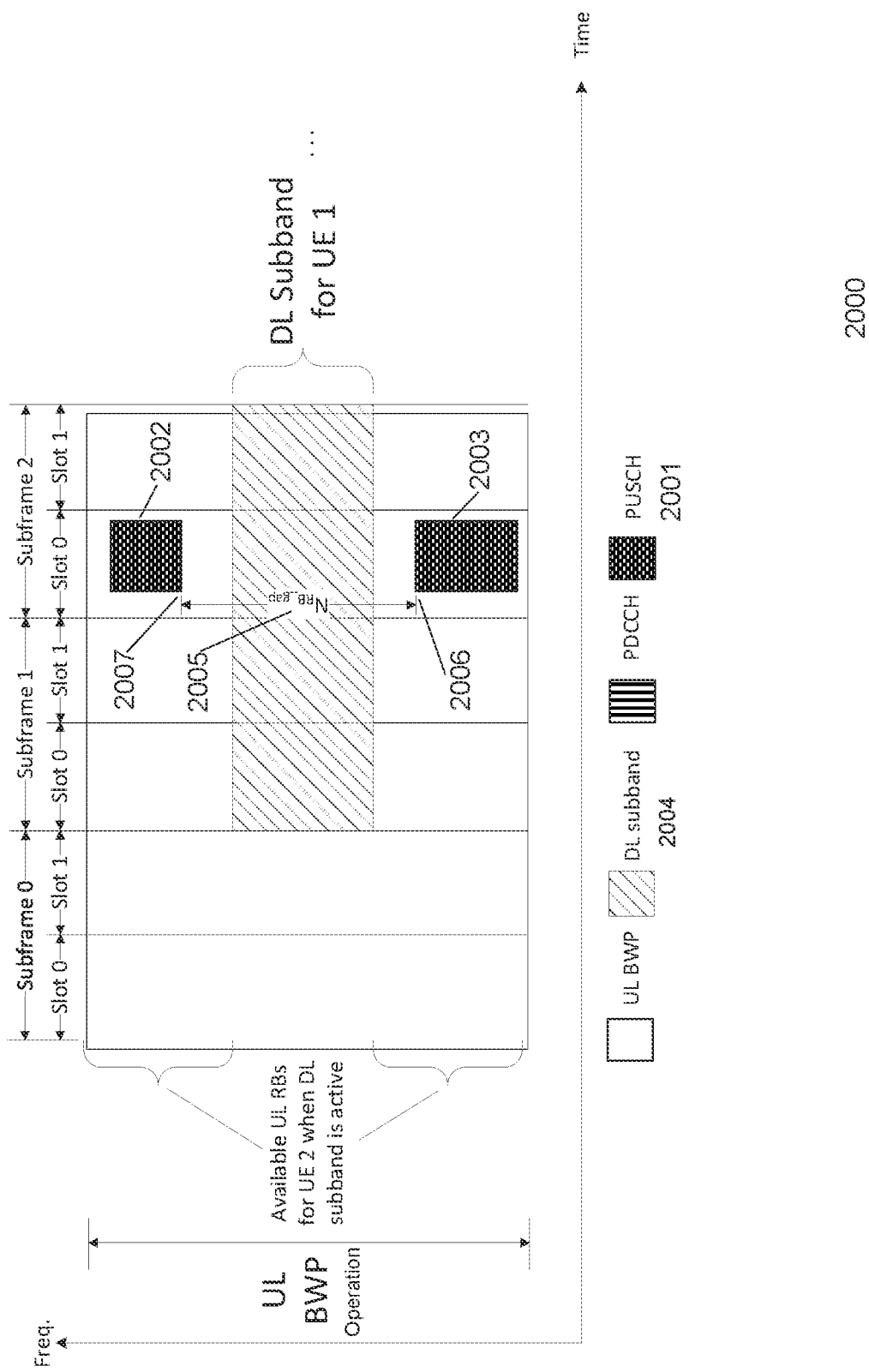
FIG. 20 is a graph 2000 illustrating $N_{RB\_gap}$ as defined for PUSCH resource allocation type 1, according to an embodiment.

FIG. 20 is a graph 2000 illustrating $N_{RB\_gap}$ as defined for PUSCH resource allocation type 1, according to an embodiment.

Referring to FIG. 20, to simplify the UE implementation, at least one of the above conditions may be applied even for non-interleaved PUSCH resource allocation type 1 when the PUSCH is divided into two portions above 2002 and below 2003 the active DL subband 2004. In this case, for example, $N_{RB\_gap}$ 2005 may include the RBs between the highest allocated RB 2006 to the lowest allocated RB 2007 of the lower 2003 and upper 2002 portions of the PUSCH 2001, respectively. When rate matching/puncturing of the PUSCH 2001 around the DL subband 2004 occurs, the UE does not expect to perform such operation when any one of the above conditions is unsatisfied. Supporting this feature may be subject to UE capability and may be indicated as part of a capability report.

The first condition may be restrictive when the active DL subband is wide and it may be hard to satisfy the first condition, i.e., $N_{RB\_gap}/(N_{RB\_alloc}+N_{RB\_gap}) \leq 0.25$, without allocating large number of RBs for PUSCH, i.e., $N_{RB\_alloc}$. Therefore, we propose that threshold value of this condition to be Y, $N_{RB\_gap}/(N_{RB\_alloc}+N_{RB\_gap}) \leq Y$, and the value of Y may be indicated as part of UE capability report. For example, it may take value from the set {0.25, 0.5, 0.9}. Also, in case for rate matching/puncturing of PUSCH around the DL subband, UE does not expect to perform such operation with any of the above conditions, or both, are not stratified based on the indicated value Y.

This threshold may only be applied when the PUSCH is scheduled or rate matching/puncturing occurs around an active DL subband. However, for legacy scheduling or rate matching/puncturing, the legacy conditions can still be applied, if any.

For PUSCH resource allocation type 0 or 1, or when rate matching or puncturing occur, one of the above conditions may separately be applied for each portion of the PUSCH above and below the active DL subband. For example, when the PUSCH allocated RBs above the active DL subband should satisfy any of the above conditions, and the PUSCH allocated RBs below the active DL subband should satisfy any of the above conditions, it is unnecessary that both portions of RBs jointly conform to any of the above conditions. This feature may also be indicated as part of UE capability in a capability report. The UE may not expect to transmit the PUSCH with the disclosed conditions being unsatisfied for any portion of the PUSCH around the DL subband. Supporting this feature may be subject to UE capability and may be indicated as part of a capability report.

In legacy NR, there are different frequency hopping procedures developed such as intra-slot hopping, inter-slot hopping, and inter-repetition hopping. The offset between the hops can be configured by higher signaling and indicated in the scheduling DCI. The exact location of the hop depends on the offset and BWP size based on the following expression.

$$(RB_{start}+RB_{offset}) \bmod N_{BWP}^{size}$$

With the presence of active DL subband within the UL BWP, the hop may fall within the DL subband. Therefore, it is beneficial to define the UE behavior in this case.

As a simple solution, UE does not expect that any of PUSCH hops to falls within an active DL subband. In this case, it is gNB's responsibility to ensure that the configured/indicated RBs offset will not result in any PUSCH hop to fall within the active DL subband.

To avoid imposing a restriction on the gNB, the UE may be allowed to drop the hop which falls within the active DL subband. This is beneficial when the gNB schedules the PUSCH, indicates the frequency offset hop and then decides to activate the DL subband that collides with the hop. In this case, the UE drops the hop.

To also accommodate the UE implementation, a timeline can be applied based on UE capability in a manner similar to the cancellation timeline/capability when conflict occurs between RRC UL transmission and dynamic DL reception. More specifically, the UE does not expect to cancel the hop transmission if it receives indication of the presence of active DL subband within $T_{proc,\ 2}$ window before the first symbol of hop that falls in the DL subband. If the UE indicates the capability of partial canceling, then the UE still transmits a portion of the PUSCH hop that falls after $T_{proc,\ 2}$ window that starts after receiving the indication of the active DL subband, e.g., the last symbol of a CORESET carrying the DCI activating the DL subband and cancels the remaining symbols of the PUSCH hop.

If the PUSCH hop falls within an active DL subband, the UE may partially or fully cancel the PUSCH hop according to a particular timeline and UE capability.

Instead of only dropping the hop that falls within the DL subband, the entire PUSCH may be dropped according to a particular timeline and UE capability as previously described.

If the PUSCH hop falls within an active DL subband, UE may partially or fully cancel all of the PUSCH hops, not merely the hop that falls within the active DL subband, according to a particular timeline and UE capability.

As disclosed herein, the embodiments developed for the UE to operate around the RBs that are configured/indicated as a subband, based on the knowledge of where and when this subband is active, can be extended to when the UE operates on the RBs within the configured/indicated subband. Therefore, for PUSCH hopping in the UL subband and similar PUCCH hopping described herein, the UE may apply the same rules for determining the frequency domain location of the PUSCH and replace $N_{BWP}^{size}$ of the UL BWP with the size of the associated UL subband. Therefore, the location of the hop can be given by the following expression.

$$(RB_{start}+RB_{offset}) \bmod N_{UL\text{-}Subband}^{size}$$

where $N_{UL\text{-}Subband}^{size}$ is the size of UL subband, $RB_{start}$ is the first RB in the scheduled/configured PUSCH within the UL subband and $RB_{offset}$ which can indicate how the offset is determined when the PUSCH is scheduled in legacy UL BWP. The same predefined offset values can be used except by replacing $N_{BWP}^{size}$ of the UL BWP with the size of the associated UL subband. Either the same or different RRC offset lists for legacy UL BWP can be provided by RRC signaling. Configuring new lists for the hopping offset provides the gNB with more flexibility. If a single PUSCH-Config is to be applied to PUSCH scheduled, the solutions developed herein for translating the parameters of the PUCCH can be applied. For example, the gNB may provide the UE with an additional offset to be added/subtracted from the offset used in the legacy UL BWP.

If PUSCH repetitions fall in the legacy UL BWP and UL subband, the UE's behavior needs to be determined. For repetitions that fall within the UL subband, the configurations associated with the UL subband may be applied, whereas, for the repetitions that fall within the legacy UL BWP, the configurations associated with the legacy UL BWP may be applied.

The UE may interpret the FDRA field/parameter (e.g., for dynamic and configured PUSCH) differently for different PUSCH repetitions. One possibility is that the FDRA field/parameter is determined based on the first PUSCH repetition. Specifically, if the first PUSCH repetition falls in the UL subband, the FDRA may be interpreted based the UL subband as description herein. The remaining repetitions may be assumed to occupy the same RBs even if they fall in the legacy UL BWP. In this case, it is the responsibility of the gNB to ensure that allocated RBs are within the UL subband or the legacy UL BWP. This is important when the first PUSCH repetition falls in the legacy UL BWP since the legacy UL BWP may be wider than the UL subband. In this case, the UE does not expect any of the PUSCH repetition to fall outside the UL subband.

Another possibility is to have a single FDRA field/parameter that may be interrupted based on the location of first PUSCH repetition in the UL subband or the legacy UL BWP. A particular rule is applied to derive the frequency domain location of the remaining PUSCH repetitions that fall in the legacy UL BWP or UL subband, respectively. The solutions developed herein for translating the parameters of the PUCCH can be applied. For example, an offset may be applied for the remaining repetitions. The FDRA is interpreted based on legacy UL BWP if the first PUSCH repetition falls within the legacy UL BWP. For the remaining repetition in the UL subband, an offset can be applied between the first RB of the first PUSCH repetition and the first RB in the remaining PUSCH repetitions in UL subband. The offset value may be configured by higher layer signaling or multiple values may be provided. A MAC-CE indicates the particular value to be applied.

Alternatively, two FDRA fields/parameters may be indicated/configured to different PUSCH repetitions in the legacy UL BWP or UL subband. In this case, the associated FDRA is applied depending on whether the PUSCH repetition is in the legacy UL BWP or UL subband.

The UE may indicate to the gNB whether it supports PUSCH repetitions spanning the UL subband and the legacy UL BWP via the UE's capability signaling.

Figure 21:
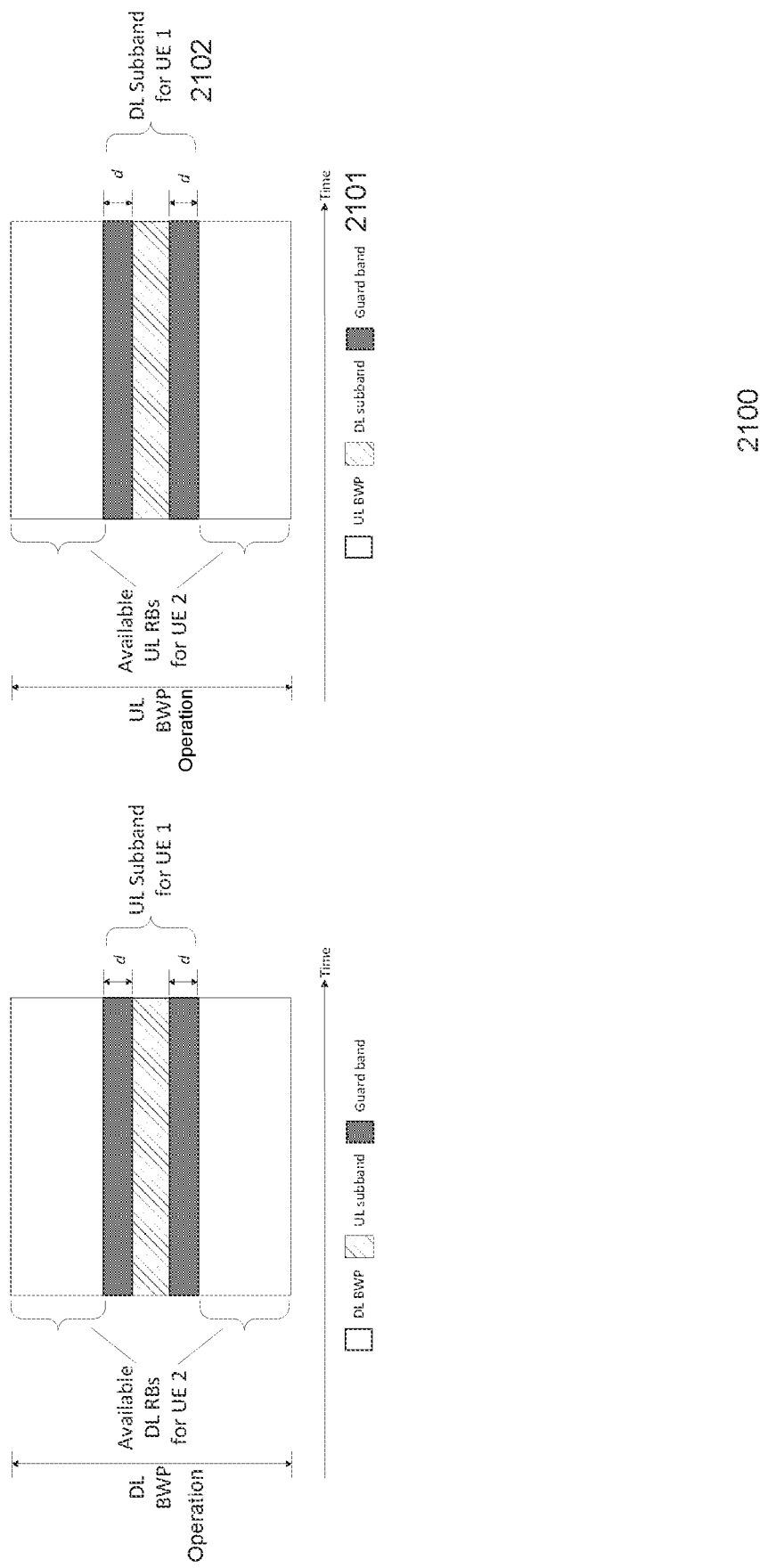
FIG. 21 are graphs 2100 illustrating a guard band at edges of the active UL/DL subband, according to an embodiment.

FIG. 21 are graphs 2100 illustrating a guard band 2101 at edges of the active UL/DL subband, according to an embodiment.

Referring to FIG. 21, it is beneficial to configure a guard band (d) 2101 around the active UL/DL subband 2102 to reduce the interference leakage between the neighbor bands. The guard band 2101 may be fully confined with the active DL/UL subband.

The size of the guard band (d) 2101 may be configured by higher layer signaling in units of RBs and may be applied to both edges of the active UL/DL subband as illustrated in FIG. 21.

The size of guard band may be predefined, i.e., provided in the specs, depending on several parameters such as the numerology, the width of the subband, etc. The predefined values may be applied as a default value if the gNB does not provide the UE with other information.

When operating on the RBs confined within the guard band 2101 of the UL or DL subband, the UE does not expect to transmit or receive on RBs within the guard band 2101, respectively. However, if the UE operates on the legacy BWP, i.e., the subband is deactivated, then no guard band is needed and the RBs within the guard band 2101 can be used for transmission or reception as part of regular UL or DL BWP, respectively.

The size of the guard band may be configured by higher layer signaling, or a default value provided in the specs may be applied. The higher layer signaling disclosed herein for different procedures may be included in RMSI or OSI to provide the RRC idle/inactive UEs with the necessary information about the subband operation.

Figure 22:
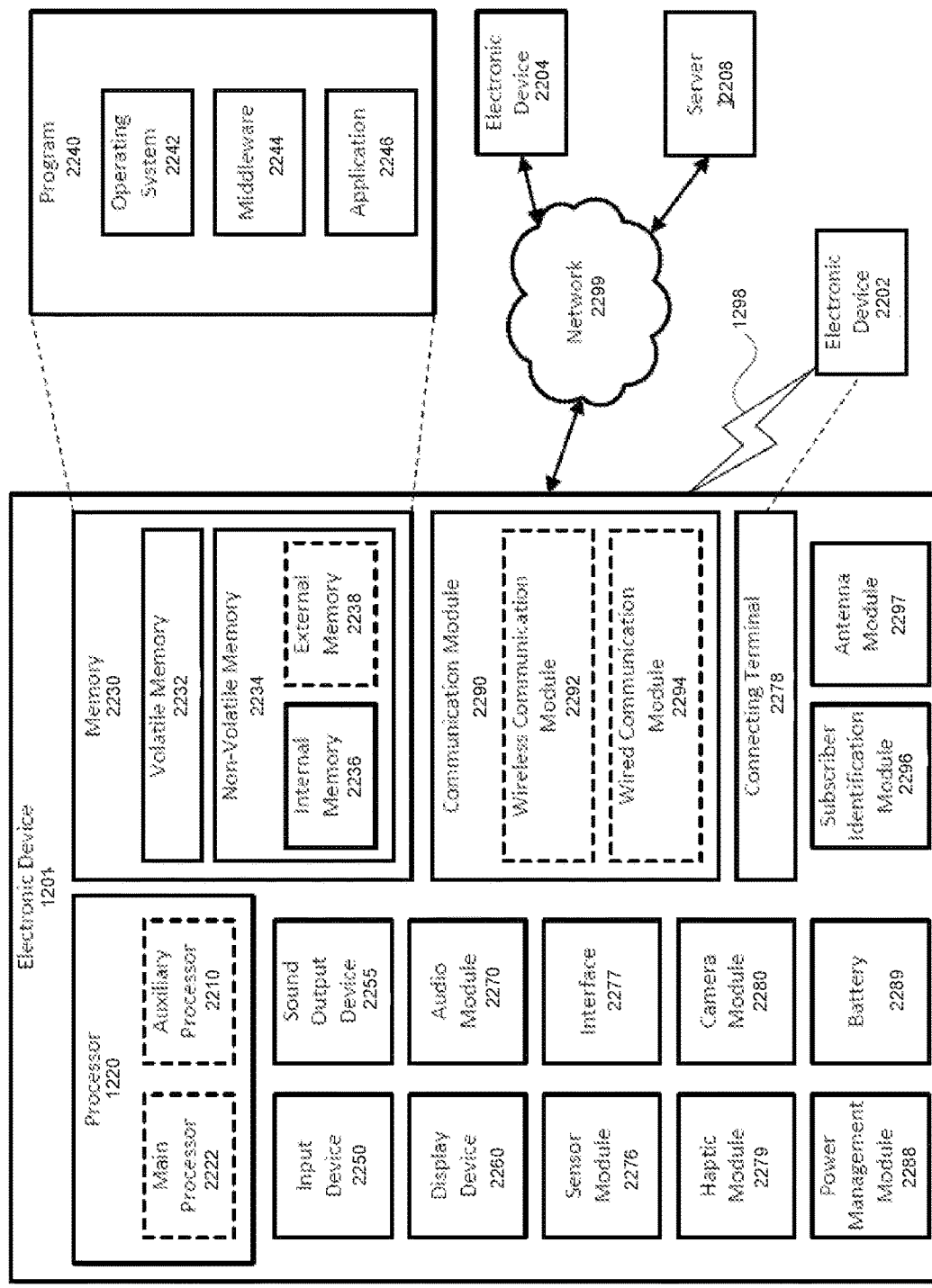
FIG. 22 is a block diagram of an electronic device in a network environment 2200, according to an embodiment.

FIG. 22 is a block diagram of an electronic device in a network environment 2200, according to an embodiment.

Referring to FIG. 22, an electronic device 2201 in a network environment 2200 may communicate with an electronic device 2202 via a first network 2298 (e.g., a short-range wireless communication network), or an electronic device 2204 or a server 2208 via a second network 2299 (e.g., a long-range wireless communication network). The electronic device 2201 may communicate with the electronic device 2204 via the server 2208. The electronic device 2201 may include a processor 2220, a memory 2230, an input device 2240, a sound output device 2255, a display device 2260, an audio module 2270, a sensor module 2276, an interface 2277, a haptic module 2279, a camera module 2280, a power management module 2288, a battery 2289, a communication module 2290, a subscriber identification module (SIM) card 2296, or an antenna module 2294. In one embodiment, at least one (e.g., the display device 2260 or the camera module 2280) of the components may be omitted from the electronic device 2201, or one or more other components may be added to the electronic device 2201. Some of the components may be implemented as a single integrated circuit (IC). For example, the sensor module 2276 (e.g., a fingerprint sensor, an iris sensor, or an illuminance sensor) may be embedded in the display device 2260 (e.g., a display).

The processor 2220 may execute, for example, software (e.g., a program 2240) to control at least one other component (e.g., a hardware or a software component) of the electronic device 2201 coupled with the processor 2220 and may perform various data processing or computations. As at least part of the data processing or computations, the processor 2220 may load a command or data received from another component (e.g., the sensor module 2246 or the communication module 2290) in volatile memory 2232, process the command or the data stored in the volatile memory 2232, and store resulting data in non-volatile memory 2234. The processor 2220 may include a main processor 2221 (e.g., a central processing unit (CPU) or an application processor (AP)), and an auxiliary processor 2223 (e.g., a graphics processing unit (GPU), an image signal processor (ISP), a sensor hub processor, or a communication processor (CP)) that is operable independently from, or in conjunction with, the main processor 2221. Additionally or alternatively, the auxiliary processor 2223 may be adapted to consume less power than the main processor 2221, or execute a particular function. The auxiliary processor 2223 may be implemented as being separate from, or a part of, the main processor 2221.

The auxiliary processor 2223 may control at least some of the functions or states related to at least one component (e.g., the display device 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). The auxiliary processor 2223 (e.g., an image signal processor or a communication processor) may be implemented as part of another component (e.g., the camera module 2280 or the communication module 2290) functionally related to the auxiliary processor 2223.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input device 2250 may receive a command or data to be used by another component (e.g., the processor 2220) of the electronic device 2201, from the outside (e.g., a user) of the electronic device 2201. The input device 2250 may include, for example, a microphone, a mouse, or a keyboard.

The sound output device 2255 may output sound signals to the outside of the electronic device 2201. The sound output device 2255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 2260 may visually provide information to the outside (e.g., a user) of the electronic device 2201. The display device 2260 may include, for example, a display, a hologram device, or a projector and control circuitry to control a corresponding one of the display, hologram device, and projector. The display device 2260 may include touch circuitry adapted to detect a touch, or sensor circuitry (e.g., a pressure sensor) adapted to measure the intensity of force incurred by the touch.

The audio module 2270 may convert a sound into an electrical signal and vice versa. The audio module 2270 may obtain the sound via the input device 2250 or output the sound via the sound output device 2255 or a headphone of an external electronic device 2202 directly (e.g., wired) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. The sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device 2202 directly (e.g., wired) or wirelessly. The interface 2277 may include, for example, a high-definition multimedia interface (HDMI), a universal serial bus (USB) interface, a secure digital (SD) card interface, or an audio interface.

A connecting terminal 2278 may include a connector via which the electronic device 2201 may be physically connected with the external electronic device 2202. The connecting terminal 2278 may include, for example, an HDMI connector, a USB connector, an SD card connector, or an audio connector (e.g., a headphone connector).

The haptic module 2279 may convert an electrical signal into a mechanical stimulus (e.g., a vibration or a movement) or an electrical stimulus which may be recognized by a user via tactile sensation or kinesthetic sensation. The haptic module 2279 may include, for example, a motor, a piezoelectric element, or an electrical stimulator.

The camera module 2280 may capture a still image or moving images. The camera module 2280 may include one or more lenses, image sensors, image signal processors, or flashes.

The power management module 2288 may manage power supplied to the electronic device 2201. The power management module 2288 may be implemented as at least part of, for example, a power management integrated circuit (PMIC).

The battery 2289 may supply power to at least one component of the electronic device 2201. The battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the AP) and supports a direct (e.g., wired) communication or a wireless communication. The communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™, wireless-fidelity (Wi-Fi) direct, or a standard of the Infrared Data Association (IrDA)) or the second network 2299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The antenna module 2297 may transmit or receive a signal or power to or from the outside (e.g., the external electronic device) of the electronic device 2201. The antenna module 2297 may include one or more antennas, and, therefrom, at least one antenna appropriate for a communication scheme used in the communication network, such as the first network 2298 or the second network 2299, may be selected, for example, by the communication module 2290 (e.g., the wireless communication module 2292). The signal or the power may then be transmitted or received between the communication module 2290 and the external electronic device via the selected at least one antenna.

Commands or data may be transmitted or received between the electronic device 2201 and the external electronic device 2204 via the server 2208 coupled with the second network 2299. Each of the electronic devices 2202 and 2204 may be a device of a same type as, or a different type, from the electronic device 2201. All or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 2201. The electronic device 2201 may provide the outcome, with or without further processing of the outcome, as at least part of a reply to the request. To that end, a cloud computing, distributed computing, or client-server computing technology may be used, for example.

While the present disclosure has been described with reference to certain embodiments, various changes may be made without departing from the spirit and the scope of the disclosure, which is defined, not by the detailed description and embodiments, but by the appended claims and their equivalents.

What is claimed is:

1. A method, comprising:
identifying, by a user equipment (UE), an uplink (UL) or downlink (DL) subband configuration provided from a gNB to the UE; and
determining a priority between a UL transmission and a DL reception based on whether a collision between DL and UL operations occurs in a time domain,
wherein the UE is a half-duplex UE which performs the UL transmission at different times than when the UE performs the DL reception.

2. The method of claim 1,
wherein collision between DL and UL operations occurs when the DL reception and UL transmission overlap in the time domain.

3. The method of claim 2, further comprising:
performing the UL transmission in a UL subband, and cancelling the DL reception.

4. The method of claim 1, further comprising:
determining, when the UL subband configuration is identified, a resource block (RB) for the UL transmission or the DL reception inside and outside the UL subband configuration,
wherein the RB specifies a mapping of the UL transmission or the DL reception to one or more RB collections.

5. The method of claim 2,
wherein the priority is defined by a dynamic UL or DL grant overriding a DL reception or UL transmission configured by higher layer signaling, respectively, and
wherein the dynamic UL or DL grant is indicated by downlink control information (DCI).

6. The method of claim 4, further comprising:
determining a size and a location of each of the one or more RB collections,
wherein the one or more RB collections are indicated as a resource block group (RBG), a precoding resource group (PRG), a virtual resource block bundle (VRB), or a physical resource bundle (PRB).

7. The method of claim 2,
wherein the UE performs the DL reception and cancels the UL transmission or performs the UL transmission and cancels the DL reception when an executed DL reception or UL transmission has higher priority over a UL transmission or DL reception that collides with the executed DL reception or UL transmission, respectively, and
wherein the gNB indicates or configures the priority of the first operation over the second operation.

8. The method of claim 5,
wherein the UE considers there to be no collision between the dynamic UL and DL transmissions and transmission of a synchronization signal block (SSB) by the gNB and transmission of a random access channel (RACH) by the UE, respectively.

9. The method of claim 1, further comprising:
cancelling all UL transmissions when the UL subband is turned off, and
determining occasions of the RACH in the turned off UL subband as being invalid.

10. The method of claim 9,
wherein, when the dynamic UL grant is cancelled, a number of symbols separates a last symbol carrying an indication of the UL subband cancellation from a first symbol of the dynamic UL grant.

11. The method of claim 1, further comprising:
providing a separate configuration or individual configurations to the UE for UL transmission occasions in the UL subband and a legacy UL BWP.

12. The method of claim 11, further comprising:
applying, by the UE, when separate configurations are provided and the UL transmission is repeated across the legacy UL BWP and the UL subband, UL parameters associated with the legacy UL BWP or the UL subband based on whether the UL transmission is in the legacy UL BWP or the UL subband.

13. The method of claim 11, further comprising:
applying an offset to a location of the UL transmission when the UE is configured with one UL transmission configuration message for both of a UL transmission occasion in the UL subband and a legacy UL BWP and when the UL transmission occasion is in the UL subband.

14. The method of claim 6,
wherein a first and a last RBG, PRG, VRB or PRB include fewer RBs than remaining RBs in the UL or DL subband.

15. The method of claim 14, further comprising:
providing, by the gNB, separate configurations to the UE enabling the UE to determine the size of the RBG, the PRG, the VRB, or PRB of the UL or DL subband.

16. The method of claim 15,
wherein the size of the RBG, the PRG, the VRB, or the PRB bundle of the UL or DL subband is determined based on a size of the UL or DL subband.

17. A method, comprising:
identifying, by a user equipment (UE) configured or dynamically indicated to perform downlink (DL) reception, an uplink (UL) transmission or DL/UL subband configuration provided from a gNB to the UE; and
determining a priority between DL and UL operations based on whether the DL and UL operations overlap in a time domain and a frequency domain.

18. The method of claim 17,
wherein the collision between DL and UL operations is based on an overlap of the DL and UL operations in the time domain and a frequency domain when a UL transmission occurs in the DL subband or a DL transmission occurs in the UL subband.

19. The method of claim 18, further comprising:
cancelling, by the UE, the UL transmission or the DL reception configured by higher layer signaling when the UL transmission occurs in the DL subband or the DL transmission occurs in the UL subband, respectively.

20. The method of claim 18, further comprising:
performing, by the UE, rate matching or puncturing of the DL transmission around the UL subband when the DL transmission at least partially overlaps the UL subband.

* * * * *